(12) United States Patent
Hayashi

(10) Patent No.: US 12,449,700 B2
(45) Date of Patent: Oct. 21, 2025

(54) DISPLAY DEVICE WITH LENS ELEMENT AND BARRIER ELEMENT

(71) Applicant: Magnolia White Corporation, Tokyo (JP)

(72) Inventor: Shuji Hayashi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 91 days.

(21) Appl. No.: 18/508,980

(22) Filed: Nov. 14, 2023

(65) Prior Publication Data

US 2024/0168341 A1    May 23, 2024

(30) Foreign Application Priority Data

Nov. 22, 2022 (JP) ................. 2022-186413

(51) Int. Cl.
| | | |
|---|---|---|
| *G02F 1/1343* | (2006.01) | |
| *G02F 1/1335* | (2006.01) | |
| *H04N 13/305* | (2018.01) | |
| *H04N 13/307* | (2018.01) | |
| *H04N 13/31* | (2018.01) | |

(52) U.S. Cl.
CPC .. *G02F 1/134336* (2013.01); *G02F 1/133526* (2013.01); *H04N 13/305* (2018.05); *H04N 13/307* (2018.05); *H04N 13/31* (2018.05)

(58) Field of Classification Search
CPC ......... G02F 1/134336; G02F 1/133526; G02F 1/134309; H04N 13/305; H04N 13/307; H04N 13/31
See application file for complete search history.

(56) References Cited

U.S. PATENT DOCUMENTS

2013/0342664 A1    12/2013  Smith et al.

FOREIGN PATENT DOCUMENTS

| | | | |
|---|---|---|---|
| JP | 2014509399 A | | 4/2014 |
| TW | I448733 B | * | 8/2014 |

OTHER PUBLICATIONS

English Machine Translation of Wang, TW 1448733 (Year: 2025).*

* cited by examiner

*Primary Examiner* — Donald L Raleigh
(74) *Attorney, Agent, or Firm* — K&L Gates LLP

(57) ABSTRACT

According to one embodiment, a display device includes a lens element having a plurality of lenses, a barrier element comprising a liquid crystal layer and a display panel, and the lens element is provided between the display panel and the barrier element, the barrier element comprises a first substrate, a second substrate, the liquid crystal layer is provided between the first substrate and the second substrate. The first substrate includes a plurality of first electrodes, an insulating layer covering the first electrodes, and a plurality of second electrodes provided on the insulating layer, and the second substrate includes a third electrode.

17 Claims, 42 Drawing Sheets

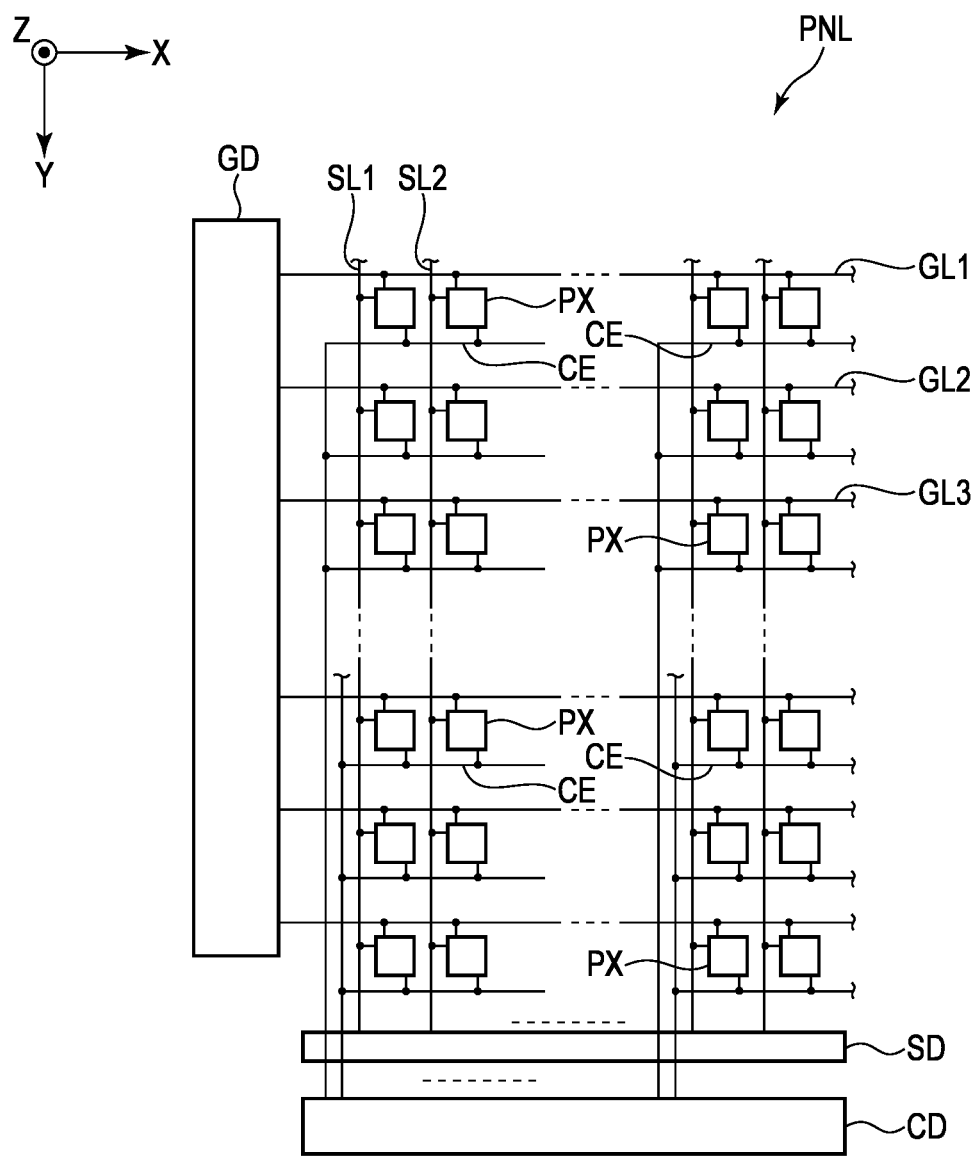
F I G. 3

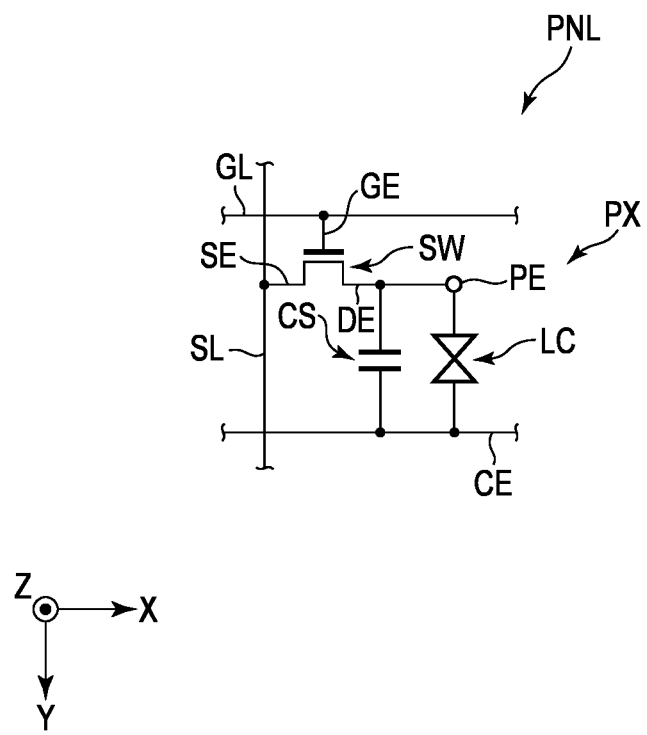
F I G. 4

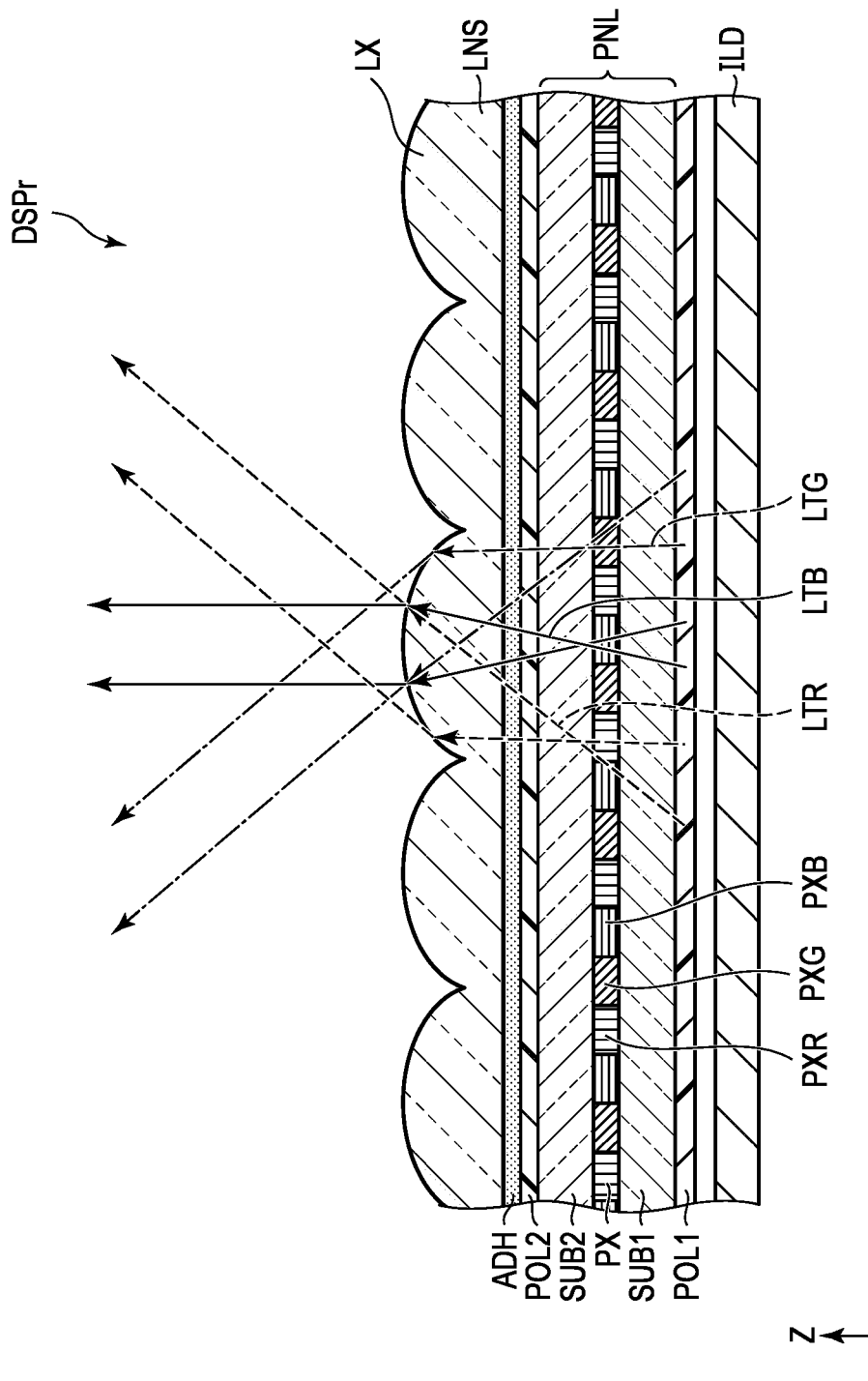
F I G. 12

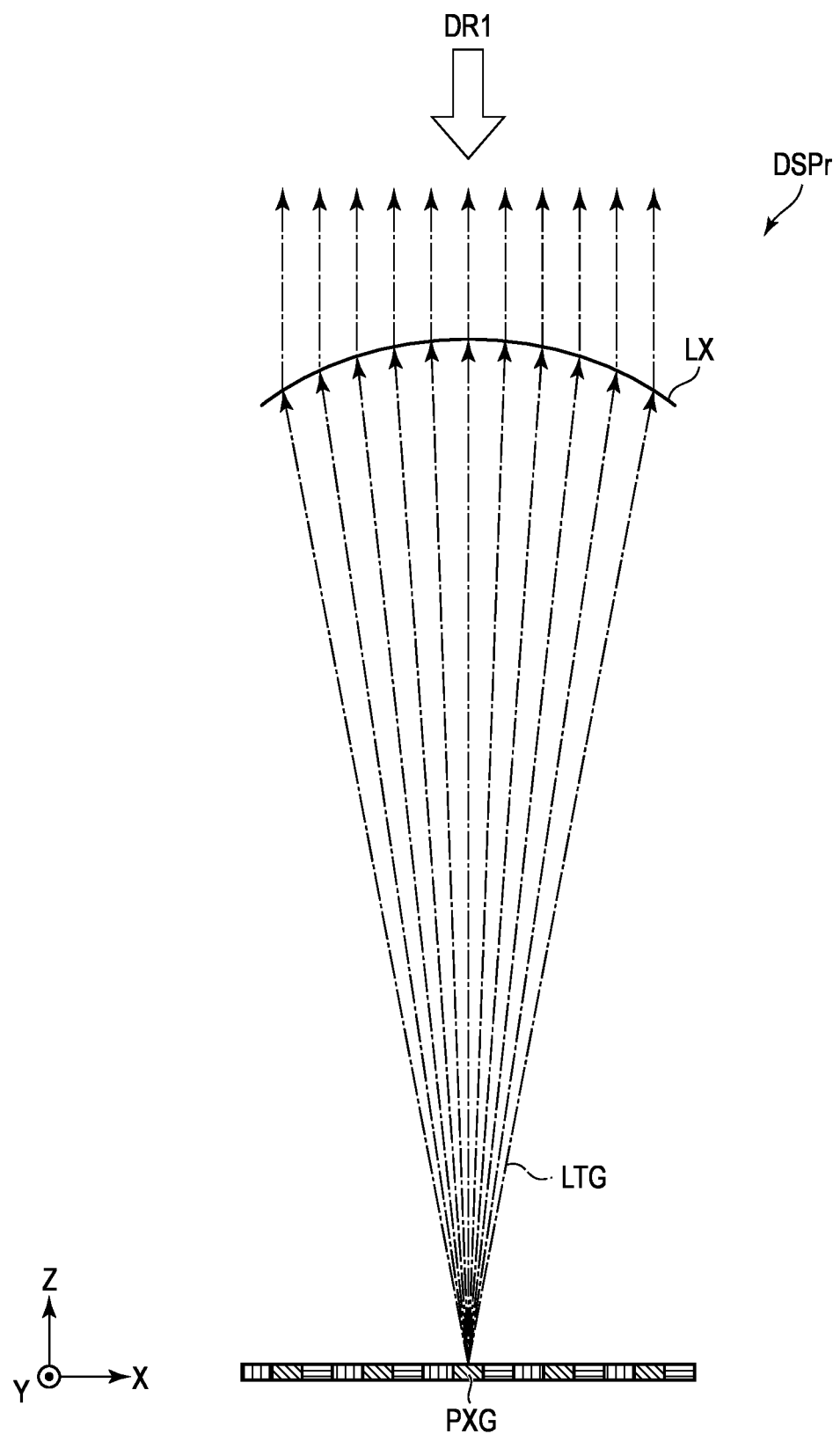
F I G. 13

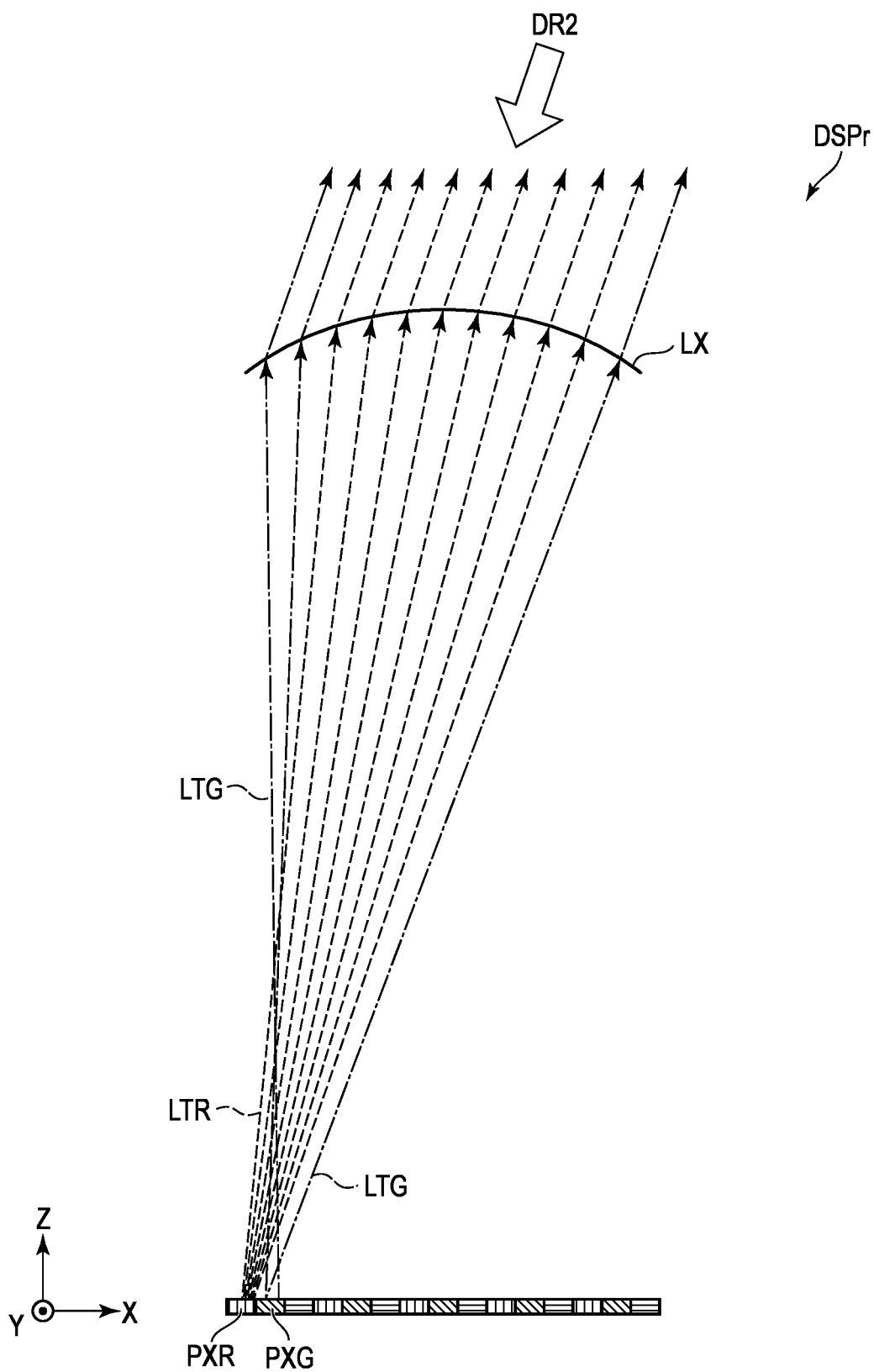
F I G. 14

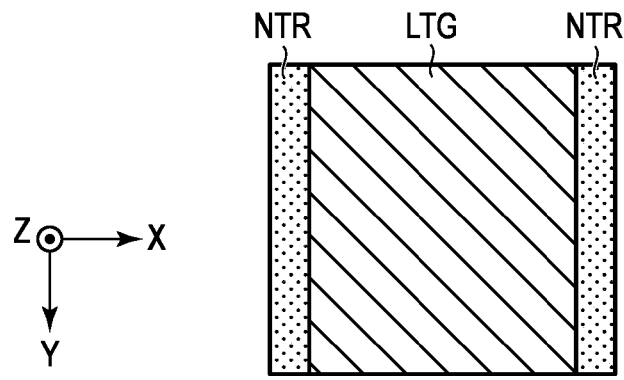
FIG. 16
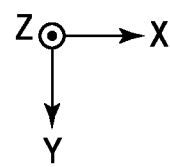 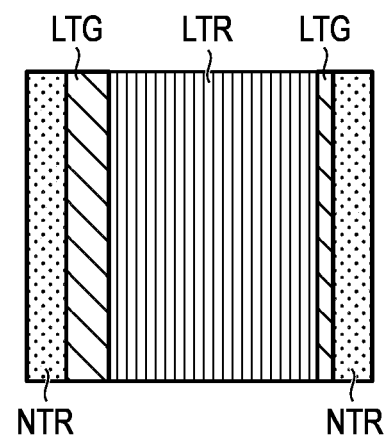
FIG. 17
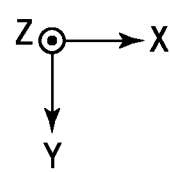 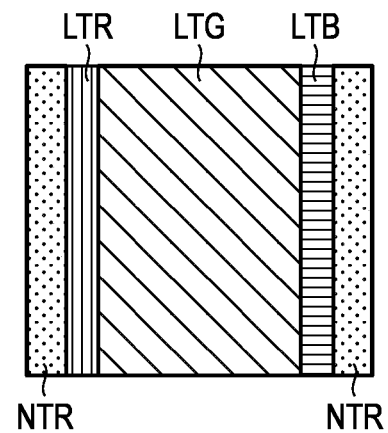
FIG. 18

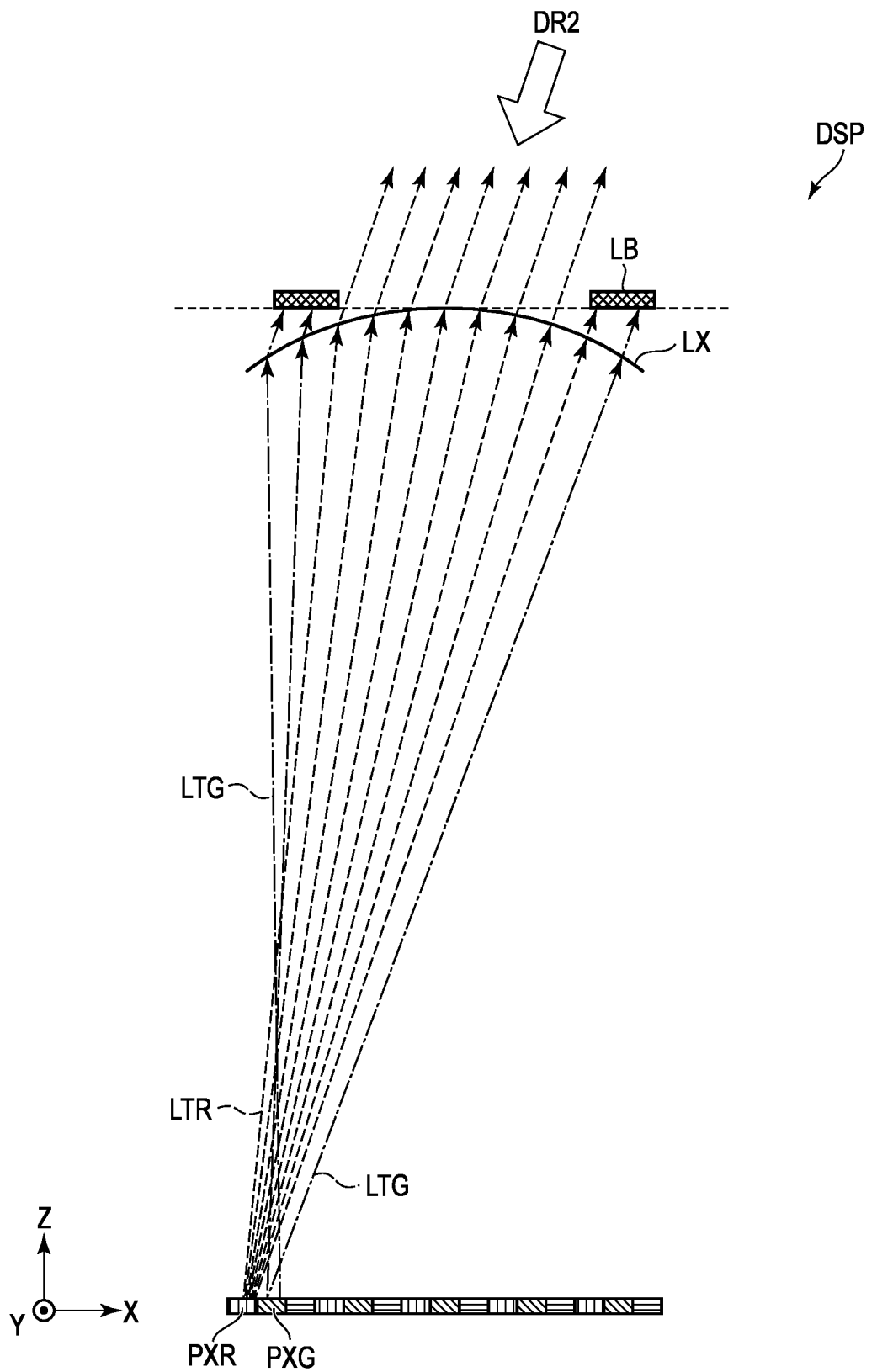
F I G. 20

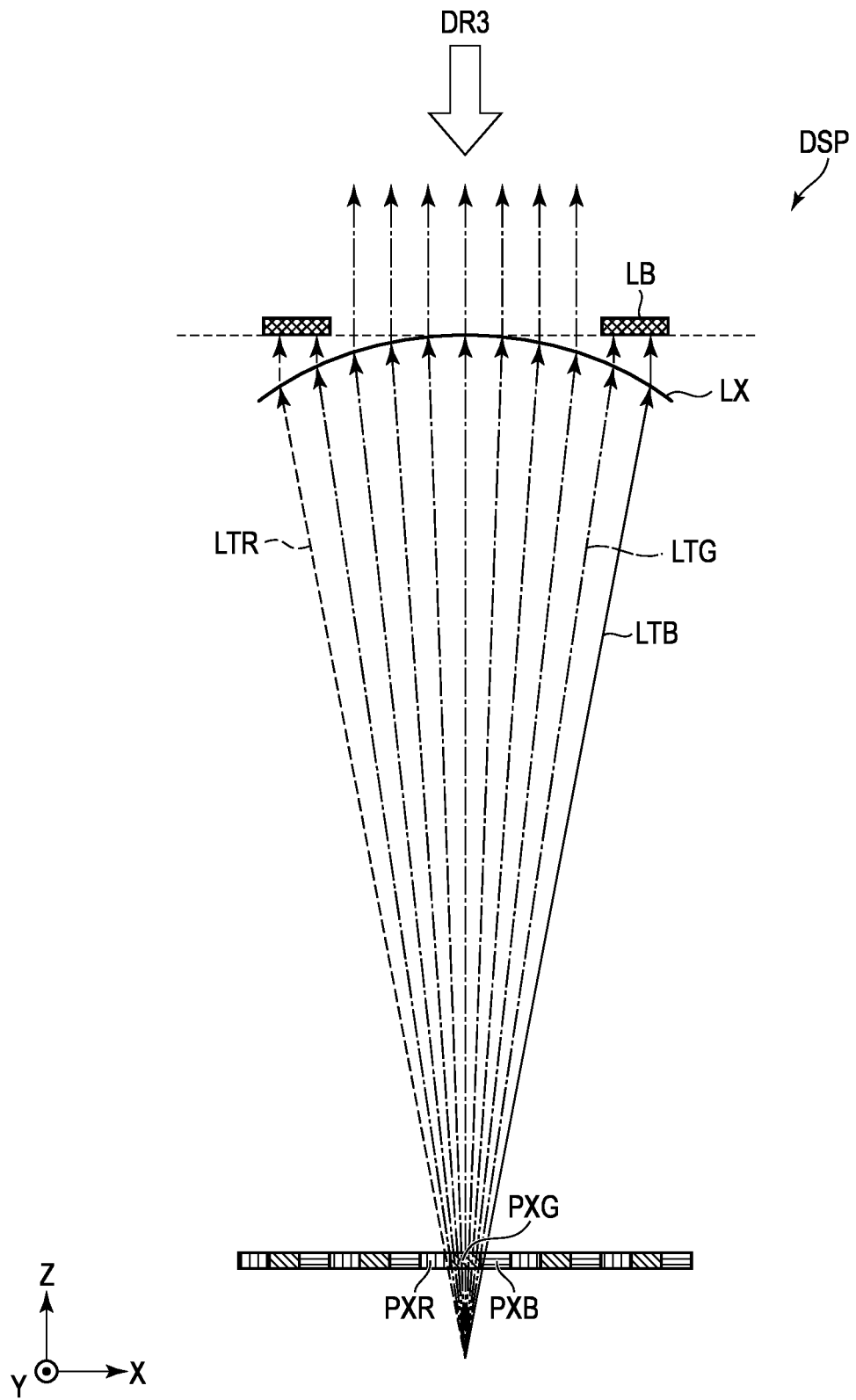
F I G. 21

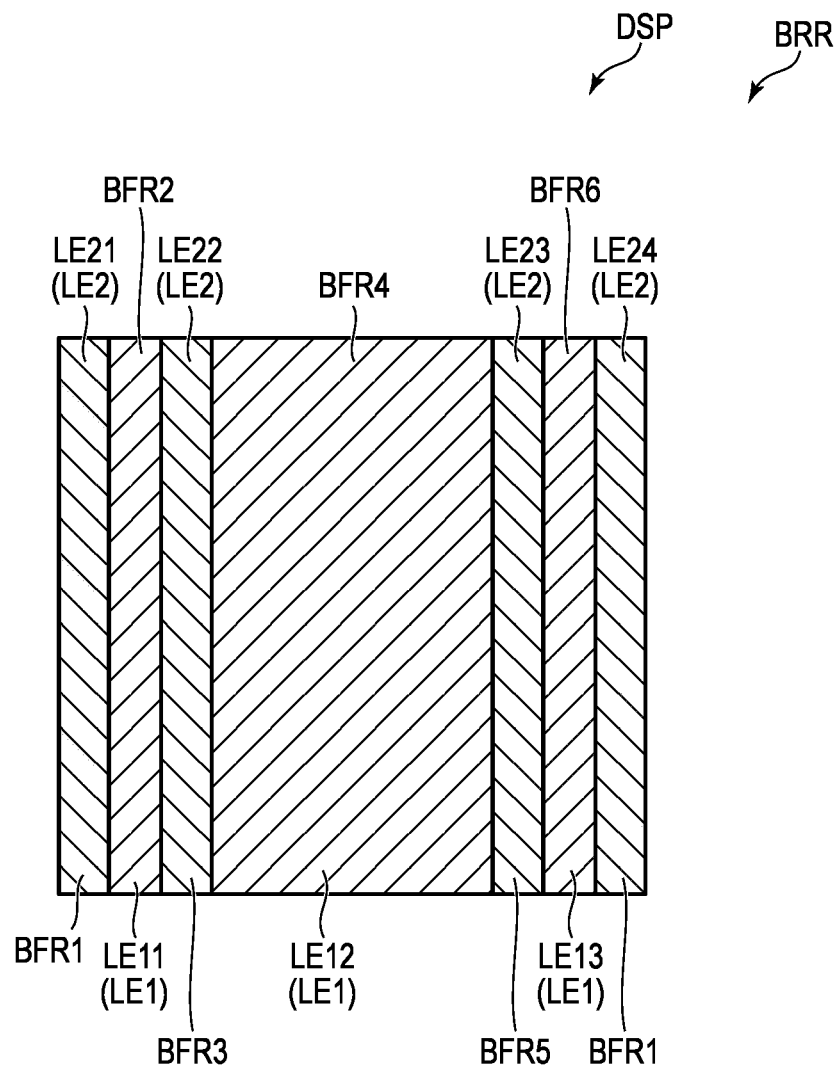
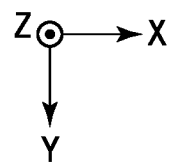
F I G. 27

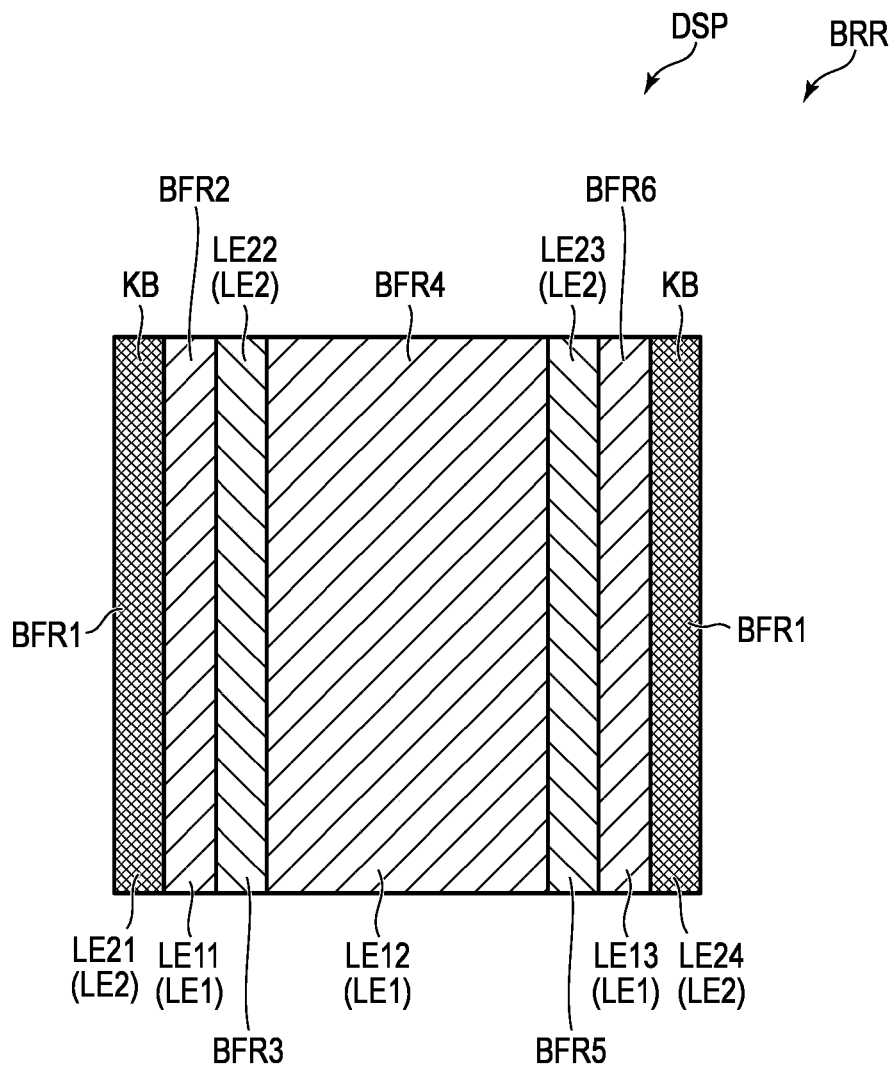
F I G. 28

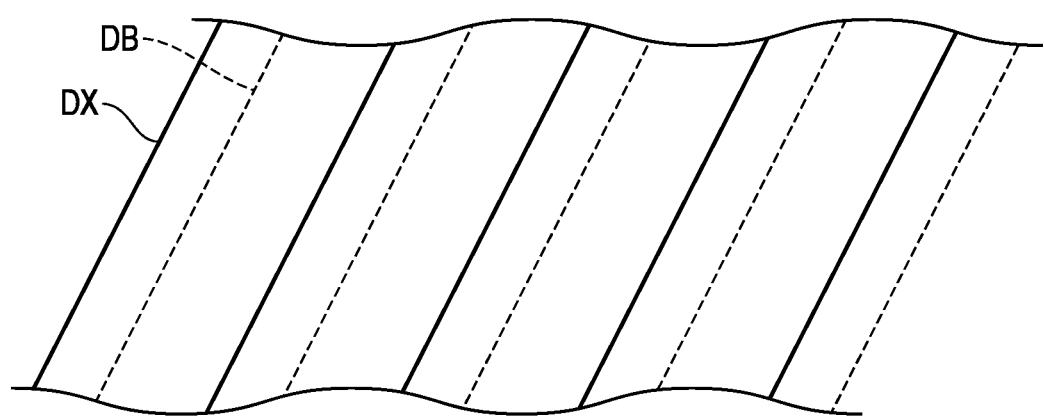
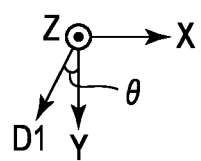
FIG. 32

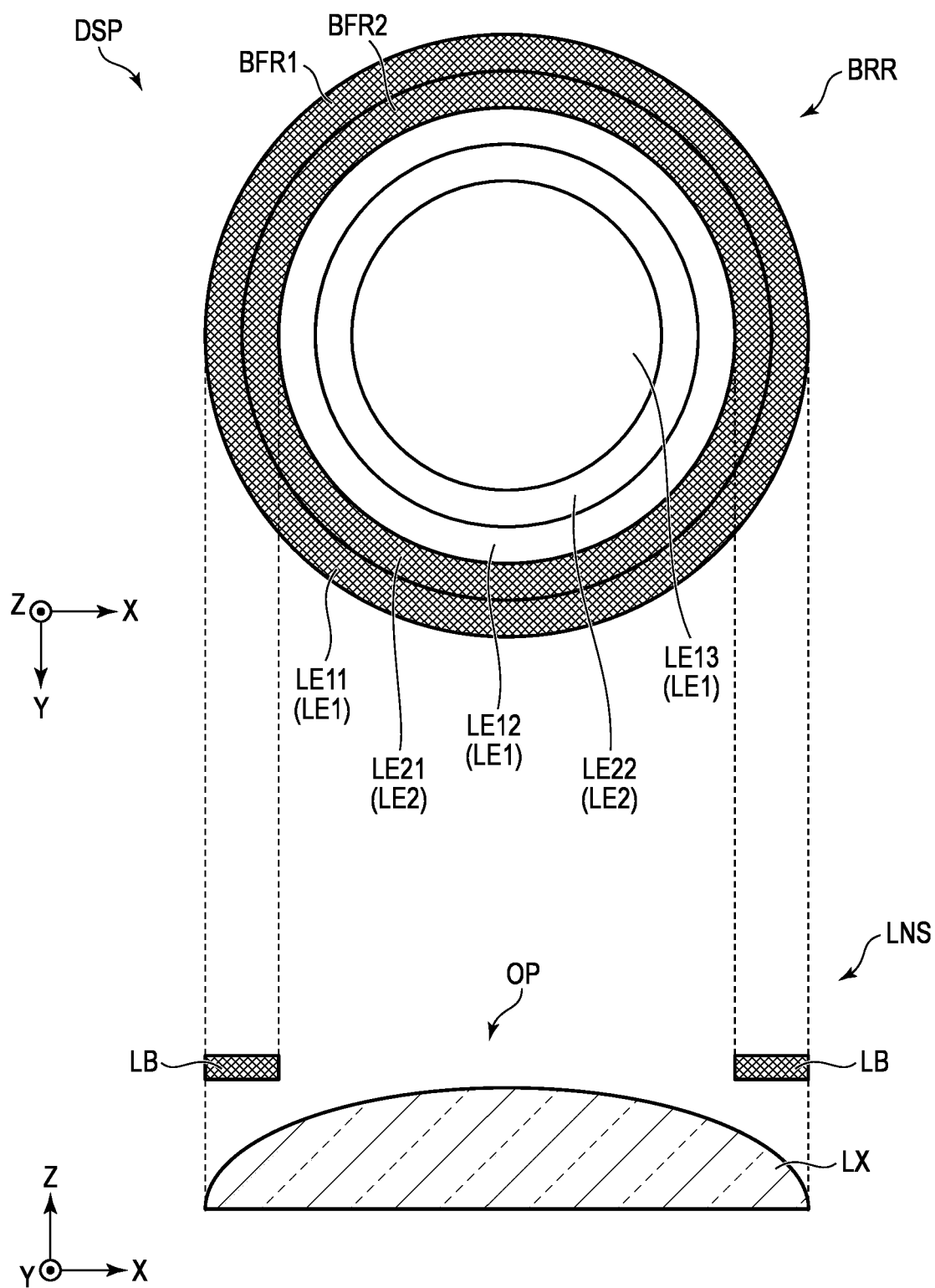
F I G. 37

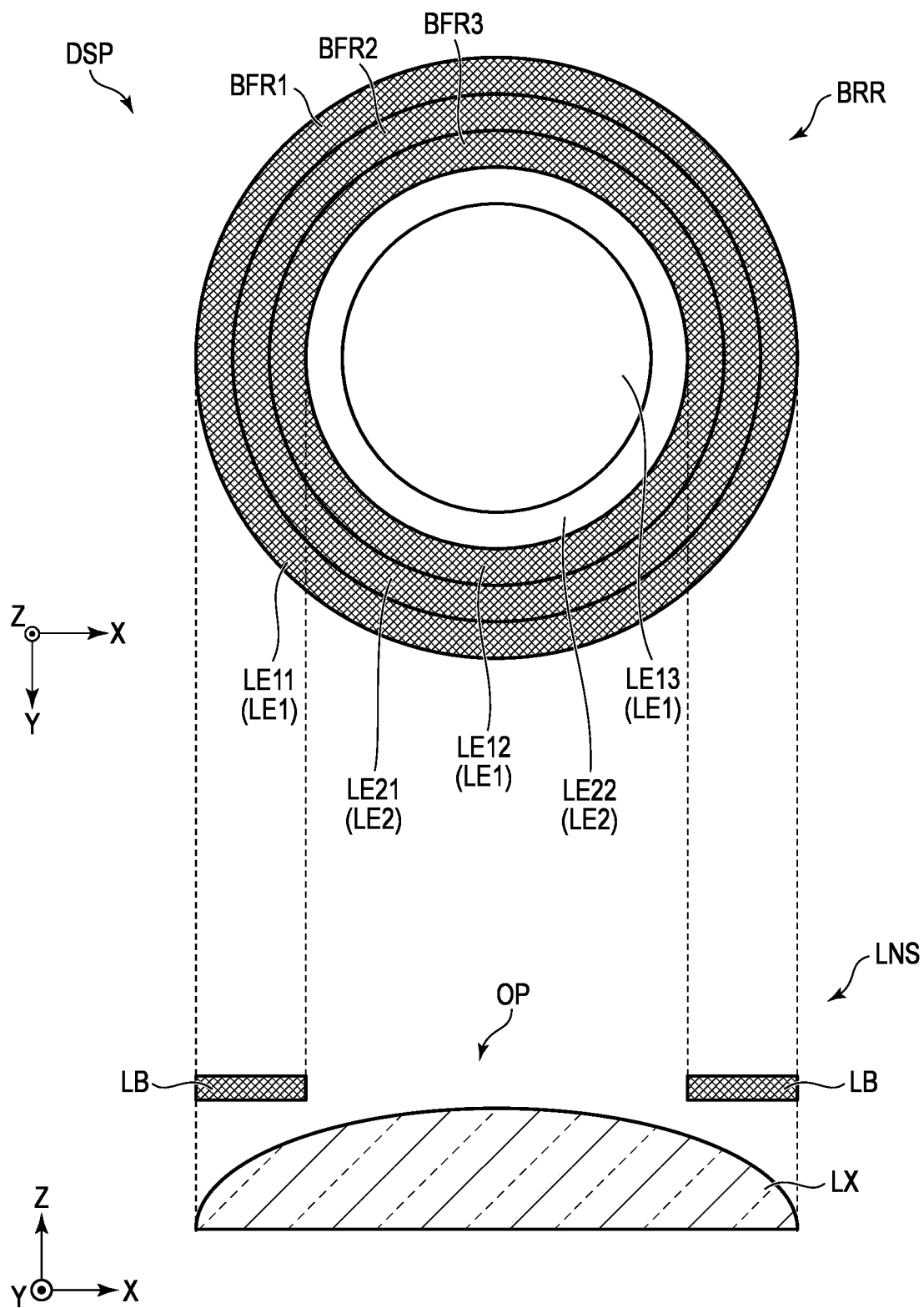
F I G. 38

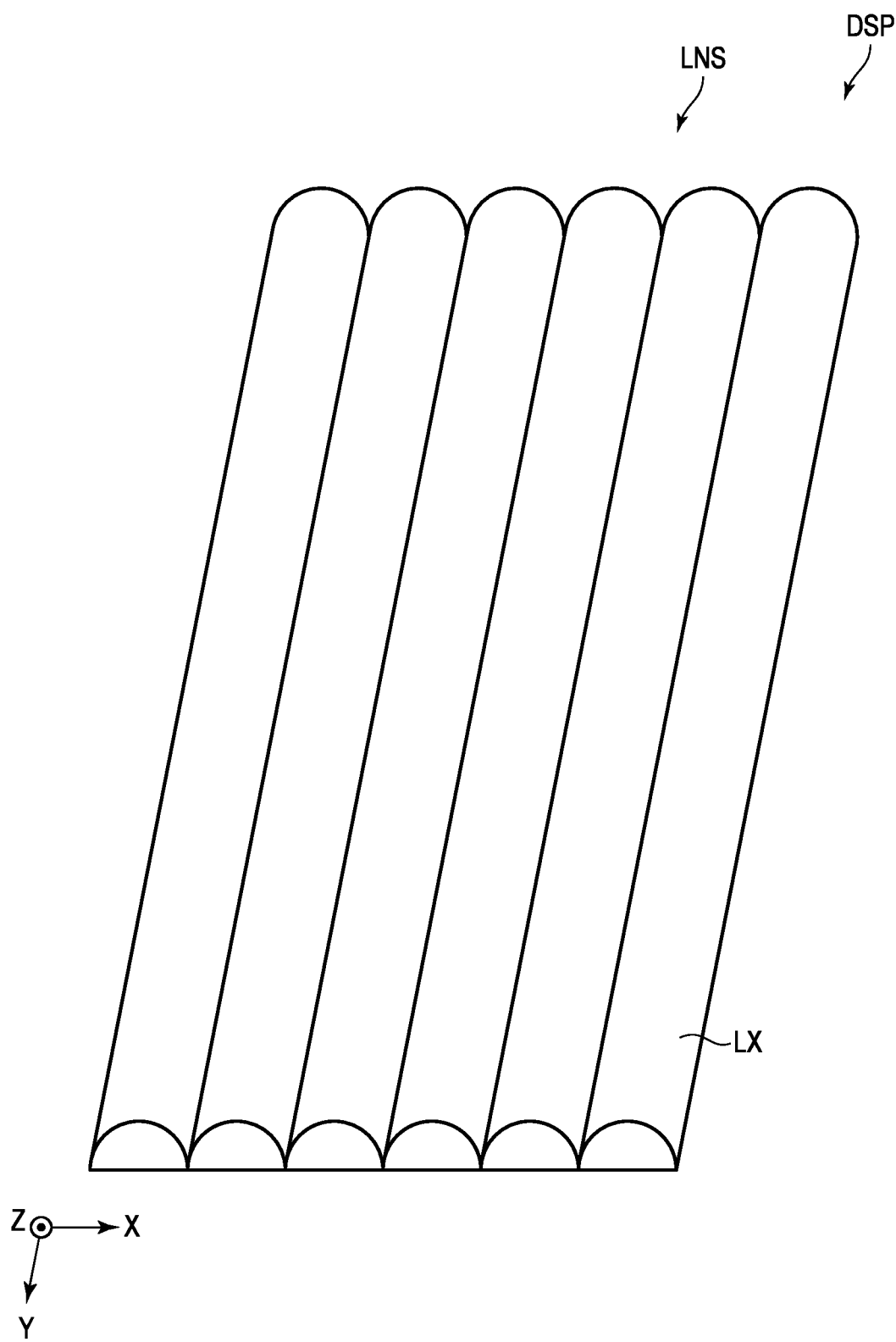
F I G. 39

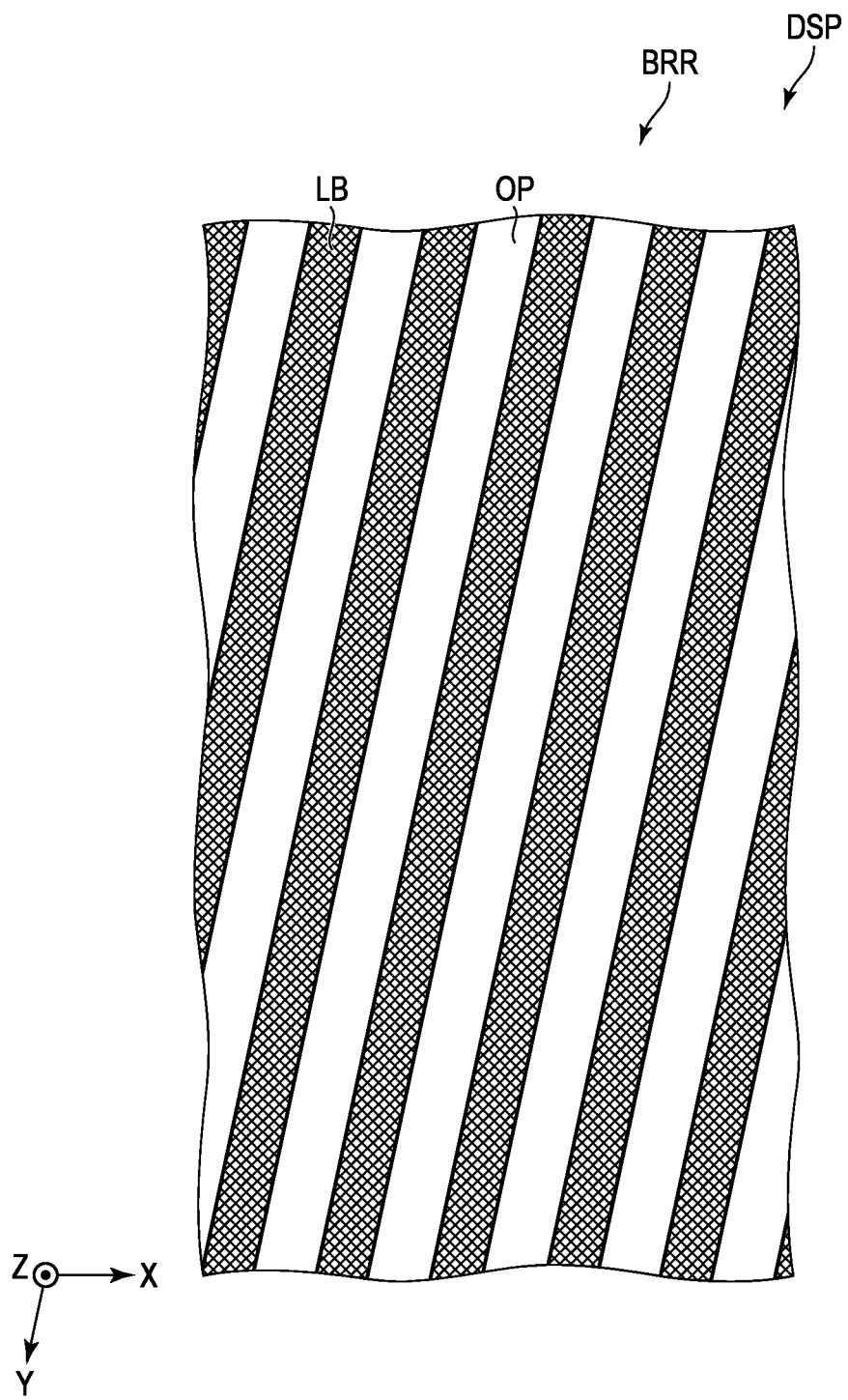
F I G. 40

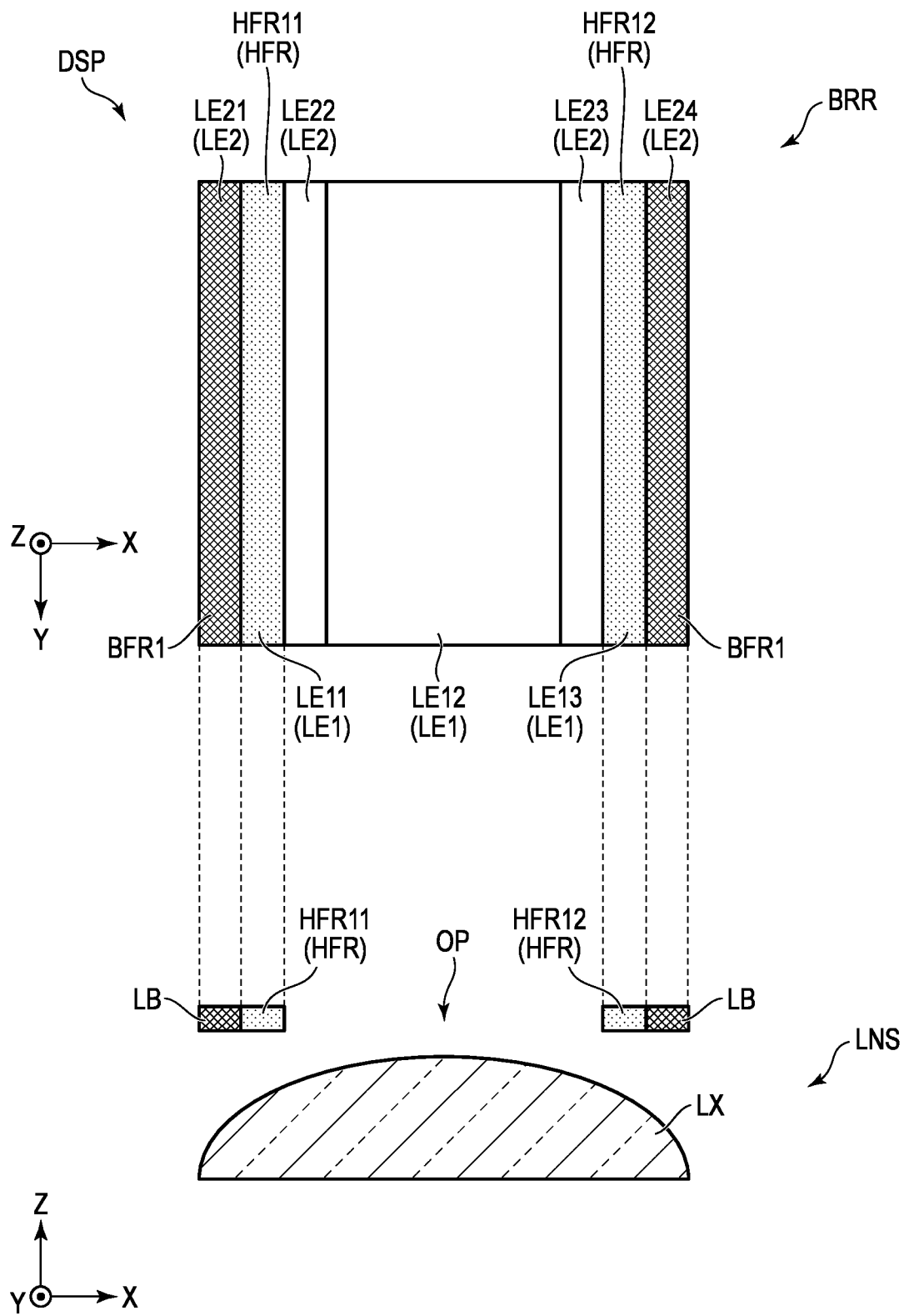
F I G. 45

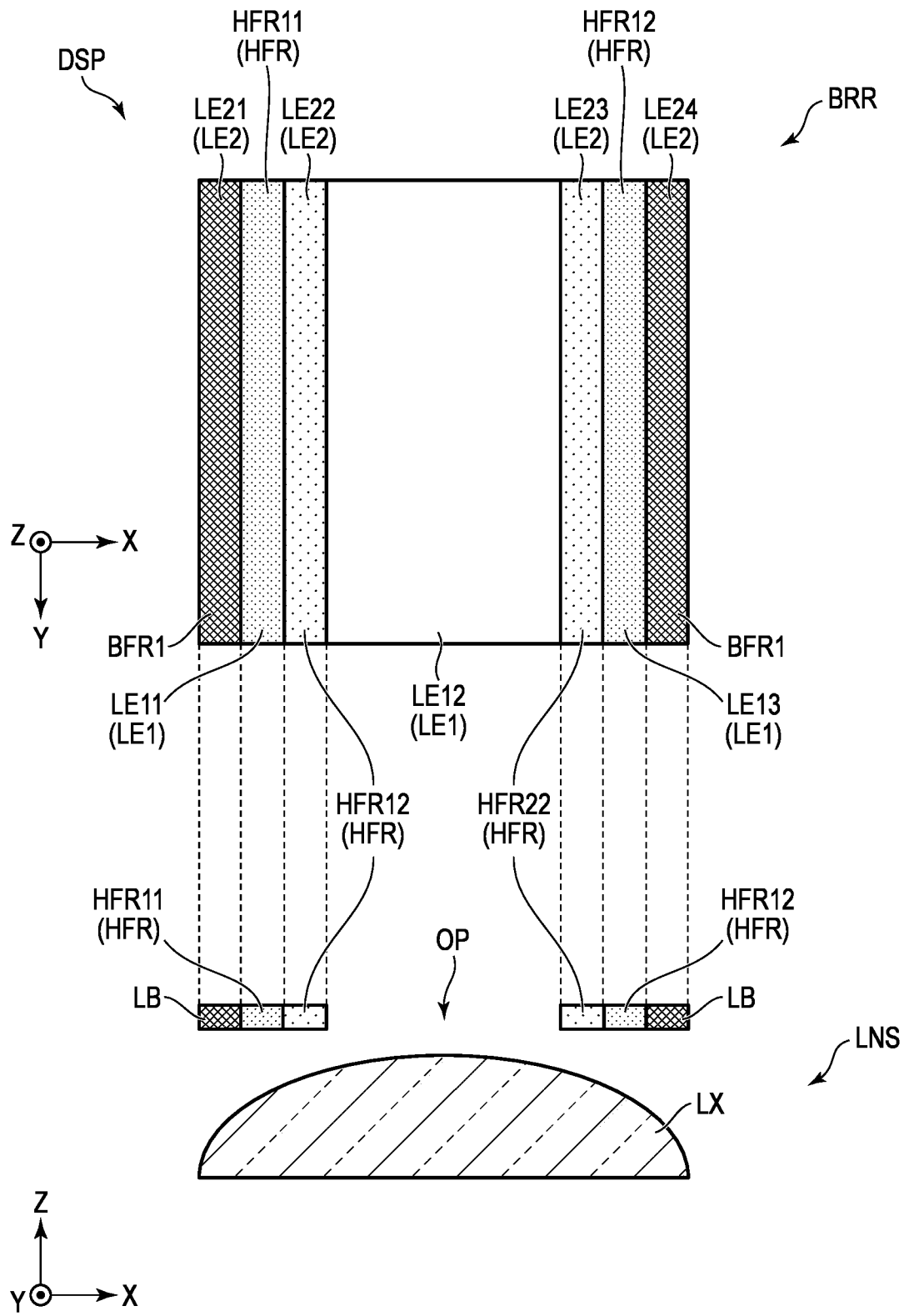
F I G. 46

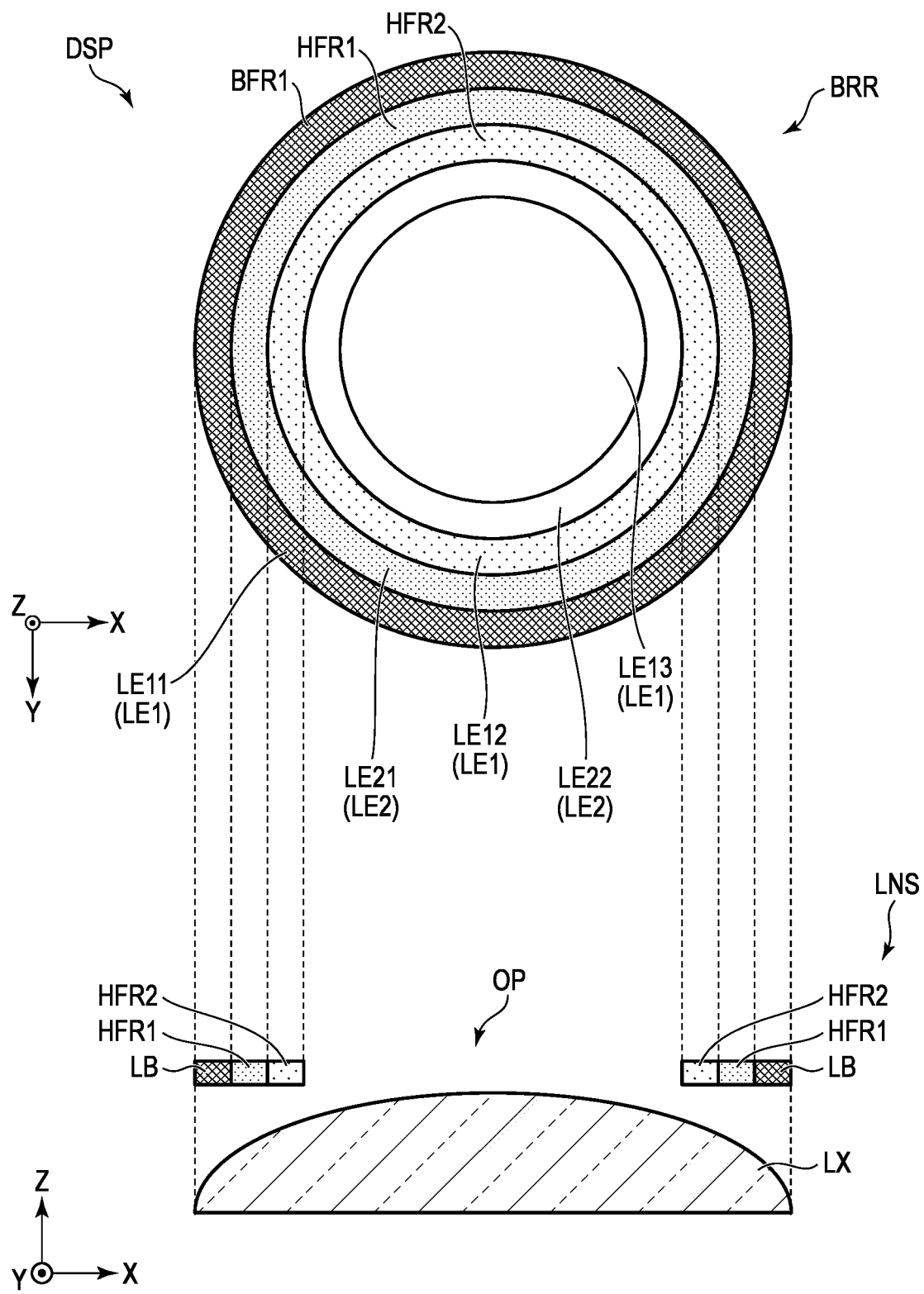
F I G. 47

DISPLAY DEVICE WITH LENS ELEMENT AND BARRIER ELEMENT

CROSS-REFERENCE TO RELATED APPLICATIONS

This application is based upon and claims the benefit of priority from Japanese Patent Application No. 2022-186413, filed Nov. 22, 2022, the entire contents of which are incorporated herein by reference.

FIELD

Embodiments described herein relate generally to a display device.

BACKGROUND

In recent years, various display devices which enable stereoscopic viewing with the naked eye have been developed.

BRIEF DESCRIPTION OF THE DRAWINGS

FIG. 3 is a plan view schematically showing a configuration example of a display panel.

FIG. 4 is a diagram showing a configuration of a pixel.

FIG. 12 shows a cross-sectional view of a display device of a comparative example.

FIG. 13 is a diagram showing a relationship between light passing through a pixel and a lens in the comparative example.

FIG. 14 is a diagram showing a relationship between the light passing through the pixel and the lens in the comparative example.

FIG. 16 is a diagram showing an image formed by the light shown in FIG. 13.

FIG. 17 is a diagram showing an image formed by the light shown in FIG. 14.

FIG. 18 is a diagram showing an image formed by the light shown in FIG. 15.

FIG. 20 is a diagram showing a relationship between the light passing through the pixel and the lens in the embodiment.

FIG. 21 is a diagram showing a relationship between the light passing through the pixel and the lens in the embodiment.

FIG. 27 is a plan view schematically showing a configuration example of a barrier element of the embodiment.

FIG. 28 is a plan view schematically showing a configuration example of the barrier element of the embodiment.

FIG. 32 is a diagram showing a positional relationship between the barrier formation region and the lens.

FIG. 37 is a diagram showing a positional relationship between the barrier formation region and the lens.

FIG. 38 is a diagram showing a positional relationship between the barrier formation region and the lens.

FIG. 39 is a cross-sectional view showing a configuration example of the display device in the embodiment.

FIG. 40 is a cross-sectional view showing a configuration example of the display device in the embodiment.

FIG. 45 is a diagram showing a configuration example of the display device in the embodiment.

FIG. 46 is a diagram showing a configuration example of the display device in the embodiment.

FIG. 47 is a diagram showing a configuration example of the display device in the embodiment.

DETAILED DESCRIPTION

Figure 1:
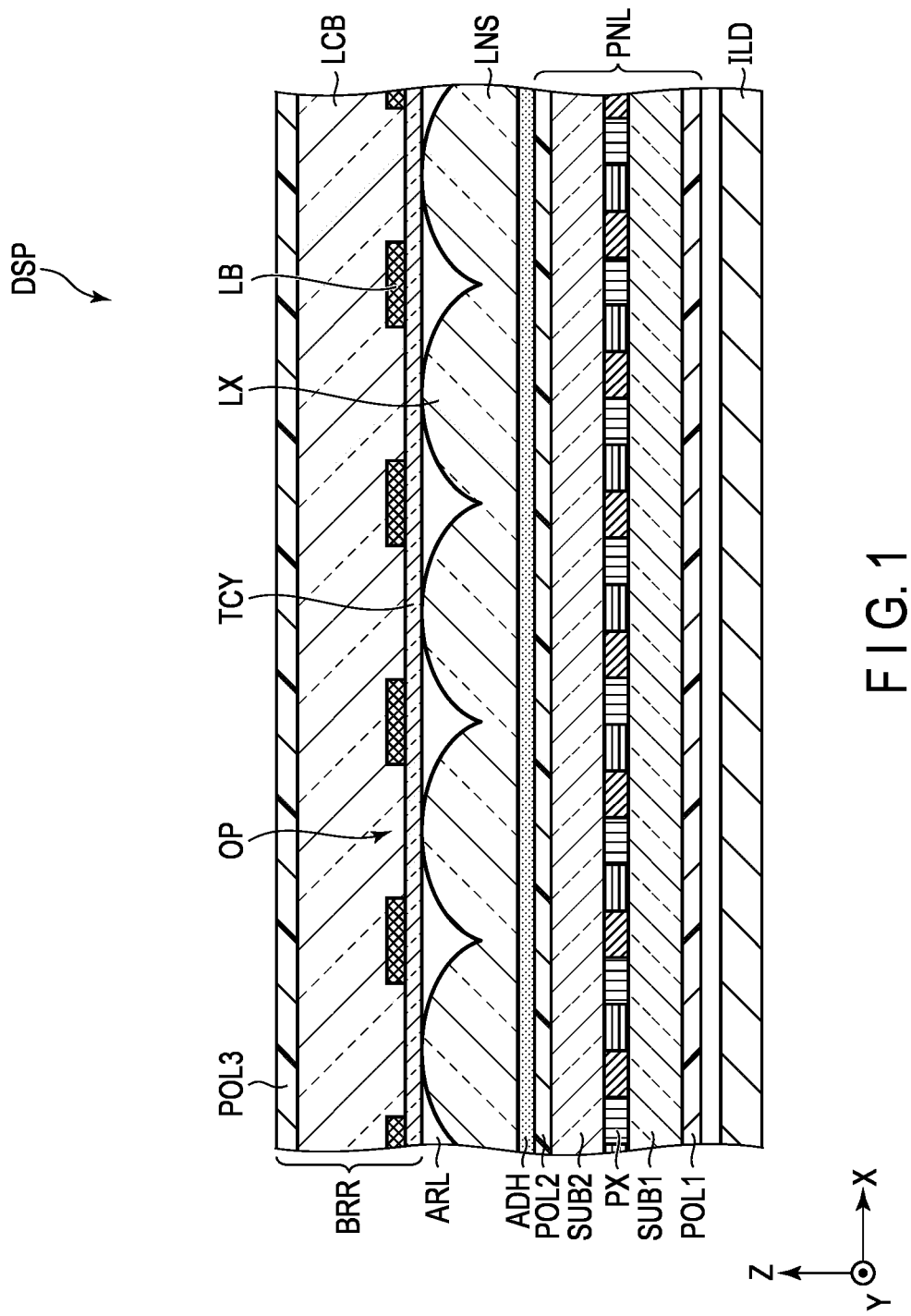
FIG. 1 is a perspective view schematically showing a configuration example of a display device.

In general, according to one embodiment, a display device comprises
a lens element including a plurality of lenses;
a barrier element comprising a liquid crystal layer; and
a display panel, wherein
the lens element is provided between the display panel and the barrier element,
the barrier element comprises a first substrate, a second substrate,
the liquid crystal layer is provided between the first substrate and the second substrate,
the first substrate comprises
a plurality of first electrodes,
an insulating layer which covers the plurality of first electrodes, and
a plurality of second electrodes provided on the insulating layer, and
the second substrate comprising a third electrode.

According to another embodiment, a display device comprises
a display panel;
a barrier element opposing the display panel; and
a lens element located between the display panel and the barrier element, wherein
the barrier element comprises a first substrate, a second substrate, and a liquid crystal layer located between the first substrate and the second substrate,
the first substrate comprises a plurality of first electrodes and a plurality of second electrodes located between the plurality of first electrodes and the liquid crystal layer,
the second substrate includes one third electrode which overlaps the plurality of first electrodes and the plurality of second electrodes,
the plurality of first electrodes include a plurality of first annular electrodes having annular shapes and sizes different from each other,
the plurality of second electrodes include a plurality of second annular electrodes having annular shapes and sizes different from each other, and
the plurality of first annular electrodes and the plurality of second annular electrodes are arranged alternately.

According to still another embodiment, a display device comprises
a lens; and
a barrier element opposing the lens, wherein
the barrier element comprises a liquid crystal layer, a plurality of first electrodes and a plurality of second electrodes located between the plurality of first electrodes and the liquid crystal layer,
the plurality of first electrodes include a plurality of first annular electrodes having annular shapes and sizes different from each other,
the plurality of second electrodes include a plurality of second annular electrodes having annular shape and sizes different from each other, and
the plurality of first annular electrodes and the plurality of second annular electrodes are arranged alternately.

An object of this embodiment is to provide a display device which can prevent the occurrence of multiple images.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90°. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

Embodiment

FIG. 1 is a cross-sectional view schematically showing a configuration example of a display device. A display device DSP shown in FIG. 1 comprises an illumination device ILD, a display panel PNL, an adhesive ADH, a lens element LNS and a barrier element BRR.

The display device DSP is a light field display. When viewing an object, the viewer sees the object when the light reflected from a surface of the object reaches the eyes. On the other hand, a light field display reproduces such reflected light as described above by controlling the emitted light from the display screen showing images. In other words, even in the case of an image of an object displayed on a flat-panel display, reflected light similar to that emitted from the actual object in each direction can be reproduced from emission light from the display screen. With this mechanism, the viewer looking at the display screen feels as if the object is real at one or more viewpoints with respect to the display screen.

Generally, displays achieve a wide viewing angle by diffusing the same light (luminance and color) in all directions as much as possible. On the other hand, light field displays achieve stereoscopic viewing by limiting the direction of light extraction for each pixel. In order to limit the extraction direction of light, for example, the angle of light is limited by a light-shielding barrier or the diffused light is made parallel by a lens. The display device DSP of the embodiment uses a lens to limit the extraction direction of light.

The illumination device ILD can be, for example, a backlight comprising a light source element, a light guide and a diffuser plate. The optical element can be, for example, a light emitting diode (LED), a laser diode or the like. Further, in addition to the light guide and diffusion plate, other optical elements may as well be provided.

The display panel PNL comprises a first substrate SUB1, a second substrate SUB2, a liquid crystal layer (not shown) provided between the first substrate SUB1 and the second substrate SUB2, a polarizer POL1, and a polarizer POL2. The first substrate SUB1 is provided with a plurality of pixel circuits that drive the liquid crystal layer. The second substrate SUB2 or the first substrate SUB1 is provided with a plurality of color filters. The plurality of pixel circuits, the liquid crystal layer and a plurality of color filters constitute a plurality of respective pixels PX. The plurality of pixels PX include pixels PXR emitting a red color, pixels PXG emitting a green color and pixels PXB emitting a blue color. Each pixel PXR, each pixel PXG and each pixel PXB are arranged in this order along the first direction X.

The polarizer POL1 is provided to be adjacent to the illumination device ILD and in contact with the first substrate SUB1. The polarizer POL2 is provided to be adjacent to the lens element LNS and in contact with the second substrate SUB2.

The lens element LNS is adhered to the display panel PNL by the adhesive ADH. The lens element LNS of the embodiment includes a plurality of lenses LX. The lens element LNS can be formed using a transparent material, for example, a transparent resin material. An example of the transparent resin material is acrylic resin. The lens elements LNS may as well be formed using a transparent member that does not change the phase difference of the light that passes therethrough, for example, a glass material. It is also possible to employ a liquid crystal lens as the lens element LNS. In this embodiment, each of the plurality of lenses LX is a lenticular lens. The lenses LX each has a lens shape in the X-Z plane and are extended along the second direction Y.

In the display device DSP of this embodiment, the extraction direction of image light emitted from the pixels PX is limited by the lens element LNS. The lenses LX of the lens element LNS do not shield the video light and the extracted light can be used efficiently. With this configuration, it is possible to obtain a display device with high brightness.

The barrier element BRR is provided on the lens element LNS while interposing an air layer ARL therebetween. The barrier element BRR comprises a transparent conductive layer TCY, a liquid crystal element LCB and a polarizer POL3. As will be described in detail later, a plurality of light-shielding regions LB are formed in the liquid crystal element LCB. Each of the plurality of light-shielding regions LB is provided to overlap between vertices of the plurality of lenses LX. In other words, the light-shielding regions LB are provided to overlap an end portion of one lens LX. The area between each adjacent pair of light-shielding regions LB is defined as an aperture OP. One aperture OP is provided for one lens LX.

The lens element LNS is provided above the display panel PNL. The barrier element BRR is provided above the lens element LNS. In other words, the lens element LNS is provided between the display panel PNL and the barrier element BRR.

Illumination light emitted from the illumination device ILD enters the display panel PNL. The display panel PNL displays images by modulating the entering illumination light by the pixels PX of the display panel PNL. The displayed images are emitted upward as an image light and adjusted into parallel light by the lens element LNS.

In FIG. 1, the display panel PNL drives the liquid crystal layer with a lateral electric field, for example, by the fringe field switching (FFS) mode. On the other hand, in the barrier element BRR, the liquid crystal layer is driven by a vertical electric field, for example, by the twisted nematic (TN) mode.

Figure 2:
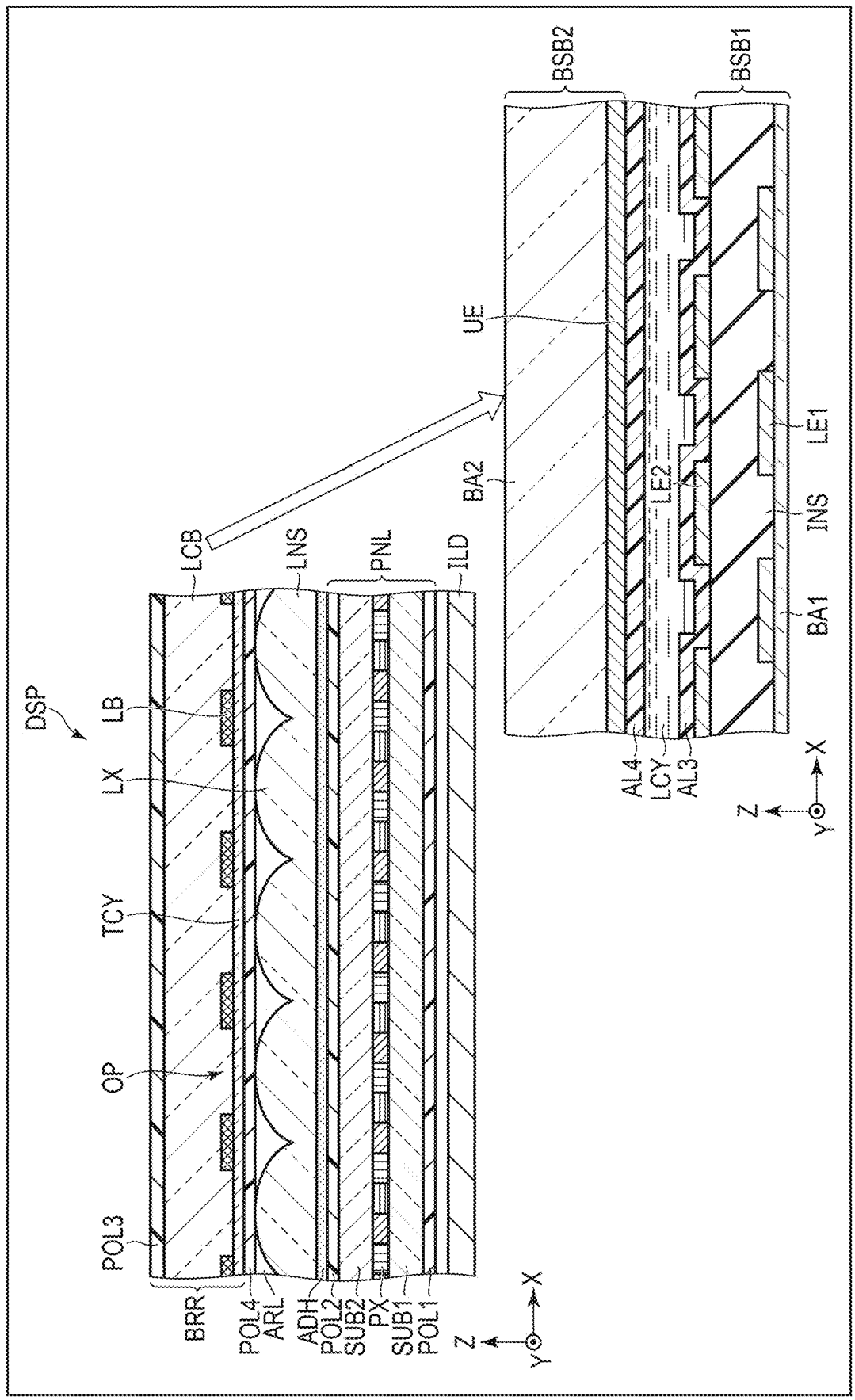
FIG. 2 is a cross-sectional view schematically showing a configuration example of the display device.

FIG. 2 is a cross-sectional view schematically showing a configuration example of the display device. The configuration example shown in FIG. 2 is different from that of FIG. 1 in that the barrier element BRR comprises a polarizer POL4.

The polarizer POL4 is provided in contact with the transparent conductive layer TCY. The polarizer POL4 is provided between the transparent conductive layer TCY and the lenses LX.

FIG. 3 is a plan view schematically showing a configuration example of the display panel. In the display panel PNL shown in FIG. 3, a plurality of scanning lines GL1, GL2, . . . are connected to a scanning line drive circuit GD. A plurality of signal lines SL1, SL2, . . . are connected to a signal line drive circuit SD. The scanning lines GL and the signal lines SL may not necessarily have to extend linearly, but some of them may be bent. For example, the signal lines SL are supposed to extend in the second direction Y even if part thereof is bent.

The common electrode CE is connected to a voltage supplier CD of a common voltage (Vcom) and is arranged over a plurality of pixels PX.

FIG. 4 is a diagram showing a configuration of a single pixel. Each of the pixels PX comprises a switching element SW, a pixel electrode PE, a common electrode CE, a liquid crystal layer LC and the like. The switching element SW is formed from a thin-film transistor (TFT), for example. The TFT of the switching element SW is electrically connected to the respective scanning line GL and the respective signal line SL.

The scanning lines GL are each connected to a plurality of pixels PX aligned along the first direction X. More specifically, the scanning lines GL are each electrically connected to a gate electrode GE of the switching element SW in each of those pixels PX. The signal lines SL are each connected to a plurality of pixels PX aligned along the second direction Y. More specifically, the signal lines SL are each electrically connected to a source electrode SE of the switching element SW in each of these pixels PX.

The pixel electrode PE is electrically connected to the drain electrode DE of the switching element SW. Each of the pixel electrodes PE is opposite to the common electrode CE. The liquid crystal layer LC is driven by an electric field generated between the pixel electrode PE and the common electrode CE. For example, between an electrode having the same potential as that of the common electrode CE and an electrode having the same potential as that of the pixel electrode PE, a storage capacitor CS is formed.

Figure 5:
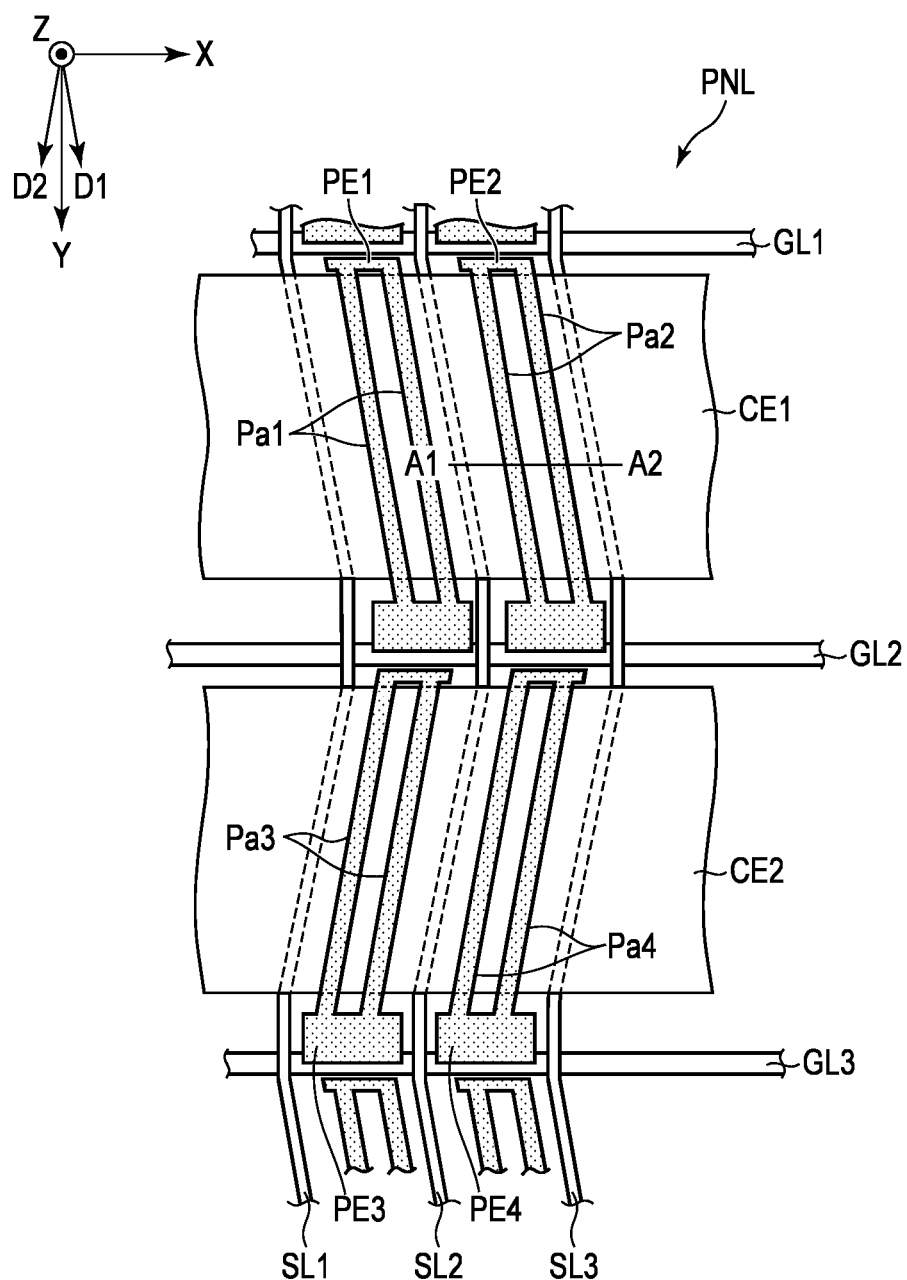
FIG. 5 is a plan view showing an example of layout of pixels.

FIG. 5 is a plan view showing an example of layout of the pixels. The scanning lines GL1 to GL3 extend linearly along the first direction X and are arranged to be spaced apart from each other along the second direction Y. The signal lines SL1 to SL3 each extend substantially along the second direction Y and are arranged to be spaced apart from each other along the first direction X.

The pixel electrode PE1 and the pixel electrode PE2 are disposed between the scanning line GL1 and the scanning line GL2. The pixel electrode PE1 and the pixel electrode PE2 are aligned along the first direction X. The pixel electrode PE3 and the pixel electrode PE4 are located between the scanning line GL2 and the scanning line GL3. The pixel electrode PE3 and the pixel electrode PE4 are aligned along the first direction X. The pixel electrode PE1 and the pixel electrode PE3 are disposed between the signal line SL1 and the signal line SL2. The pixel electrode PE2 and the pixel electrode PE4 are disposed between the signal line SL2 and the signal line SL3.

In FIG. 5, a direction that intersects the second direction Y counterclockwise thereto at an acute angle is defined as a direction D1, whereas a direction that intersects the second direction Y clockwise thereto at an acute angle is defined as a direction D2. Note that an angle θ1 made between the second direction Y and the direction D1 is substantially the same as an angle θ2 made between the second direction Y and the direction D2.

The pixel electrode PE1 and the pixel electrode PE2 include a strip electrode Pa1 and a strip electrode Pa2, respectively, each extending along the direction D1. The pixel electrode PE3 and the pixel electrode PE4 include a strip electrode Pa3 and a strip electrode Pa4, respectively, each extending along direction D2. In the illustrated example, there are two of each of the strip electrodes Pa1 to Pa4 provided, but there may be one strip electrode or three or more strip electrodes of each.

The common electrode CE1 is disposed to overlap the signal line SL1 to the signal line SL3. The pixel electrode PE1 and the pixel electrode PE2 are disposed to overlap the common electrode CE1. The common electrode CE2 is disposed to overlap the signal lines SL1 to the signal line SL3. The pixel electrode PE3 and the pixel electrode PE4 are disposed to overlap the common electrode CE2. The common electrode CE2 is disposed to be spaced apart from the common electrode CE1 along the second direction Y so as to be electrically insulated therefrom. In the illustrated example, the scanning line GL2 is located between the common electrode CE1 and the common electrode CE2.

Figure 6:
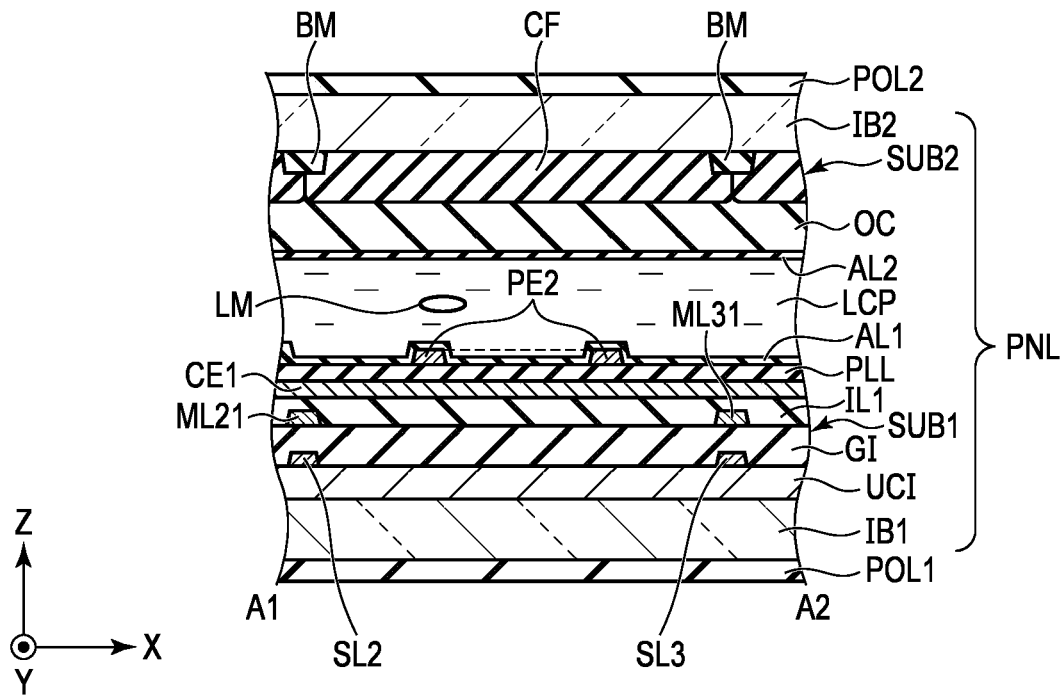
FIG. 6 is a cross-sectional view of the display panel taken along line A1-A2 shown in FIG. 5.

FIG. 6 is a cross-sectional view of the display panel taken along line A1-A2 shown in FIG. 5. The example illustrated here corresponds to an example in which the FFS mode, one of the display modes that utilize a lateral electric field, is applied. The display panel PNL comprises a first substrate SUB1, a second substrate SUB2 and a liquid crystal layer LCP.

The first substrate SUB1 comprises an insulating base IB1, a signal line SL2 and a signal line SL3, a metal wiring line ML21 and a metal wiring line ML31, a common electrode CE1, a pixel electrode PE2, an alignment film AL1 and the like.

The insulating base IB1 is formed of a translucent material such as glass or a flexible resin material. The insulating layer UC1 is disposed on the insulating base IB1.

The signal line SL2 and the signal line SL3 are located on the insulating layer UC1 and covered by the insulating layer GI. Note that the signal line SL2 and the signal line SL3 are located in the same layer as the other signal line SL1 and the like, which are not shown in the figure. The signal line SL2 and the signal line SL3 are formed of a metal material such as aluminum (Al), titanium (Ti), silver (Ag), molybdenum (Mo), tungsten (W), copper (Cu) or chromium (Cr), or an alloy of any combination of these metal materials, and may be of a single-layer structure or a multilayered stacked structure. For example, the signal line SL2 and the signal line SL3 are each of a stacked body in which titanium (Ti), aluminum (Al) and titanium (Ti) are stacked in the order.

The metal wiring line ML21 and the metal wiring line ML31 are located on the insulating layer GI and covered by the insulating layer ILI. The metal wiring line ML21 is located directly above the signal line SL2 and the metal wiring line ML31 is located directly above the signal line SL3. The metal wiring line ML21 and the metal wiring line ML31 are formed of any of the above-listed metal materials or alloy of any combination of the above-listed metal materials, and may be of a single-layer structure or a multilayered stacked structure. For example, the metal wiring line ML21 and the metal wiring line ML31 are each a stacked structure in which titanium (Ti), aluminum (Al) and titanium (Ti) are stacked in the order, or a stacked structure in which molybdenum (Mo), aluminum (Al) and molybdenum (Mo) are stacked in the order.

The common electrode CE1 is located on the insulating layer ILI and covered by the insulating layer PLL. The common electrode CE1 is a transparent electrode formed of a transparent conductive material such as indium tin oxide (ITO) or indium zinc oxide (IZO).

The pixel electrode PE2 is located on the insulating layer PLL and covered by the alignment film AL1. The pixel electrode PE2 is a transparent electrode formed of a transparent conductive material such as ITO or IZO.

The insulating layer UC1, the insulating layer GI, the insulating layer ILI and the insulating layer PLL are each an inorganic insulating layer formed of an inorganic insulating material such as silicon oxide, silicon nitride or silicon oxynitride, and each may be of a single-layer structure or a multilayered stacked structure. The insulating layer GI, the insulating layer ILI and the insulating layer PLL each may be an organic insulating layer formed of, for example, an organic insulating material such as acrylic resin. Alternatively, they may as well be a stacked layer of any of the above-listed inorganic insulating layers and the above-listed organic insulating layers.

The second substrate SUB2 comprises an insulating base IB2, light-shielding layers BM, color filters CF, an overcoat layer OC, an alignment film AL2 and the like.

As in the case of the insulating base IB1, the insulating base IB2 is formed of a translucent material such as glass or a resin material. The light-shielding layers BM and the color filters CF are provided on a surface of the insulating base IB2, which opposes the first substrate SUB1.

Each of the color filters CF is disposed at a location opposing the respective pixel electrode PE2 so as to partially overlap the respective light-shielding layer BM. The color filters CF includes red, green and blue color filters, respectively. The overcoat layer OC covers the color filters CF. The overcoat layer OC is formed of a transparent resin.

The alignment film AL2 covers the overcoat layer OC. The alignment film AL1 and the alignment film AL2 are formed, for example, of a material which exhibits horizontal alignment property. The first substrate SUB1 and the second substrate SUB2 described above are arranged so that the alignment film AL1 and the alignment film AL2 oppose each other.

The liquid crystal layer LCP is located between the first substrate SUB1 and the second substrate SUB2 and is held between the alignment film AL1 and the alignment film AL2. The liquid crystal layer LCP comprises liquid crystal molecules LM. The liquid crystal layer LC is constituted by a positive type liquid crystal material (the dielectric anisotropy being positive) or a negative type liquid crystal material (the dielectric anisotropy being negative).

The polarizer POL1 is adhered to an insulating base IB1. The polarizer POL2 is adhered to an insulating base IB2. Note that, in addition to the polarizer POL1 and the polarizer POL2, a retardation film, a scattering layer, an antireflection layer or the like may be provided as necessary.

In such a display panel PNL, in an off state, in which no electric field is formed between the pixel electrode PE and the common electrode CE, the liquid crystal molecules LM are initially aligned in a predetermined direction between the alignment film AL1 and the alignment film AL2. In such an off state, light irradiated from the illumination device ILD toward the display panel PNL is absorbed by the polarizer POL1 and the polarizer POL2, resulting in dark display.

On the other hand, in an on state, in which an electric field is formed between the pixel electrode PE and the common electrode CE, the liquid crystal molecules LM are aligned in a direction different from the initial alignment direction by the electric field, and the alignment direction is controlled by the electric field. In such an on state, part of the light from the illumination device ILD passes through the polarizer POL1 and the polarizer POL2, resulting in bright display.

Figure 7:
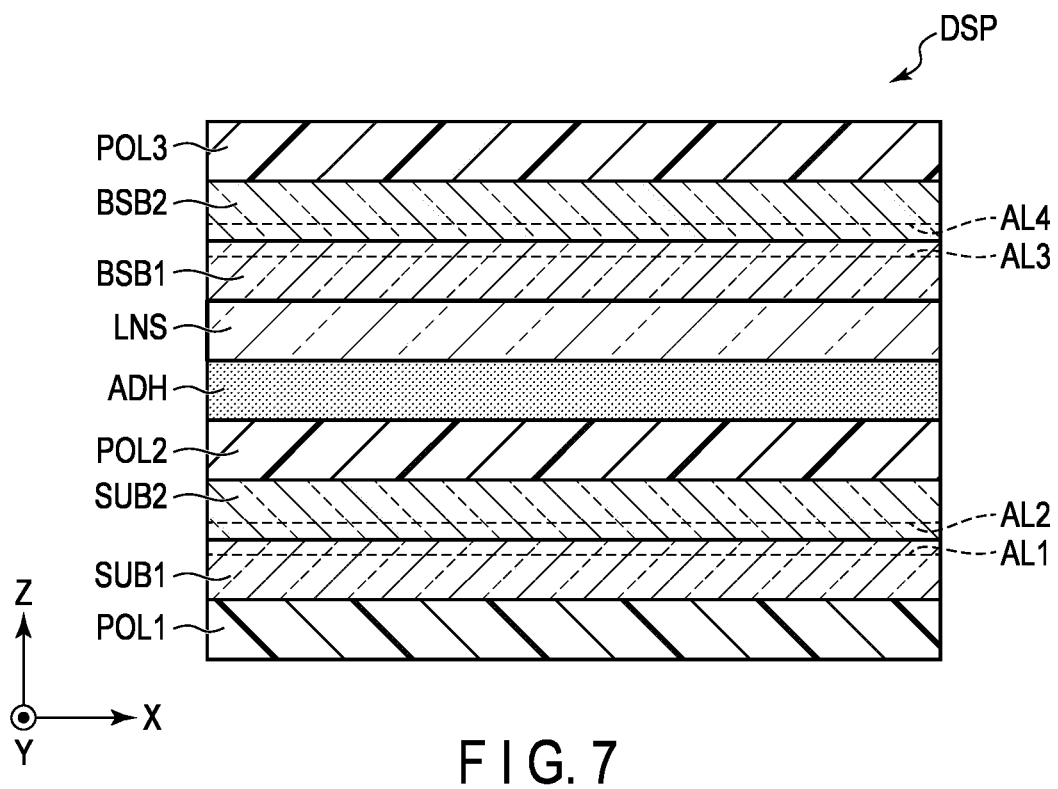
FIG. 7 is a cross-sectional view showing a multilayered stacked structure of the display device.

FIG. 7 is a cross-sectional view of a stacked structure of a display device. A display device DSP shown in FIG. 7 corresponds to the display device DSP shown in FIG. 1. The display device DSP shown in FIG. 7 comprises a polarizer POL1, a first substrate SUB1, a second substrate SUB2, a polarizer POL2, an adhesive ADH, a lens element LNS, a substrate BSB1, a substrate BSB2 and a polarizer POL3 along the third direction Z.

On the first substrate SUB1, the alignment film AL1 is provided. The second substrate SUB2 is provided with the alignment film AL2. The substrate BSB1 is provided with the alignment film AL3. The substrate BSB2 is provided with the alignment film AL4.

Figure 8:
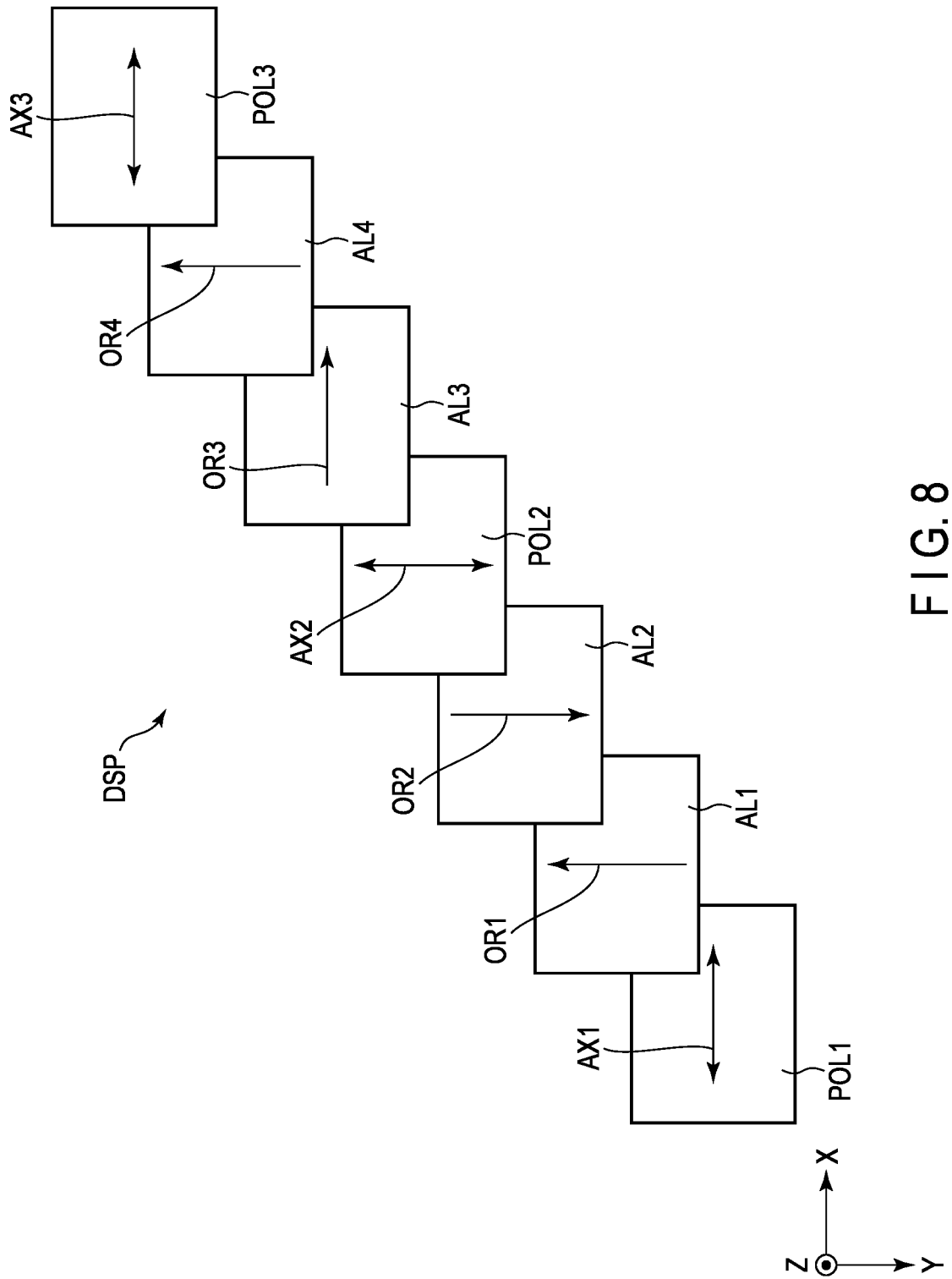
FIG. 8 is a diagram illustrating an initial alignment direction of an alignment film of the display device shown in FIG. 7 and a transmission axis of a polarizer thereof.

FIG. 8 is a diagram illustrating the initial alignment direction of the alignment film and the transmission axis of the polarizer of the display device shown in FIG. 7. In FIG. 8, only the polarizer POL1, the alignment film AL1, the alignment film AL2, the polarizer POL2, the alignment film AL3, the alignment film AL4 and the polarizer POL3 are shown. FIG. 8 shows each of these structural components as viewed in plan view.

A transmission axis AX1 of the polarizer POL1 is along the first direction X and a direction opposite thereto. An initial alignment direction OR1 of the alignment film AL1 is along the opposite direction of the second direction Y. The initial alignment direction OR2 of the alignment film AL2 is along the second direction Y. A transmission axis AX2 of the polarizer POL2 is along the second direction Y and a direction opposite thereto.

An initial alignment direction OR3 of the alignment film AL3 is along the first direction X. An initial alignment direction OR4 of the alignment film AL4 is along the second direction Y and a direction opposite thereto. A transmission axis AX3 of the polarizer POL3 is along the first direction X and a direction opposite thereto.

The initial alignment direction OR1 of the alignment film AL1 and the initial alignment direction OR2 of the alignment film AL2 are opposite to each other. The transmission axis AX1 of the polarizer POL1 and the transmission axis AX2 of the polarizer POL2 are orthogonal to each other. The initial alignment direction OR3 of the alignment film AL3 and the initial alignment direction OR4 of the alignment film AL4 are orthogonal to each other. The transmission axis AX3 of the polarizer POL3 and the transmission axis AX2 of the polarizer POL2 are orthogonal to each other.

Figure 9:
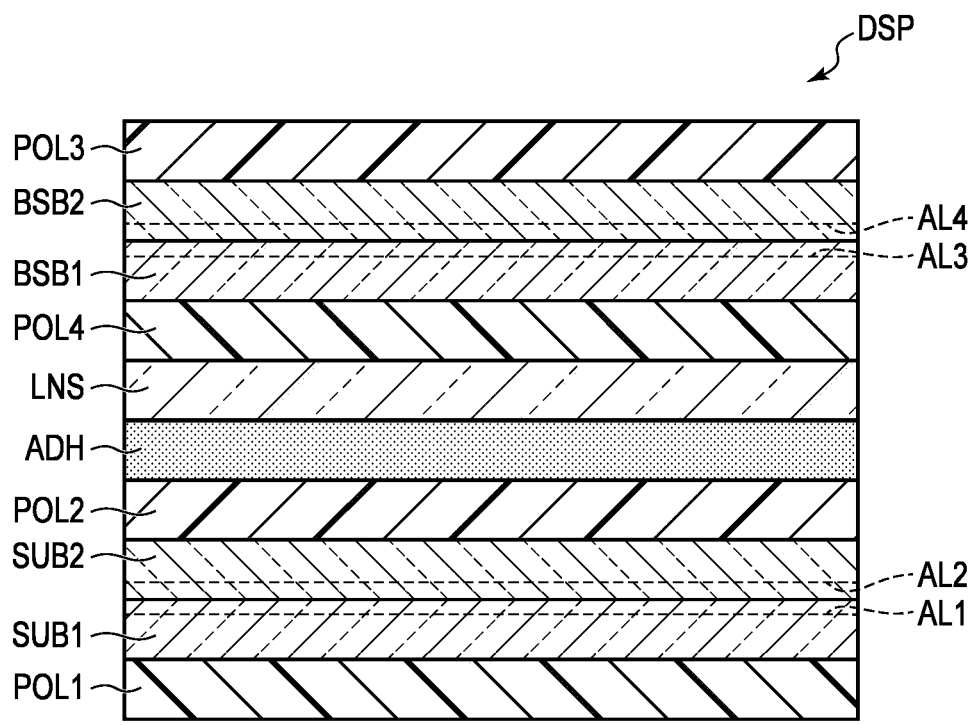
FIG. 9 is a cross-sectional view showing a stacked structure of the display device.

FIG. 9 is a cross-sectional view of a stacked structure of the display device. A display device DSP shown in FIG. 9 corresponds to the display device DSP shown in FIG. 2. The display device DSP shown in FIG. 9 comprises a polarizer POL1, a first substrate SUB1, a second substrate SUB2, a polarizer POL2, an adhesive ADH, a lens element LNS, a polarizer POL4, a substrate BSB1, a substrate BSB2 and a polarizer POL3 along the third direction Z.

Figure 10:
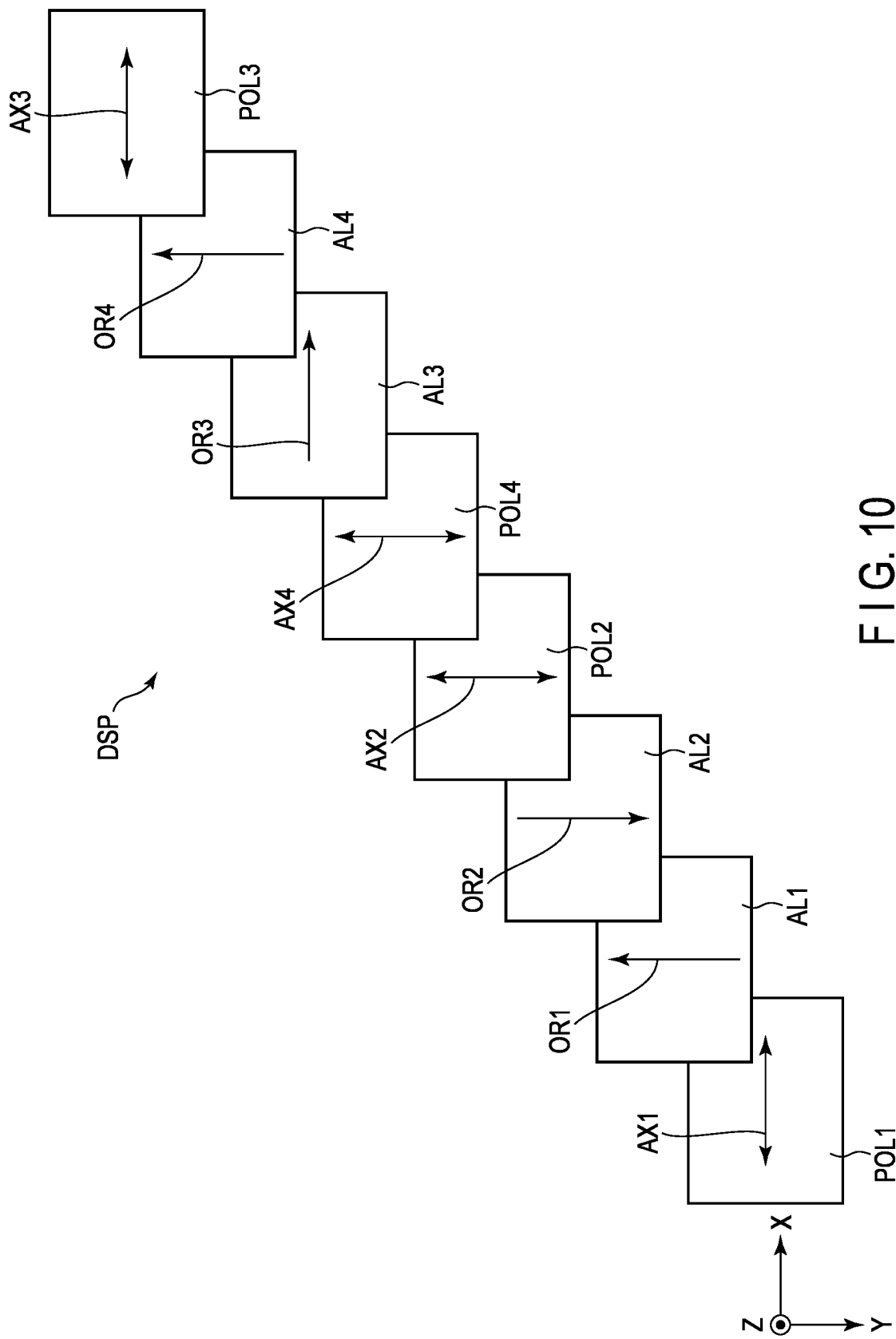
FIG. 10 is a diagram illustrating an initial alignment direction of an alignment film of the display device shown in FIG. 9 and a transmission axis of a polarizer thereof.

FIG. 10 illustrates the initial alignment direction of the alignment film and the transmission axis of the polarizer of the display device shown in FIG. 9. In FIG. 10, only the polarizer POL1, the alignment film AL1, the alignment film AL2, the polarizer POL2, the polarizer POL4, the alignment film AL3, the alignment film AL4 and the polarizer POL3 are shown. FIG. 10 illustrates each of these components as viewed in plan view.

The transmission axis AX1 of the polarizer POL1 is along the first direction X and a direction opposite thereto. The initial alignment direction OR1 of the alignment film AL1 is along the opposite direction of the second direction Y. The initial alignment direction OR2 of the alignment film AL2 is along the second direction Y. The transmission axis AX2 of the polarizer POL2 is along the second direction Y and a direction opposite thereto.

The transmission axis of the polarizer POL4 is along the second direction Y and a direction opposite thereto. The initial alignment direction OR3 of the alignment film AL3 is along the first direction X. The initial alignment direction OR4 of the alignment film AL4 is along the second direction Y and a direction opposite thereto. The transmission axis AX3 of the polarizer POL3 is along the first direction X and a direction opposite thereto.

The initial alignment direction OR1 of the alignment film AL1 and the initial alignment direction OR2 of the alignment film AL2 are opposite to each other. The transmission axis AX1 of the polarizer POL1 and the transmission axis AX2 of the polarizer POL2 are orthogonal to each other. The initial alignment direction OR3 of the alignment film AL3 and the initial alignment direction OR4 of the alignment film AL4 are orthogonal to each other. The transmission axis AX4 of the polarizer POL4 and the transmission axis AX3 of the polarizer POL3 are orthogonal to each other.

In FIG. 10, the transmission axis AX2 of the polarizer POL2 and the transmission axis AX4 of the polarizer POL4 are parallel to each other. That is, the polarizer POL2 and the polarizer POL4 have the same function. For this reason, only one of the polarizer POL2 and the polarizer POL4 may as well be sufficient without providing both the polarizers POL2 and POL4. FIG. 8 shows an example where only one polarizer is provided out of the polarizer POL2 and the polarizer POL4.

Figure 11:
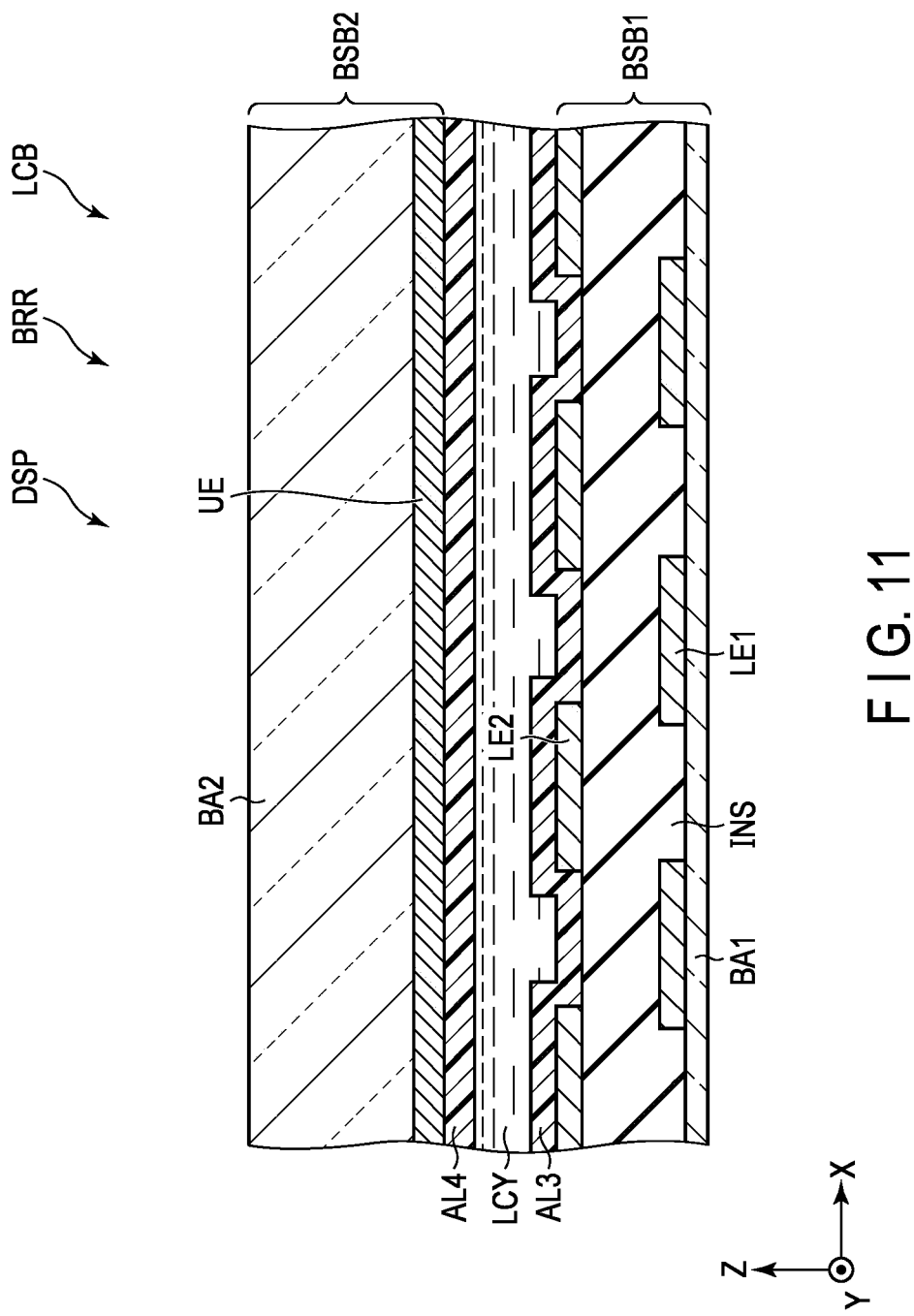
FIG. 11 is a cross-sectional view schematically showing a configuration example of a liquid crystal element contained in a barrier element.

FIG. 11 is a cross-sectional view schematically showing a configuration example of the liquid crystal element included in the barrier element. The liquid crystal element LCB shown in FIG. 11 comprises a substrate BSB1, a substrate BSB2 and a liquid crystal layer LCY provided between the substrate BSB1 and the substrate BSB2.

The substrate BSB1 comprises a substrate BA1, an electrode LE1, an insulating layer INS, an electrode LE2 and an alignment film AL3. The substrate BSB2 comprises a base BA2, an electrode UE and an alignment film AL4.

In the substrate BSB1, a plurality of electrodes LE1 are provided on the base BA1. The insulating layer INS is provided to cover the plurality of electrodes LE1. A plurality of electrodes LE2 are provided on the insulating layer INS. An alignment film AL3 is provided to cover the plurality of electrodes LE2.

The plurality of electrodes LE2 are provided alternately with the plurality of electrodes LE1. Each one electrode LE2 is provided to overlap each respective gap between each respective adjacent pair of electrodes LE1. In reverse, one electrode LE1 is provided to overlap each respective gap between each respective adjacent pair of electrodes LE2. In FIG. 11, four electrodes LE1 and four electrodes LE2 are shown.

In the substrate BSB2, the electrode UE is provided in contact with substrate BA2. The electrode UE is a so-called solid film, and is provided in contact with the entire surface of the substrate BA2. An alignment film AL4 is provided to cover the electrode UE.

The base BAL and the base BA2 can be a transparent base, for example, a glass base or a base made of a transparent resin material. The thickness of the base BAL is less than that of the base BA2. For the base BAL, a thin base may be used, or obtained by forming an electrode or the like, and then polished to reduce the thickness.

The electrode LE1, the electrode LE2 and the electrode UE are each formed of a transparent conductive material. The electrode LE1, the electrode LE2 and the electrode UE are formed using, for example, indium tin oxide (ITO), indium zinc oxide (IZO) or the like.

Further, the lengths (widths) of the electrode LE1 and the electrode LE2 along the first direction X should be, for example, two times or more but three times or less the length (width) of the pixels PX along the first direction X shown in FIG. 1.

For the insulating layer INS, an insulating layer containing silicon, for example, a silicon oxide layer, a silicon nitride layer or a silicon oxide layer containing nitrogen (silicon nitride oxide layer) may be used.

As shown in FIG. 11, in the substrate BSB1, the alignment film AL3 is provided to cover the electrode LE2 and the insulating layer INS. Similarly, in the substrate BSB2 as well, the alignment film AL4 is provided to cover the electrode UE. In other words, it can be said that the liquid crystal layer LCY is interposed between the alignment film AL3 and the alignment film AL4 provided on the substrate BSB1 and the substrate BSB2, respectively. The initial alignment directions of the alignment film AL3 and the alignment film AL4 are as described above.

In the liquid crystal device LCB, by a voltage applied to the electrodes LE1, LE2 and UE, an electric field is generated. As the liquid crystal layer LCY is controlled by the electric field, the light-shielding region LB as shown in FIG. 1 is formed. Note that the aperture OP may be formed to correspond to the electrode to which the voltage is applied, and the light-shielding region LB may be formed to correspond to the electrode to which no voltage is applied. Note that in the liquid crystal element LCB, a positive type twisted nematic (TN) liquid crystal is used. Note here that the liquid crystal element LCB uses the normally white mode, in which light is transmitted when no voltage is applied.

In the barrier element BRR shown in FIG. 1, the transparent conductive layer TCY is provided in contact with the base BAL of the liquid crystal element LCB. The transparent conductive layer TCY can be formed using indium tin oxide (ITO) or indium zinc oxide (IZO), for example. The transparent conductive layer TCY is provided to minimize the distance between the lens element LNS and the barrier element BRR.

The barrier element BRR is provided with a polarizer POL3 in contact with the base BA2 of the liquid crystal element LCB.

FIG. 12 shows a cross-sectional view of a display device of a comparative example. The display device DSPr of the comparative example is different from the display device DSP shown in FIG. 1 in that the barrier element is not provided.

In the display device DSPr, for example, it is assumed that the center of one lens LX opposes one green pixel PXG. In other words, the center of the lens LX is located directly above the pixel PXG. Along the first direction X, a pixel PXR is located right next to the pixel PXG on the left side and a pixel PXB is located right next to the pixel PXG on the right side.

The light emitted from the illumination device ILD and passing through the pixel PXR, the pixel PXG and the pixel PXB are defined as light LTR, light LTG and light LTB, respectively. The light LTR, the light LTG and the light LTB each spread about +20° around the axis of the third direction Z (that is, about 40° in total) when passing through the pixel PXR, the pixel PXG and the pixel PXB, respectively. The lens LX concentrates the spread light and emits it as parallel light. The light LTG passes through the pixel PXG, is concentrated by the lens LX, and is emitted from the lens LX as parallel light. The light LTR passes through the next pixel PXR on the left, is concentrated by the lens LX, and is emitted from the lens LX at an oblique angle upward to the right side of the page. The light LTB passes through the next pixel PXB on the right, is concentrated by the lens LX, and is emitted from the lens LX at an oblique angle to the left on the page.

FIG. 13 is a diagram showing a relationship between light passing through a pixel and a lens in a comparative example. In the display device DSPr shown in FIG. 13, light LTG is diffused through the pixel PXG, which emits green light. The diffused light LTG is concentrated when it passes through the lens LX. The concentrated light LTG is emitted from the lens LX as light parallel to the third direction Z. In FIG. 13, the light emitted from the lens LX is entirely light LTG.

FIG. 14 is a diagram showing a relationship between light passing through a pixel and a lens in a comparative example. In the display device DSPr shown in FIG. 14, the light concentrating position is shifted due to aberrations of the lens LX. In FIG. 14, the relationship between the light passing through the red-emitting pixel PXR and the green-emitting pixel PXG, respectively and the position of the lens LX is shown.

Due to the aberration of the lens LX, not only the light LTR passing through the pixel PXR, but also part of the light LTG passing through the adjacent pixel PXG enter the lens LX. Thus, the light emitted from the lens LX is mixed with not only the light passing through the target pixel PX, but also with the light passing through surrounding pixels PX. The image formed from such light becomes a multiple image, as the misalignment of the information results in superposition of images.

In this disclosure, the light passing through the desired pixel is referred to as a main light ray, and the light passing through a neighboring pixel is referred to as a neighboring light ray. For example, in the example shown in FIG. 14, the light LTR passing through the pixel PXR is the main light ray and the light LTG passing through the pixel PXG is the neighboring light ray. As the proportion of neighboring light rays increases, or in other words, as the proportion of main light rays decreases, the image shift will increase.

The image constituted by only the main light rays switches as the image viewing angle changes, which may reduce the reality of the image. When neighboring light rays are mixed with the main light rays at an appropriate degree and the ratio of the main light rays and neighboring light rays changes gradually, the change in the image is perceived as natural. Thus, it is preferable that neighboring light rays be mixed in to some extent. However, as described above, since the main light rays spread in the direction normal to the pixel (the third direction Z), it becomes necessary to suppress the increase in the ratio of the neighboring light rays to the main light rays.

Figure 15:
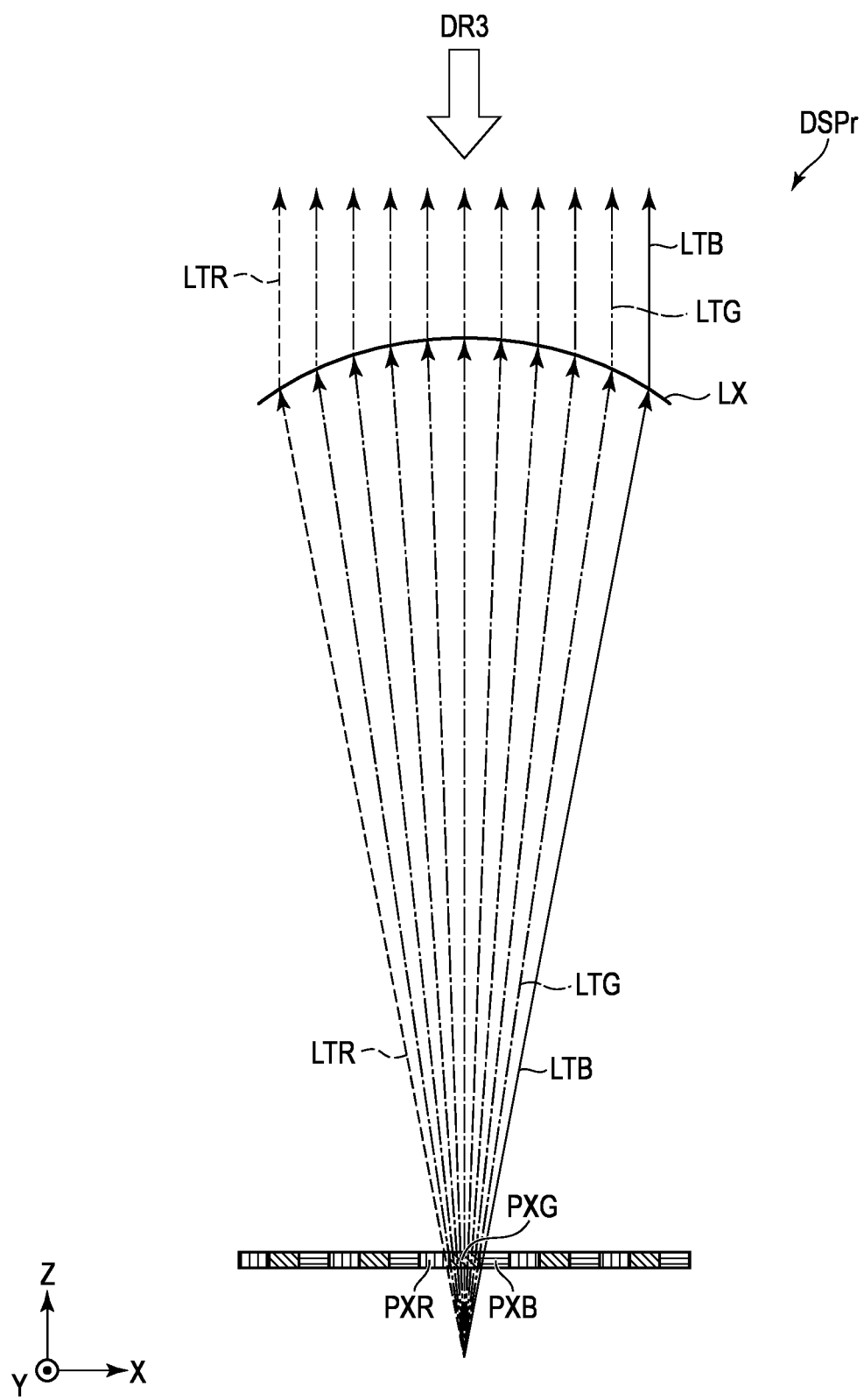
FIG. 15 is a diagram showing a relationship between the light passing through the pixel and the lens in the comparative example.

FIG. 15 is a diagram showing a relationship between the light passing through the pixel and the lens in a comparative example. In the display device DSPr shown in FIG. 15, the distance between the pixel and the lens is short due to manufacturing variations. In FIG. 15, the center of the lens LX is located directly above the pixel PXG, which emits green light.

Here, since the distance between the pixel PX and the lens LX is short, not only the light LTG passing through the pixel PXG, but also the light LTR and the light LTB passing through the adjacent pixels PXR and PXB enter the lens LX. Thus, not only the light passing through the target pixel PX, but also the light passing through the surrounding pixels PX are mixed. The image formed from such light becomes a multiple image.

FIGS. 16 to 18 are diagrams each showing an image formed by the light shown in FIGS. 13 to 15, respectively. FIG. 16 is a diagram showing the image viewed from the direction DR1 in FIG. 13. The image shown in FIG. 16 includes an image constituted only by the light LTG concentrated by the lens LX. An end portion of the image formed by the light LTG becomes a non-transmission region NTR where no light reaches.

FIG. 17 shows an image viewed from the direction DR2 in FIG. 14. The image shown in FIG. 17 includes an image formed by the light LTR. To the left and right of the image, an image is formed from the light LTG. As shown in FIG. 14, the light LTG travels from left to right on the page. In FIG. 17, of the images formed by the light LTG on both sides of the image by the light LTR, the width of the image on the right side is greater than the width of the image on the left side.

FIG. 18 shows an image viewed from the direction DR3 in FIG. 15. The image shown in FIG. 18 includes an image constituted by the light LTG. On the left and right sides of the image, images formed by the light LTR and light LTB, respectively, are displayed.

As shown in the comparative example, in a display device without a barrier element, light passing through adjacent pixels may be mixed, resulting in multiple images.

Figure 19:
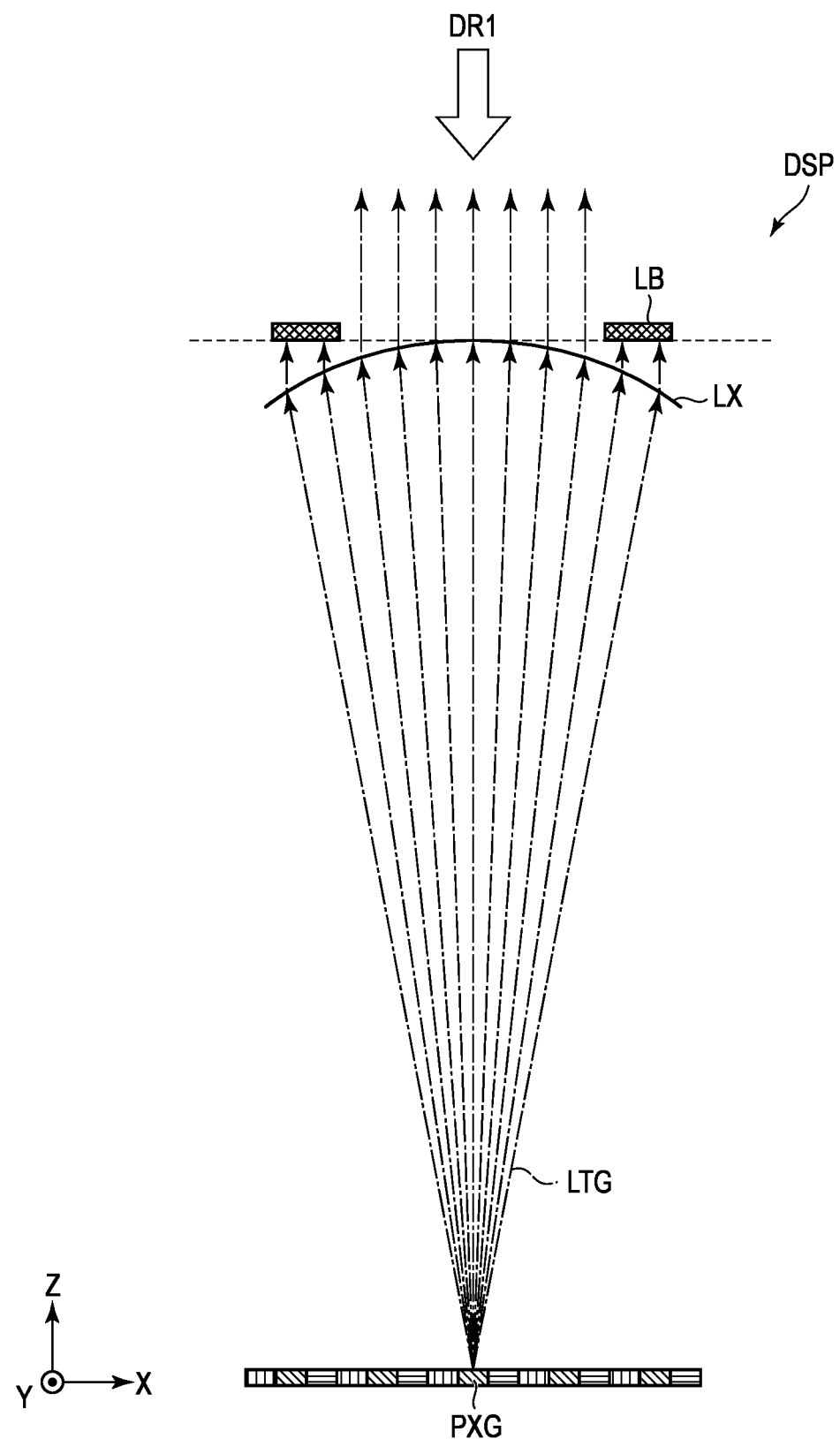
FIG. 19 is a diagram showing a relationship between light passing through a pixel and a lens in the embodiment.

FIGS. 19 to 21 are diagrams each showing the relationship between the light passing to the pixel and the lens in the embodiment. In the display device DSP shown in FIG. 19, a light-shielding region LB is provided adjacent to the lens LX along the third direction Z. The light-shielding region LB is formed to overlap between the vertices of each respective adjacent pair of the plurality of lenses LX, as described above. In other words, the light-shielding region LB is formed to overlap end portions of the respective lens LX. The light-shielding region LB is formed in the barrier element BRR based on a signal from the controller (not shown).

In FIG. 19, the light-shielding region LB shields the light LTG passing through the end portions of the lens LX.

In FIG. 20, the light-shielding region LB shields part of the light LTG and light LTR passing through the end portions of the lens LX. In the display device DSP shown in FIG. 20, an image constituted only by the light LTR is formed, mixing of light of different colors does not occur. Therefore, it is possible to prevent the generation of multiple images.

In FIG. 21, the light-shielding region LB shields the light LTR and light LTB passing through the end portions of the lens LX. By the display device DSP shown in FIG. 21, images constituted only by the light LTG. Thus, the device of FIG. 21, it is possible to prevent the generation of multiple images.

Figure 22:
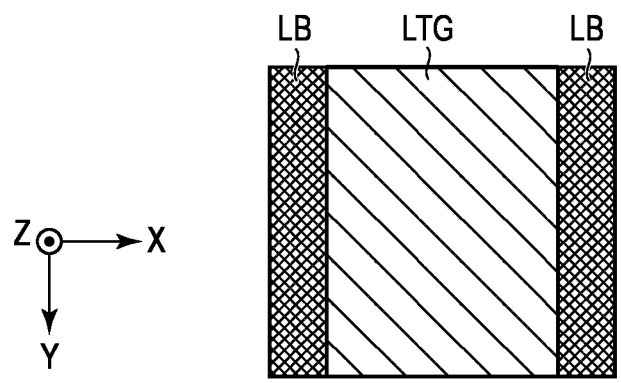
FIG. 22 is a diagram showing an image formed by the light shown in FIG. 19.
Figure 23:
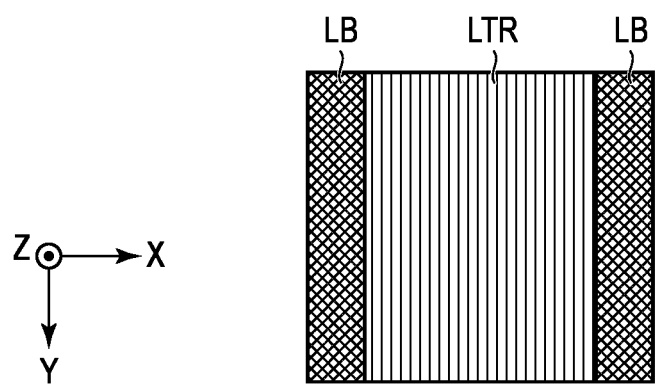
FIG. 23 is a diagram showing an image formed by the light shown in FIG. 20.
Figure 24:
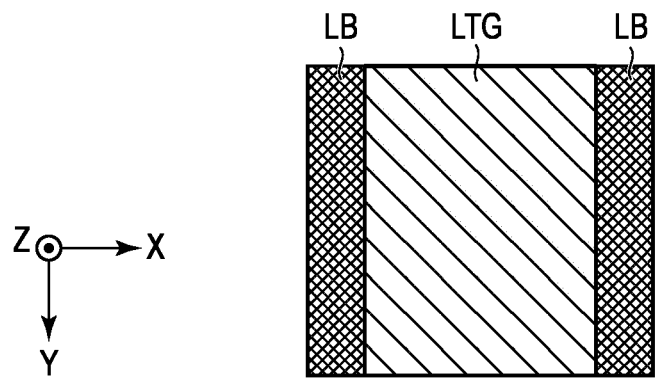
FIG. 24 is a diagram showing an image formed by the light shown in FIG. 21.

FIGS. 22 to 24 are diagrams each showing an image formed by the light shown in FIGS. 19 to 21, respectively. In the image shown in FIG. 22, the non-transmission region NTR is covered by the light-shielding region LB, as compared to the image shown in FIG. 16.

In the image shown in FIG. 23, as compared to the image shown in FIG. 17, the non-transmission region NTR and the region where the light LTG enters the lens LX are covered by the light-shielding region LB. Therefore, the light LTG does not form an image. To the image formed by the light LTR, color mixing by the light LTG does not occur. Thus, the generation of multiple images can be prevented.

In the image shown in FIG. 24, as compared to the image shown in FIG. 18, the non-transmission region NTR and the region where the light LTR and the light LTB enter the lens LX are covered by the light-shielding region LB. Therefore, the light LTR and the light LTB do not form an image. To the image formed by the light LTG, color mixing due to the light LTR and the light LTB does not occur. Therefore, the generation of multiple images can be prevented.

Figure 25:
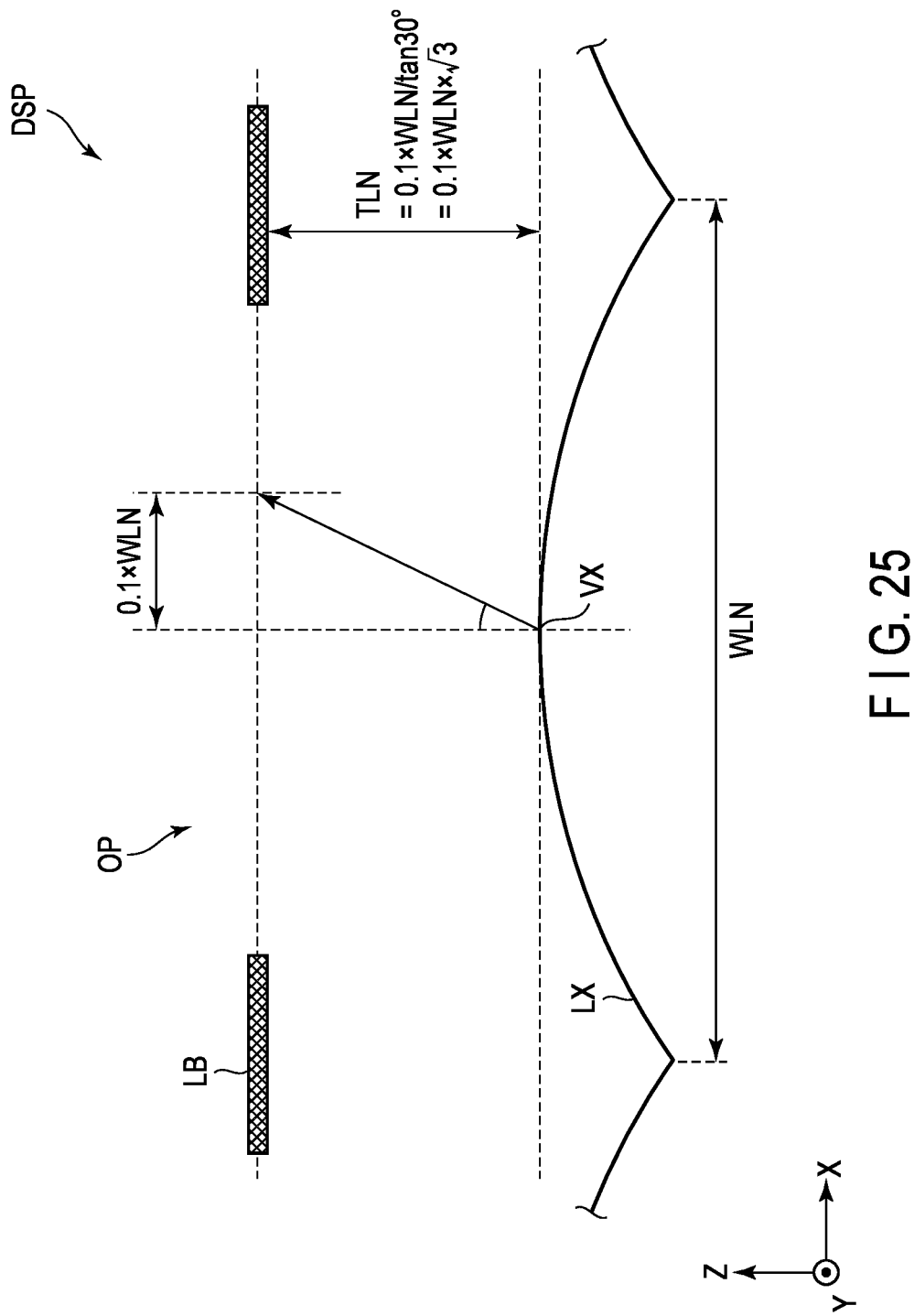
FIG. 25 is a diagram showing a relationship between the lens and the distance of the light-shielding region.

FIG. 25 are diagrams each showing a relationship between the distance between the lens and the light-shielding region. The width of the lens LX is referred to as a width WLN, the vertex of the lens LX as a vertex VX, and the distance between the X-Y plane containing the vertex VX and the light-shielding region LB as a distance TLN. Each adjacent pair of light-shielding regions LB are located at the same distant from the vertex VX. In other words, the center of the aperture OP coincides with the normal line passing through the vertex VX (the line along the third direction Z).

As the distance TLN becomes longer, that is, the distance between the lens LX and the light-shielding regions LB is further away from each other, the light in the oblique direction is asymmetrically shielded as viewed from the vertex VX, and the ratio of the main light rays is lowered. In order to limit this, the distance TLN should be greater than or equal to 0, and less than or equal to $((0.1 \times \text{width WLN}/\tan 30°) = (0.1 \times \text{width WLN} \times \sqrt{3}))$ $(0 \leq TLN \leq 0.1 \times WLN \times \sqrt{3}$ (Formula 1)).

The distance TLN shown in (Formula 1) is the range where the viewing angle remains at its maximum even if the position of the lens LX is shifted by 10% of the length of the width WLN. The maximum viewing angle is defined as the case where the light emitted from the vertex VX of the lens LX is +30° with respect to the normal line passing through the vertex VX.

Figure 26:
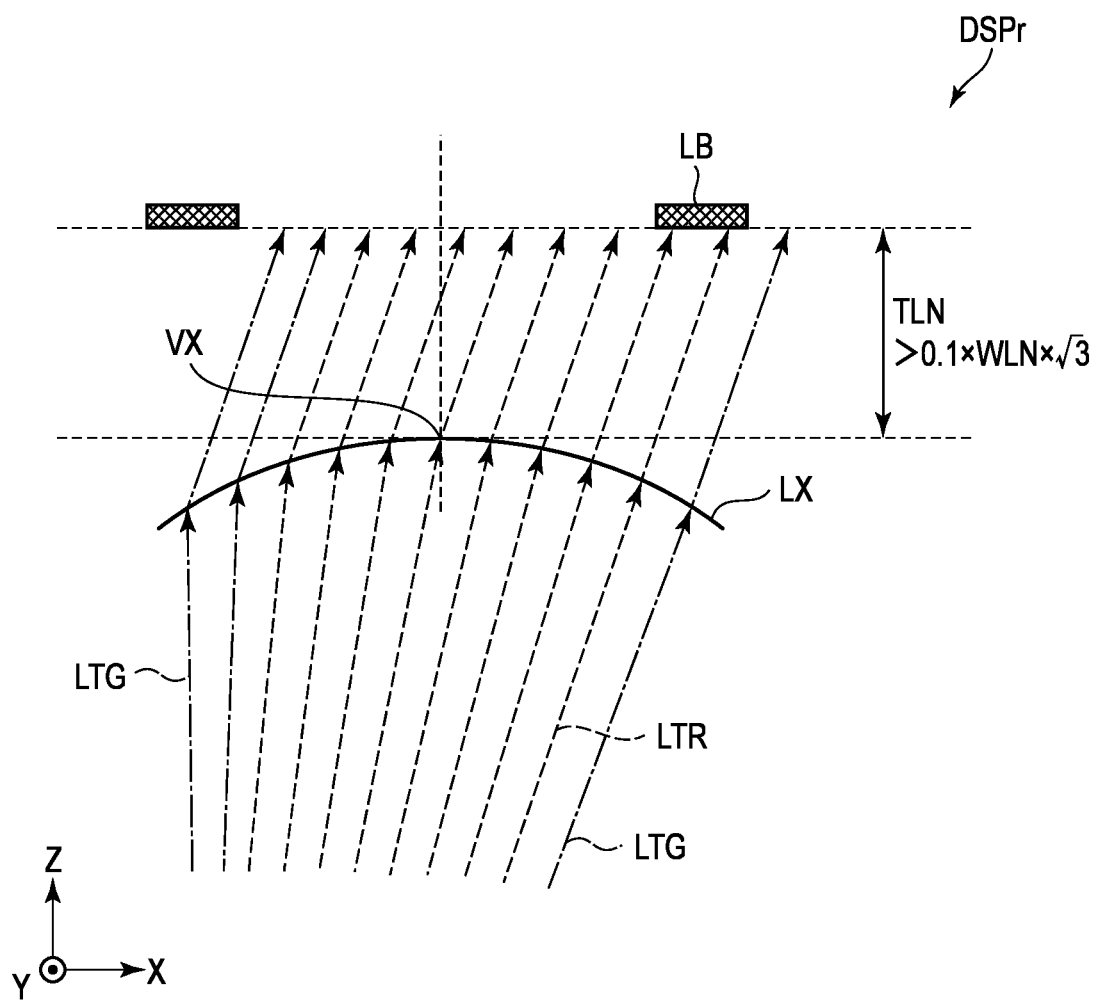
FIG. 26 is a diagram showing a display device of a comparative example.

FIG. 26 is a diagram showing a display device of a comparative example. The display device DSPr illustrates the case in the display device DSP shown in FIG. 20, where the distance TLN exceeds $0.1 \times WLN \times \sqrt{3}$ $(TLN > 0.1 \times WLN \times \sqrt{3})$.

In the display device DSPr shown in FIG. 26, the light LTG on the left side of the page is not shielded by the light-shielding region LB. Further, the light LTG on the right side of the page is not shielded by the light-shielding region LB and also the light LTR, which is the main light rays, is shielded by the light-shielding region LB. Thus, the light emitted from the display device DSPr is mixed with the light LTG, which should be unnecessary, and part of the light LTR, which is the main light rays, is shielded, resulting in lowering of the ratio.

Therefore, the distance TLN between the X-Y plane including the vertex VX of the lens LX and the light-shielding region LB should preferably be the distance that satisfies Formula 1.

The display device DSP of this embodiment comprises a barrier element BRR on the lens element LNS. The display device DSP shields the light passing through adjacent pixels PX by the light-shielding region LB of the barrier element BRR, and thus can emit only the light passing through the target pixel PX. With this configuration, it is possible to prevent images displayed by the display device DSP from becoming multiple images.

FIG. 27 is a plan view schematically showing a configuration example of the barrier element of the embodiment. The barrier element BRR shown in FIG. 27 includes three electrodes LE1 extending along the second direction Y and four electrodes LE2 extending along the second direction Y. The electrodes LE1 and LE2 are arranged alternately along the first direction X.

The electrodes LE1 shown in FIG. 27 are referred to, from the left on the page, as an electrode LE11, an electrode LE12 and an electrode LE13. The electrodes LE2 are referred to, from the left to right on the page, as an electrode LE21, an electrode LE22, an electrode LE23 and an electrode LE24. That is, from left to right on the page, the electrode LE21, electrode LE11, electrode LE22, electrode LE12, electrode LE23, electrode LE13 and electrode LE24 are arranged.

The electrode LE21, electrode LE11, electrode LE22, electrode LE12, electrode LE23, electrode LE13 and electrode LE24 each have a rectangular shape with short sides extending along the first direction X and long sides extending along the second direction Y.

The cross-sectional configuration of the barrier element BRR shown in FIG. 27 along the first direction X is as shown in FIG. 11. However, in FIG. 27, of the electrodes LE1 and LE2, the width (or the length along the first direction X) of the electrode LE1 located in the center along the first direction X is greater than the widths of the other electrodes LE1 and LE2.

In other words, the width of the electrode LE12 is greater than the widths of the other electrodes LE21, LE11, LE22, LE23, LE13 and LE24.

To the electrode LE21 and the electrode LE24, the same voltage is applied. In the barrier element BRR shown in FIG. 27, potential differences are created between the electrode LE21 and the electrode UE, and between the electrode LE24 and the electrode UE, and thus the liquid crystal molecules in the liquid crystal layer LCY change the direction of their major axes according to the potential difference. Consequently, the light transmission between these electrodes is reduced and thus barrier formation regions are formed. The barrier formation regions formed by the electrode LE21 and the electrode UE, and the electrode LE24 and the electrode UE are respectively referred to as barrier formation regions BFR1.

Similarly, the barrier formation region formed by the electrodes LE11 and UE is referred to as a barrier formation region BFR2, the barrier formation region formed by the electrode LE22 and the electrode UE as a barrier formation region BFR3, the barrier formation region formed by the electrode LE12 and the electrode UE as a barrier formation region BFR4, the barrier formation region formed by the electrode LE23 and the electrode UE as a barrier formation region BFR5, and the barrier formation region formed by the electrode LE13 and the electrode UE as a barrier formation region BFR6.

As in the case of the electrode LE21, electrode LE11, electrode LE22, electrode LE12, electrode LE23, electrode LE13 and electrode LE24, the barrier formation region BFR1 to the barrier formation region BFR6 each have a rectangular shape with short sides extending along the first direction X and long sides extending along the second direction Y.

In the barrier element BRR shown in FIG. 27, six divided barrier formation regions are formed. By combining these barrier formation regions with each other, it is possible to form the light-shielding region LB described above.

FIG. 28 is a plan view schematically showing a configuration example of the barrier element of the embodiment. The configuration example shown in FIG. 28 is different from that of FIG. 27 in that fixed light-shielding layers are provided to overlap outermost electrodes, respectively.

In the barrier element BRR shown in FIG. 28, fixed light-shielding layers KB are provided to overlap the outermost electrodes, namely, the electrode LE24 and the electrode LE21. As a result, the regions occupied by the electrode LE24 and the electrode LE21 are light-shielded regardless of whether or not voltage is applied to the electrode LE24 and the electrode LE21. In other words, the regions are light-shielded at all times regardless of whether the barrier formation regions BFR1 are formed or not.

Figure 29:
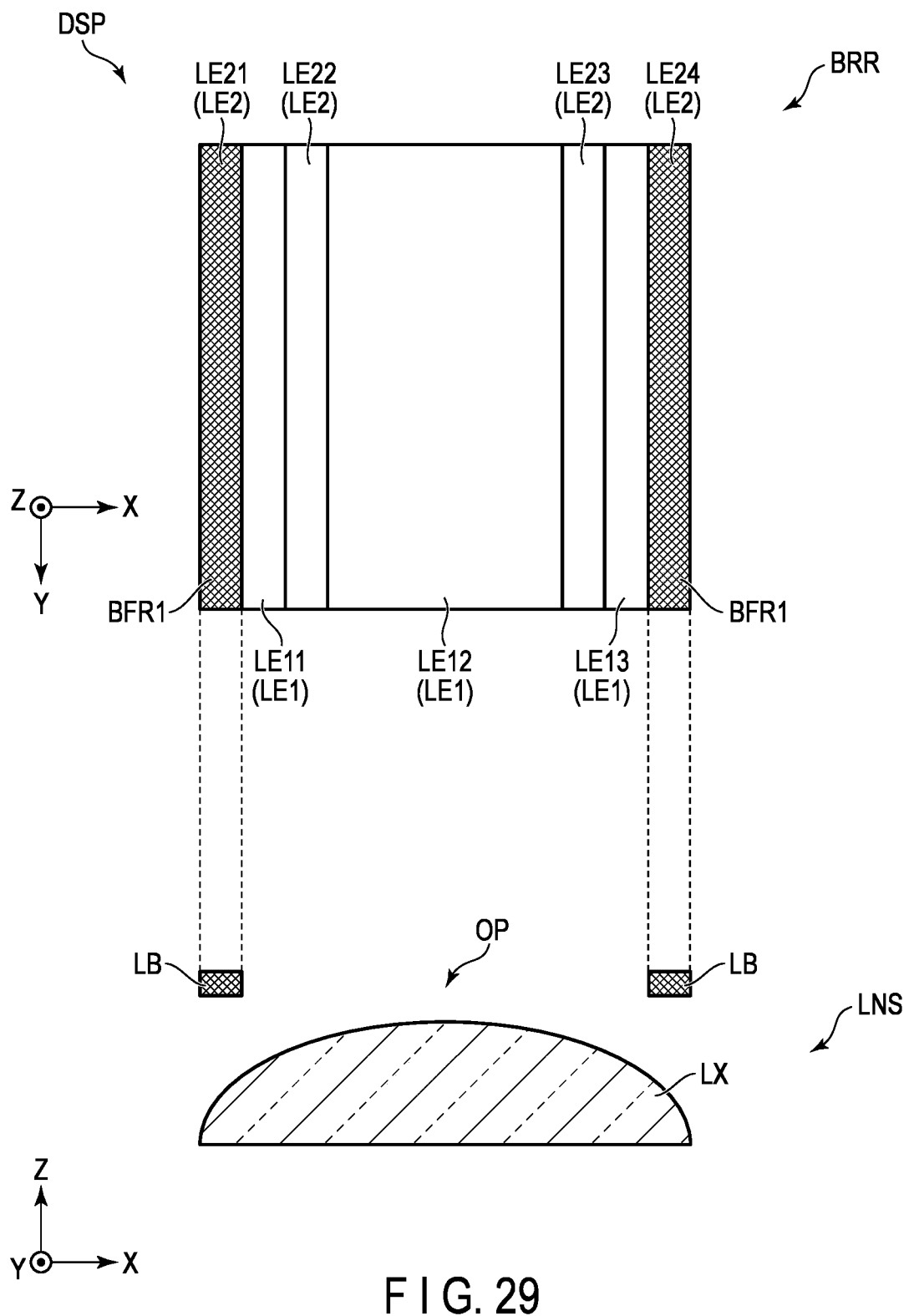
FIG. 29 is a diagram showing a positional relationship between a barrier formation region and the lens.
Figure 30:
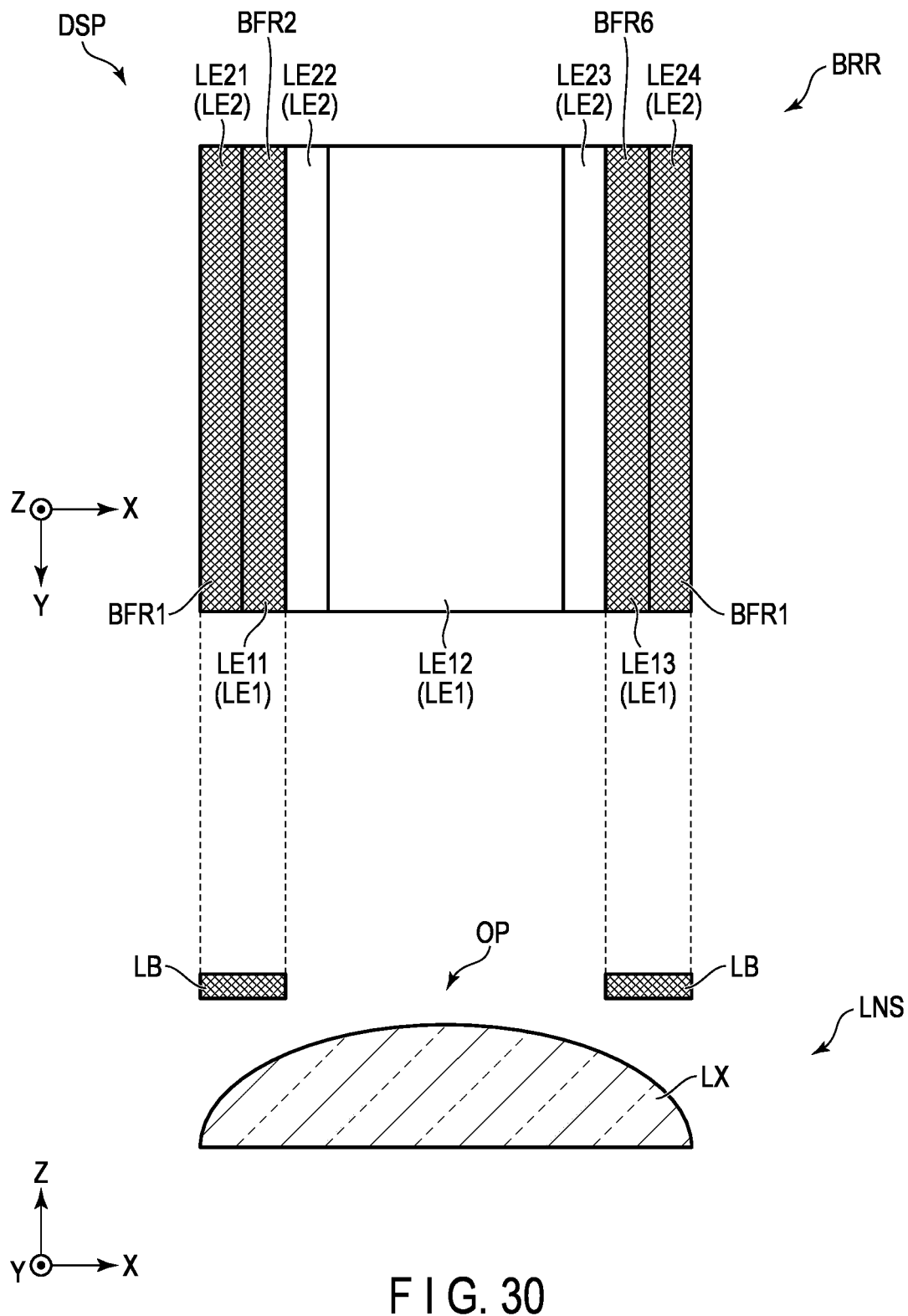
FIG. 30 is a diagram showing a positional relationship between the barrier formation region and the lens.
Figure 31:
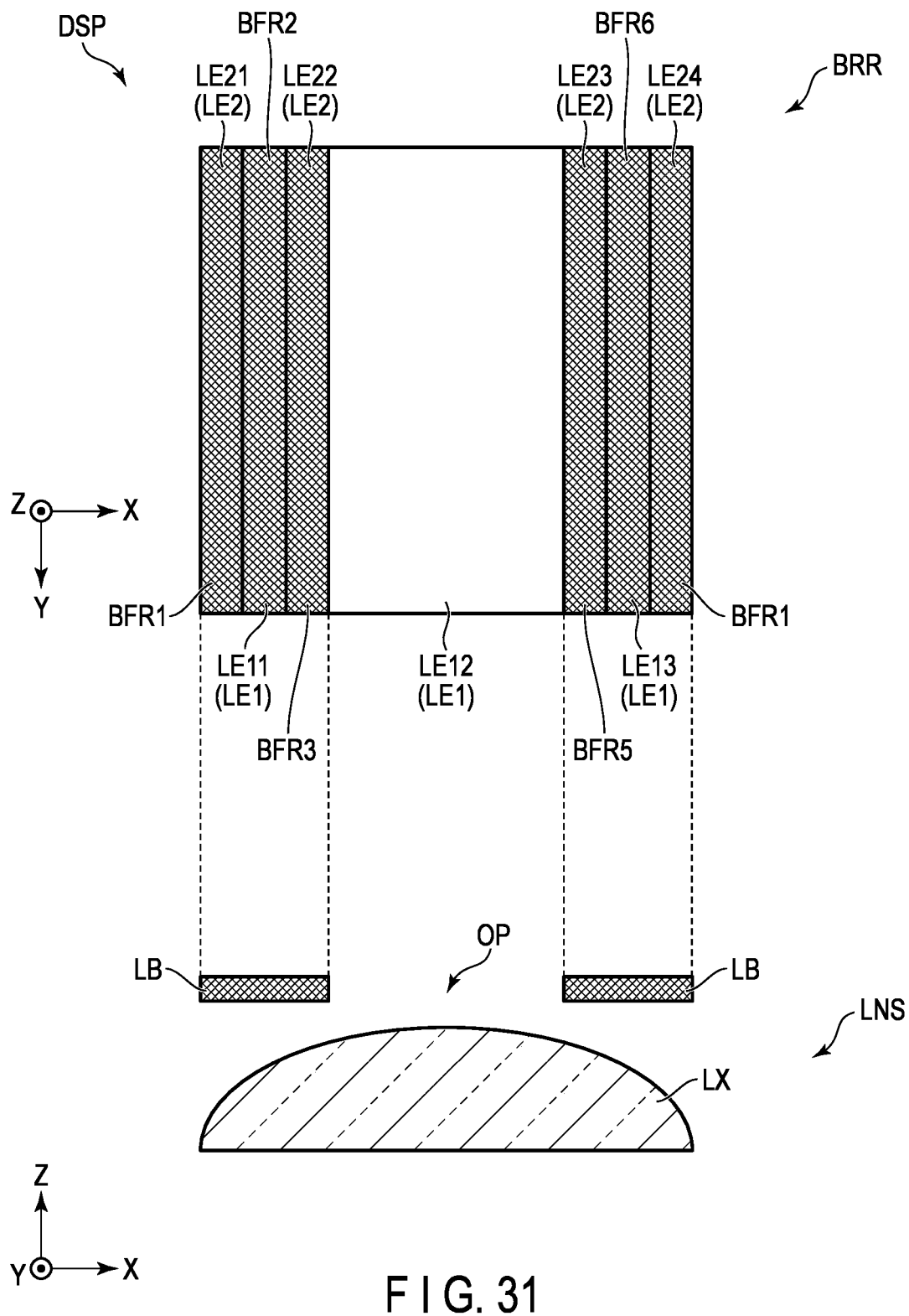
FIG. 31 is a diagram showing a positional relationship between the barrier formation region and the lens.

FIGS. 29 to 31 are diagrams each showing a relationship in position between the barrier formation region and the lens with regard to each other. FIGS. 29 to 31 each illustrate a plan view of the barrier element BRR (upper portion on the page) and a cross-sectional view of one lens LX of the lens element LNS corresponding thereto (lower portion of the page).

In FIGS. 29 to 31, the plane of one lens LX is assumed to have a rectangular shape with a short side extending along the first direction X and a long side extending along the second direction Y. The plane of one lens LX corresponds to the entirety from the barrier formation region BFR1 to the barrier formation region BFR6. In other words, the lens LX is a lenticular lens.

In FIG. 29, voltage is applied to the electrode LE21, the electrode LE24 and the electrode UE to form the barrier formation regions BFR1. The barrier formation regions BFR1 function as light-shielding regions LB. The regions where the electrode LE11, the electrode LE22, the electrode LE12, the electrode LE23 and the electrode LE13 are provided correspond to apertures OP.

In FIG. 30, voltage is applied to the electrode LE21, the electrode LE24 and the electrode UE to form the barrier forming regions BFR1. Further, voltage is applied to the electrode LE11 and the electrode UE to form the barrier formation region BFR2. Furthermore, voltage is applied to the electrode LE13 and the electrode UE to form the barrier formation region BFR6. The barrier formation region BFR1, barrier formation region BFR2 and the barrier formation region BFR6 function as light-shielding regions LB. The regions where the electrode LE22, the electrode LE12 and the electrode LE23 are provided correspond to the apertures OP, respectively.

In FIG. 31, voltage is applied to the electrode LE21, the electrode LE24 and the electrode UE, and thus the barrier forming regions BFR1 is formed. Further, voltage is applied to the electrode LE11 and the electrode UE, and thus the barrier formation region BFR2 is formed. Furthermore, voltage is applied to the electrode LE13 and the electrode UE, and thus the barrier formation region BFR6 is formed. Voltage is applied to the electrode LE22 and the electrode UE, and thus the barrier formation region BFR3 is formed. Voltage is applied to the electrode LE23 and the electrode UE, and thus the barrier formation region BFR5 is formed. The barrier formation regions BFR1, the barrier formation region BFR2, the barrier formation region BFR3, the barrier formation region BFR5 and the barrier formation region BFR6 function as light-shielding regions LB. Further, the region where the electrode LE12 is provided to correspond to an aperture OP.

As shown in FIGS. 29 to 31, by switching the electrode to which voltage is applied, the area occupied by the light-shielding region LB can be changed. In other words, the area occupied by the apertures OP can as well be changed. With this configuration, it is possible to display images by, for example, in various depths of field. Here, the electrode to which voltage is applied can be selected according to the signal from the controller (not shown) connected to the barrier element BRR.

In FIGS. 29 to 31, the same voltage is applied to each group of electrodes located bilaterally symmetrical to the center of the area occupied by the electrode LE21, electrode LE11, electrode LE22, electrode LE12, electrode LE23, electrode LE13 and electrode LE24.

Figure 33:
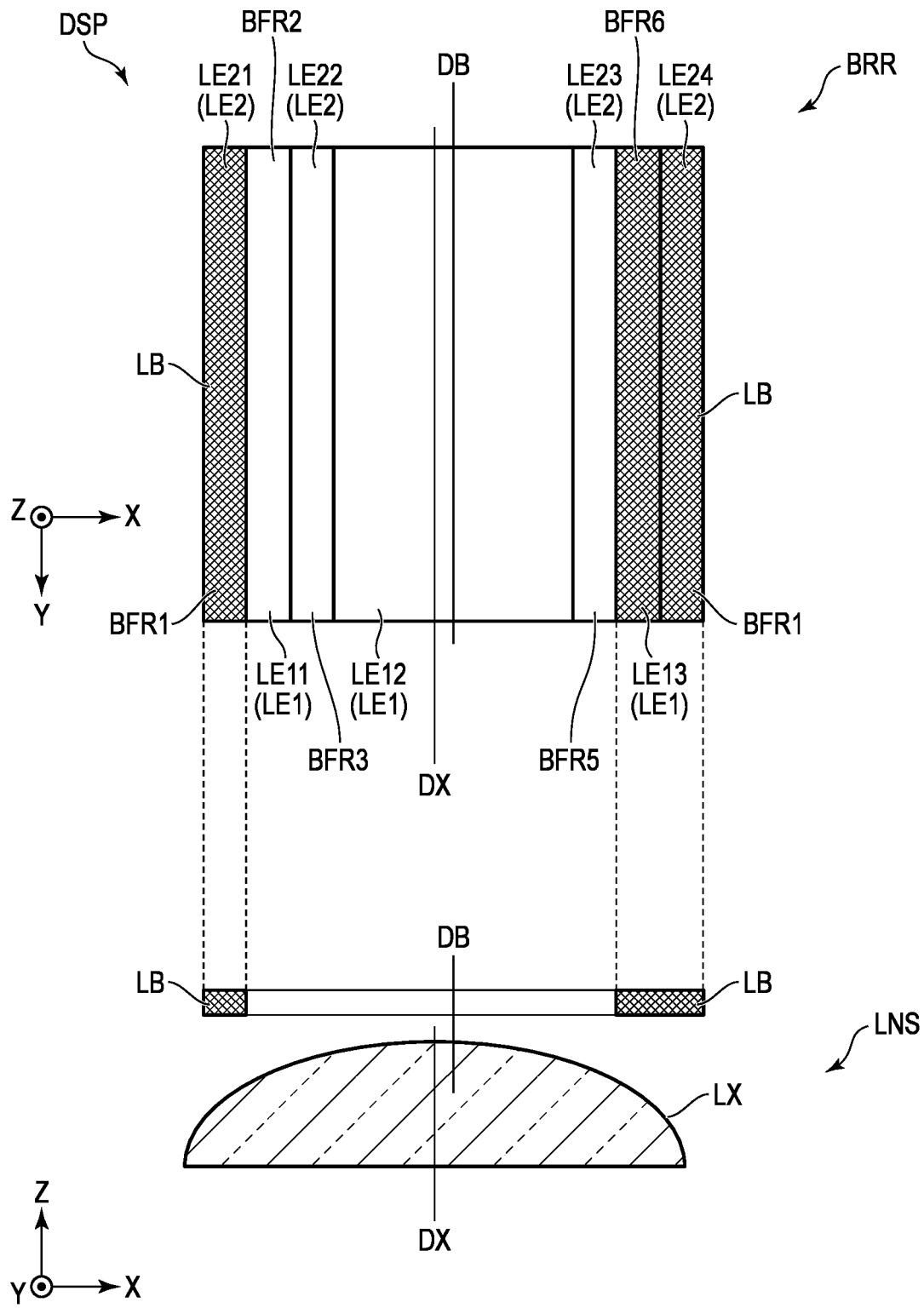
FIG. 33 is a diagram showing a state in which a center line of the barrier formation region is shifted in a first direction X with respect to a center line of the lens.

In contrast, there is possibility that the overlap between the barrier element and the lens element shifts in the first direction X. FIG. 32 is a diagram showing a relationship in position between the barrier formation region and the lens. FIG. 33 is a diagram showing that the centerline of the electrode LE12, which would originally be the centerline of the barrier formation region, is shifted in the first direction X with respect to the centerline of the lens. In FIGS. 32 and 33, the centerline of the electrode LE12 is referred to as a centerline DB and the centerline of the lens LX is denoted as Dx.

In such a case, the potential is not given symmetrically to the electrodes located on either side of the electrode LE12. For example, as shown in FIG. 33, for the electrodes located to the left side of the center, the potential is applied only to the electrode LE21. On the other hand, for the electrodes located to the right side of the center, the potential is applied to the electrode LE13 and the electrode LE24. Note that such a configuration may as well be adoptable that only the regions corresponding to the electrodes to which the electric potential is applied is used as the light-shielding region LB. The electric potential is applied to the electrodes based on a signal from the controller (not shown).

As described above, with this embodiment, it is possible to obtain a display device which can prevent multiple image in displayed images.

Configuration Example 1

Figure 34:
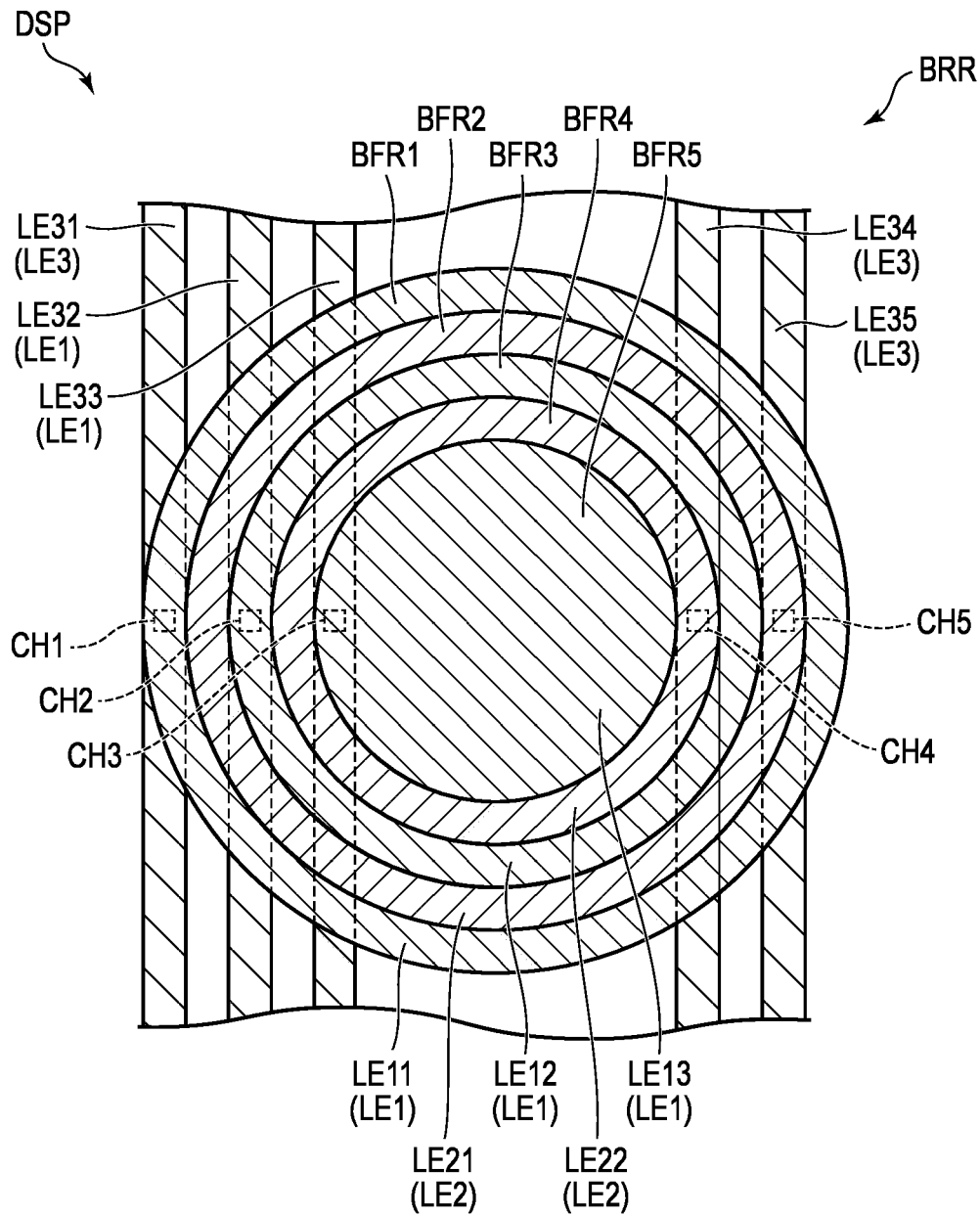
FIG. 34 is a plan view schematically showing a configuration example of the display device in the embodiment.

FIG. 34 is a plan view of another configuration example of the display device in the embodiment. The configuration example shown in FIG. 34 is different from that of FIG. 27 in that the barrier formation regions are circular and annular in shape.

The barrier element BRR shown in FIG. 34 comprises electrodes LE1 and LE2 as in the case of FIG. 27. The barrier element BRR includes an electrode LE11, an electrode LE12 and an electrode LE13 as the electrodes LE1. The barrier element BRR includes, as the electrode LE2, an electrode LE21 and an electrode LE22.

While setting the circular shaped electrode LE13 at the center, the annular shaped electrodes LE22, LE12, LE21 and LE11 are provided therearound from the inner side to the outer side, respectively, in a concentric manner. Thus, it can be said that the electrodes LE1 and the electrodes LE2 are arranged alternately from the inner side to the outer side around one circular shaped electrode at the center.

The barrier element BRR includes wiring lines LE3 extending in the second direction Y. As the wiring lines LE3, a wiring line LE31, a wiring line LE32, a wiring line LE33, a wiring line LE34 and a wiring line LE35 are provided. The wiring line LE31 is connected to the electrode LE11 via a contact hole CH1. The wiring line LE32 is connected to the electrode LE12 via a contact hole CH2. The wiring line LE33 is connected to the electrode LE13 via a contact hole CH3. The wiring line LE34 is connected to the electrode LE22 via a contact hole CH4. The wiring line LE35 is connected to the electrode LE21 via a contact hole CH5.

Figure 35:
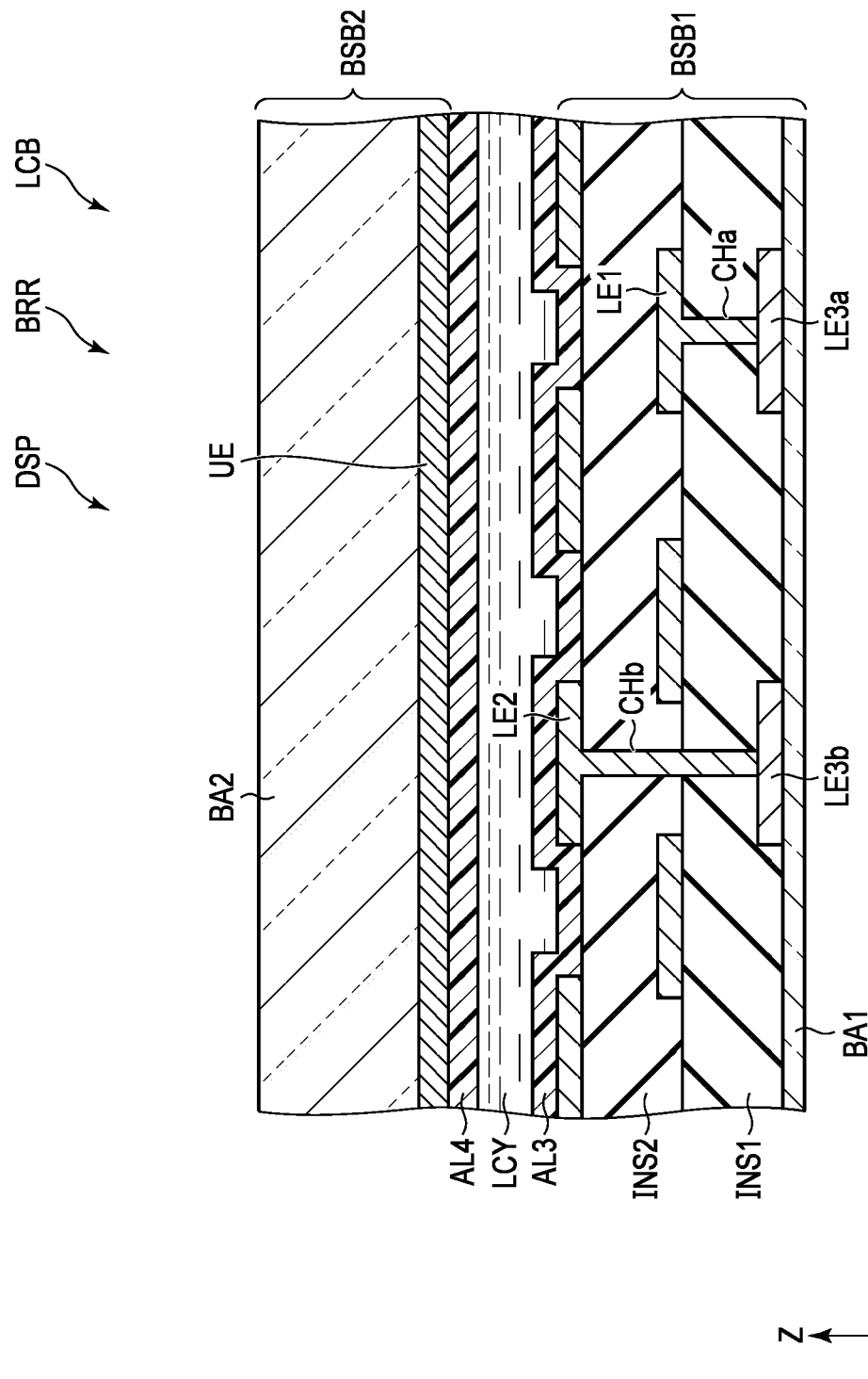
FIG. 35 is a cross-sectional view schematically showing a configuration example of a barrier element shown in FIG. 34.

FIG. 35 is a cross-sectional view schematically showing a configuration example of the barrier element shown in FIG. 34. The barrier element BRR shown in FIG. 35 comprises a substrate BSB1, a substrate BSB2 and a liquid crystal layer LCY provided between the substrate BSB1 and the substrate BSB2.

In the substrate BSB1, wiring lines LE3 (a wiring line LE3a and a wiring line LE3b) are provided on substrate BA1. An insulating layer INS1 is provided to cover the wiring lines LE3. An electrode LE1 is provided on the insulating layer INS1. An insulating layer INS2 is provided to cover the electrode LE1. On the insulating layer INS2, an electrode LE2 is provided. An alignment film AL3 is provided to cover the electrode LE2 and the insulating layer INS2.

The insulating layer INS1 and the insulating layer INS2 should be formed of a material similar to that of the insulating layer INS shown in FIG. 2. The wiring lines LE3 should be formed, for example, of a transparent conductive material such as indium tin oxide (ITO) or indium zinc oxide (IZO). Alternatively, if it is possible to form fine wiring lines which cause little effect on transmittance, the wiring lines LE3 may be formed of a metal material.

The electrodes LE1 (the electrodes LE11, LE12 and LE13) are connected to the wiring line LE3a via a contact hole CHa made in the insulating layer INS1. As for the electrode LE11, the electrode LE12 and the electrode LE13, the wiring line LE3a corresponds to a wiring line LE31, a wiring line LE32 or a wiring line LE33, respectively. As for the electrode LE11, the electrode LE12 and the electrode LE13, the contact hole CHa corresponds to a contact hole CH1, a contact hole CH2 or a contact hole CH3, respectively.

The electrodes LE2 (the electrodes LE21 and LE22) are connected to a wiring line LE3b via a contact hole CHb provided in the insulating layer INS1 and the insulating layer INS2. As for the electrode LE21 and the electrode LE22, the wiring line LE3b corresponds to a wiring line LE34 or a wiring line LE35, respectively. As for the electrode LE21 and the electrode LE22, the contact hole CH3b corresponds to a contact hole CH4 or a contact hole CH5, respectively.

A voltage is applied to the electrode LE11 via the wiring line LE31. By the voltage applied to the electrode LE11 and the electrode UE, the liquid crystal layer LCY is modulated and thus the barrier formation region BFR1 is formed. Similarly, by the voltage applied to the electrode LE21 and electrode UE, the electrode LE12 and electrode UE, the electrode LE22 and electrode UE and the electrode LE13 and electrode UE, the barrier formation region BFR2, the barrier formation region BFR3, the barrier formation region BFR4 and the barrier formation region BFR5 are formed, respectively.

In the barrier element BRR shown in FIG. 34, five divided barrier formation regions are formed. As in the case of FIG. 27, by combining these barrier formation regions, a light-shielding region LB can be formed.

Figure 36:
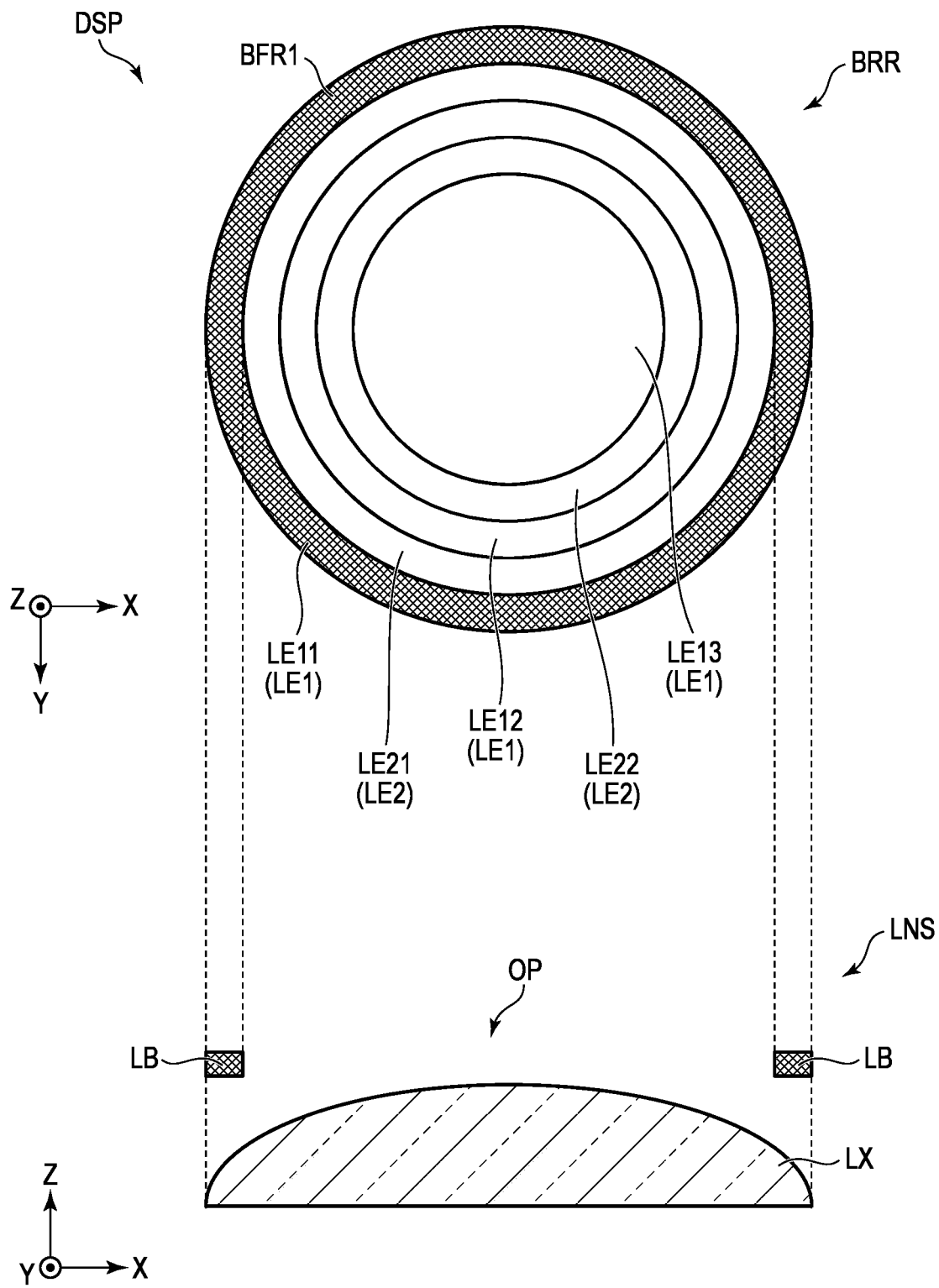
FIG. 36 is a diagram showing a positional relationship between the barrier formation region and the lens.

FIGS. 36 to 38 are diagrams each showing a relationship in position between the barrier formation regions and the lens with respect to each other. FIGS. 36 to 38 each show a plan view of the barrier element BRR and a cross-sectional view of one lens LX of the lens element LNS corresponding thereto.

In FIGS. 36 to 38, it is assumed that the plane of one lens LX has a circular shape. The plane of one lens LX corresponds to the entirety of the barrier formation region BFR1 to the barrier formation region BFR6. That is, the lens LX is a microlens.

In FIG. 36, a voltage is applied to the electrode LE11 and the electrode UE, and thus the barrier formation region BFR1 is formed. The barrier formation region BFR1 functions as the light-shielding region LB. The region where the electrode LE21, electrode LE12, electrode LE22 and electrode LE13 are provided corresponds to an aperture OP.

In FIG. 37, a voltage is applied to the electrode LE11 and the electrode UE, and the barrier forming region BFR1 is formed. Voltage is applied to the electrode LE21 and the electrode UE, and the barrier formation region BFR2 is formed. The barrier formation region BFR1 and the barrier formation region BFR2 function as light-shielding regions LB. The region where the electrode LE12, electrode LE22, and electrode LE13 are provided corresponds to an aperture OP.

In FIG. 38, a voltage is applied to the electrode LE11 and the electrode UE, and thus the barrier forming region BFR1 is formed. Further, a voltage is applied to the electrode LE21 and the electrode UE, and thus the barrier formation region BFR2 is formed. Furthermore, a voltage is applied to the electrode LE12 and the electrode UE, and thus the barrier formation region BFR3 is formed. The barrier formation region BFR1, the barrier formation region BFR2 and the barrier formation region BFR3 function as light-shielding regions LB. The region where the electrode LE22 and the electrode LE13 are provided corresponds to an aperture OP.

As shown in FIGS. 36 to 38, by switching the electrode to which voltage is applied, the area occupied by the light-shielding regions LB can be changed. In other words, the area occupied by the aperture OP can as well be changed. With this configuration, it is possible to display images, for example, in various depths of field.

With this configuration example, advantageous effects similar to those of the embodiment can be achieved.

Configuration Example 2

FIGS. 39 and 40 are cross-sectional views of still another configuration example of the display device in the embodiment. The configuration example shown in FIGS. 39 and 40 illustrate an example of the shape of each of the lens element and the barrier element.

The lens element LNS shown in FIG. 39 includes a plurality of lenticular lenses as the lens LX. The lenticular lenses each have a cross-sectional shape along the X-Z plane that is a part of a circle and a rectangular cross-sectional shape along the Y-Z plane. The lenticular lenses extend along the second direction Y.

In the barrier element BRR shown in FIG. 40, light-shielding regions LB are formed. The area where the light-shielding regions LB are not formed is an aperture OP. The aperture OP includes a plurality of slits. Each of the slits extends along the second direction Y as in the case of the lenticular lenses.

Each of the slits is located to overlap each respective one of the plurality of lenticular lenses in plan view. The width of the slits is less than the width of the lenticular lenses.

The light-shielding regions LB shown in FIG. 40 can be formed by the barrier element BRR shown in FIG. 27. The lenticular lens shown in FIG. 39 can be provided in the lens element LNS, which is positioned to correspond to the barrier element BRR shown in FIG. 27.

Figure 41:
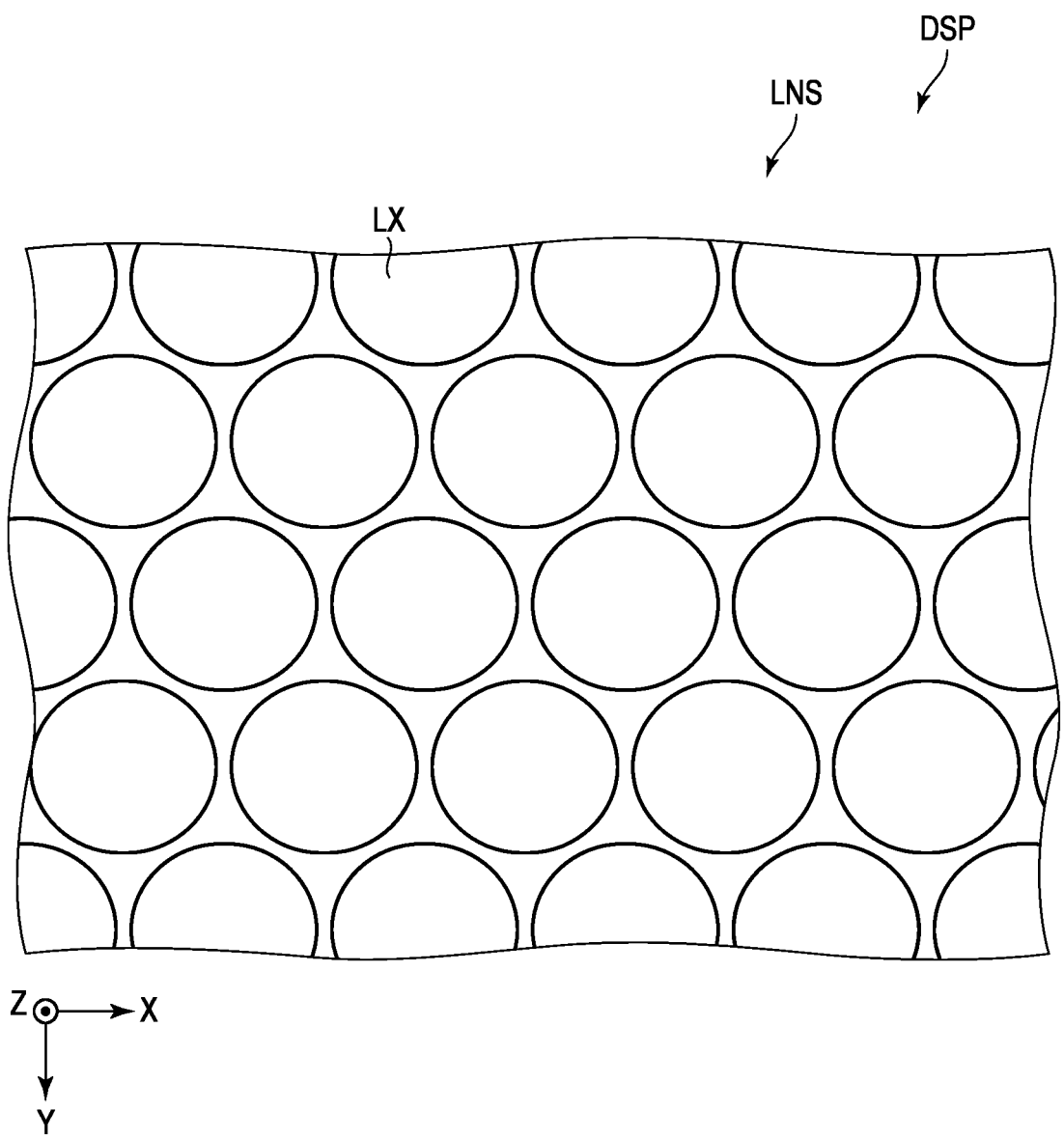
FIG. 41 is a cross-sectional view showing a configuration example of the display device in the embodiment.
Figure 42:
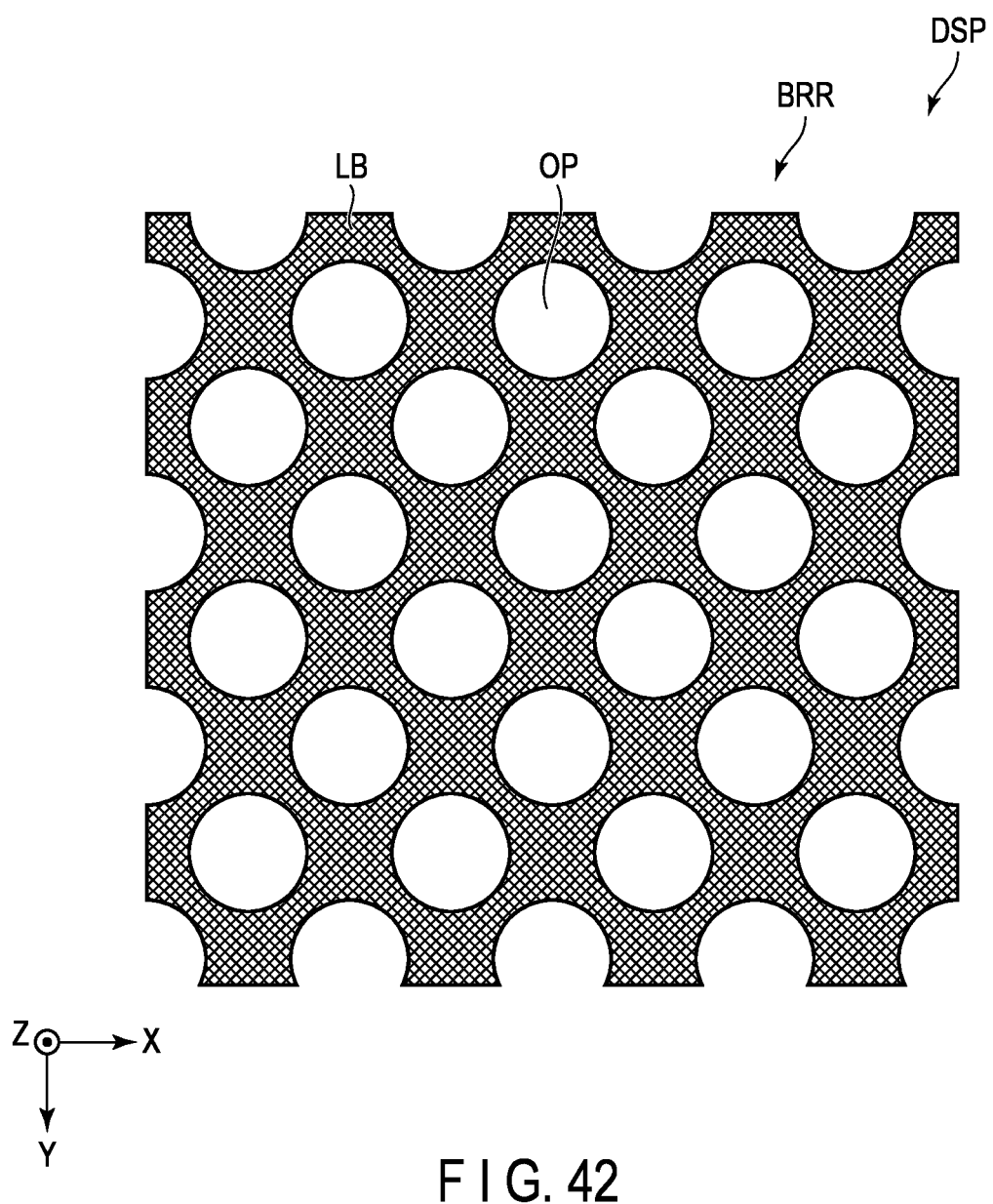
FIG. 42 is a cross-sectional view showing a configuration example of the display device in the embodiment.

FIGS. 41 and 42 are cross-sectional views each showing still another configuration examples of the display device in the embodiment. The configuration example shown in FIGS. 41 and 42 is different from that of FIGS. 39 and 40 in that the lens element and barrier element are circular in shape.

The lens element LNS shown in FIG. 41 includes a plurality of microlenses as lenses LX. Each of the plurality of microlenses has a hemispherical shape. The cross section of the microlenses in the X-Z plane as well is a semicircular shape when taken along the Y-Z plane. The cross section of the microlenses in the X-Y plane is circular in shape.

A light-shielding region LB is formed in the barrier element BRR shown in FIG. 42. The regions where the light-shielding region LB is not formed are apertures OP. The apertures OP constitute a plurality of circular apertures. In FIG. 42, for the regions where the electrodes LE1 and LE2 are not provided, for example, a light-shielding material layer should only be provided in advance. Alternatively, the apertures OP should be formed to correspond to the electrodes to which voltage is applied, and the light-shielding regions LB should be formed to correspond to the electrodes to which voltage is not applied.

Each of the circular-shaped apertures is provided to overlap each respective one of the plurality of microlenses in plan view. The diameter of the circular-shaped apertures is less than the diameter of the microlenses.

The light-shielding region LB shown in FIG. 42 can be formed by the barrier element BRR shown in FIG. 34. The lenticular lens shown in FIG. 41 can be provided in the lens element LNS, which is disposed to correspond to the barrier element BRR shown in FIG. 34.

Figure 43:
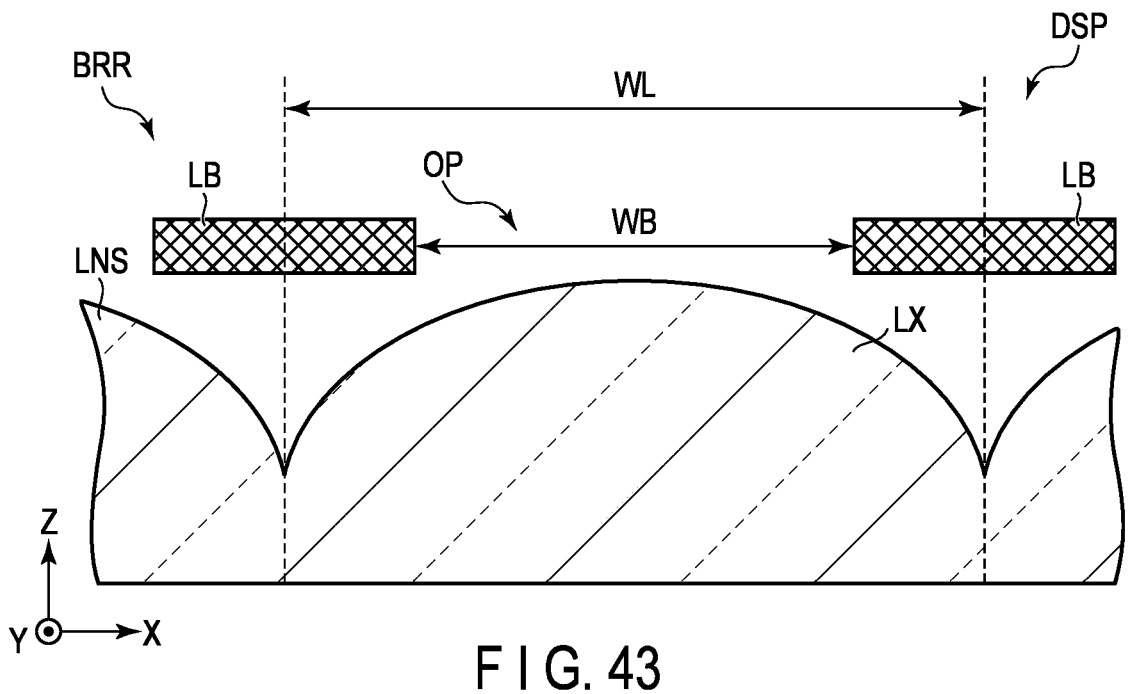
FIG. 43 is a diagram showing a relationship between lengths of the lens and an aperture.

FIG. 43 is a diagram showing a relationship between the lenses and apertures in length. FIG. 43 is a partially enlarged view of FIG. 1, showing mainly the lens LX and the aperture OP. The lens LX should only be a lenticular lens shown in FIG. 39 or a microlens shown in FIG. 41. The aperture OP should be a slit as shown in FIG. 40, a circular shaped aperture as shown in FIG. 42, or the like.

In FIG. 43, the length (width) of the aperture OP along the first direction X is referred to as WB and the length (width) of the lens LX along the first direction X is referred to as WL. The length WB is less than the length WL (WB<WL). Further, the length WB should preferably be 50% or more of the length WL (WB≥0.5×WL). By setting the length WB to 50% or more of the length WL, the depth of field of the lens element LNS can be increased. The electrode to which the voltage is applied should be selected according to the signal from the controller (not shown) connected to the barrier element BRR.

Figure 44:
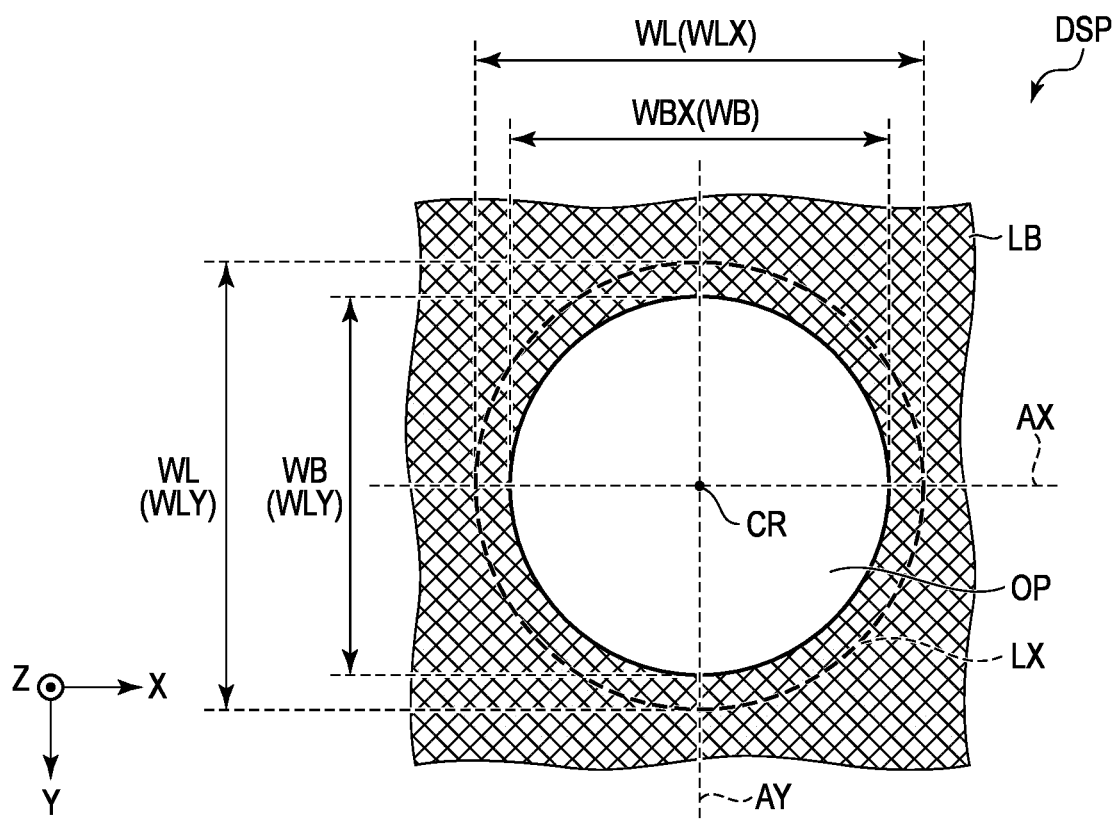
FIG. 44 is a diagram showing a relationship between the length (diameter) of a microlens and the length (diameter) of the circular aperture.

FIG. 44 is a diagram showing a relationship between the length (diameter) of the microlens and the length (diameter) of the circular shaped aperture.

It is preferable that the center of the microlens and the center of the circular-shaped aperture should coincide with each other. In the example shown in FIG. 44, the center of the microlens and the center of the circular-shaped aperture are both at the center CR. The distance from the end portion of the circular-shaped aperture to the end portion of the microlens is equal in all directions.

In FIG. 44, the length of the lens LX, which is a microlens, along the first direction X is referred to as WLX, and the length thereof along the second direction Y is referred to as WLY. The length of the aperture OP, which is a circular shaped aperture, along the first direction X is referred to as WBX, and the length thereof along the second direction Y is referred to as WBY.

In each of the first direction X and the second direction Y, the length WBX should preferably be 50% or more of the length WLX (WBX≥0.5×WLX), as in the case described above. The length WBY should preferably be 50% or more of the length WLY (WBY≥0.5×WLY). With this configuration, it is possible to increase the depth of field of the lens element LNS.

When the shape of the microlens in plan view is a perfect circle, the length WLX and the length WLY are equal to each other (WLX=WLY). When the shape of the circular aperture in plan view is a perfect circle, the length WBX and the length WBY are equal to each other (WBX=WBY). However, even if the shape of the microlens and the circular aperture in plan view is not a perfect circle, the length of the aperture OP should be 50% or more of the length of the lens LX in each of the first direction X and the second direction Y.

In this configuration example, advantageous effects similar to those of the embodiment can be achieved.

Configuration Example 3

FIG. 45 is a diagram showing still another configuration example of the display device in the embodiment. The configuration example shown in FIG. 45 is different from that of FIG. 29 in that a halftone region is provided between the light-shielding region and the aperture.

In FIG. 45, the lens LX is a lenticular lens, and the electrodes LE1 and LE2 of the barrier element BRR have a rectangular shape extending in the second direction Y.

In FIG. 45, the voltages applied to the electrode LE11 and the electrode LE13 are lower than those applied to the electrode LE21 and the electrode LE24. In the region corresponding to the electrode LE11 and the electrode LE13, the transmittance of the liquid crystal layer LCY is higher than in the region corresponding to the electrode LE21 and the electrode LE24, that is, the barrier formation region BFR1. The region with higher transmittance than that of the barrier formation region BFR is referred to as a halftone region HFR. The voltages applied to the electrodes corresponding to the barrier formation region BFR and the halftone region HFR should be controlled by a signal from a controller (not shown) connected to the barrier element BRR.

The regions corresponding to the electrode LE11 and the electrode LE13 are referred to as a halftone region HFR11 and a halftone region HFR12, respectively. When the transmittances of the liquid crystal layer LCY in the halftone region HFR11 and the halftone region HFR12 are the same and there is no need to distinguish one from the other, these halftone regions are referred to simply as the halftone region HFR1.

The halftone region HFR1 is formed between the light-shielding region LB and the aperture OP. By allowing the transmittance at the boundary between the light-shielding region LB and the aperture OP to change in steps, the balance between the main light rays and the neighboring light rays can be changed in an analogous manner.

FIG. 46 is a diagram showing still another configuration example of the display device in the embodiment. The configuration example shown in FIG. 46 is different from that of FIG. 45 in that a multi-step halftone region is provided.

In FIG. 46, in addition to the example shown in FIG. 45, voltage is applied to the electrode LE22 and the electrode LE23. The voltages applied to the electrode LE22 and the electrode LE23 are lower than those applied to the electrode LE11 and the electrode LE13, respectively.

As a result, in the region corresponding to the electrode LE22 and the electrode LE23, the halftone region HFR11 and the halftone region HFR12 are formed, which have even higher transmittance than that of the halftone region HFR1 (the halftone region HFR11 and the halftone region HFR12). When the transmittances of the liquid crystal layer LCY in the halftone region HFR21 and the halftone region HFR22 are the same and there is no need to distinguish one from the other, they are simply referred to as the halftone region HFR2.

The halftone region HFR2 is formed between the halftone region HFR1 and the aperture OP. By allowing the transmittance of the boundary between the light-shielding region LB and the aperture OP to change in steps, the balance between the main light rays and the neighboring light rays can be further changed in an analogous manner.

FIG. 47 is a diagram showing still another configuration example of the display device in the embodiment. The configuration example shown in FIG. 47 is different from that of FIG. 45 in that the lens is a microlens.

In FIG. 47, the lens LX is a microlens, and the electrode LE1 and the electrode LE2 of the barrier element BRR each have an annular shape. The barrier formation region BFR1, which gives rise to the light-shielding region LB, is formed in an annular shape.

In FIG. 47, the voltage applied to the electrode LE11 is lower than the voltage applied to the electrode LE21. The voltage applied to the electrode LE21 is lower than the voltage applied to the electrode LE12. A light-shielding region LB, a halftone region HFR1 and a halftone region HFR2 are formed to correspond to the electrode LE11, the electrode LE21 and the electrode LE12, respectively. The light-shielding region LB, the halftone region HFR1 and the halftone region HFR2 have, in this order, higher transmittance of the liquid crystal layer LCY.

The halftone region HFR2 is formed between the halftone region HFR1 and the aperture OP. The halftone region HFR1 is formed between the light-shielding region LB and the halftone region HFR2. By allowing the transmittance of the boundary between the light-shielding region LB and the aperture OP to change in steps, the balance between the main light rays and the neighboring light rays can be changed in an analogous manner.

In this configuration example, advantageous effects similar to those of the embodiment can be achieved.

Configuration Example 4

Figure 48:
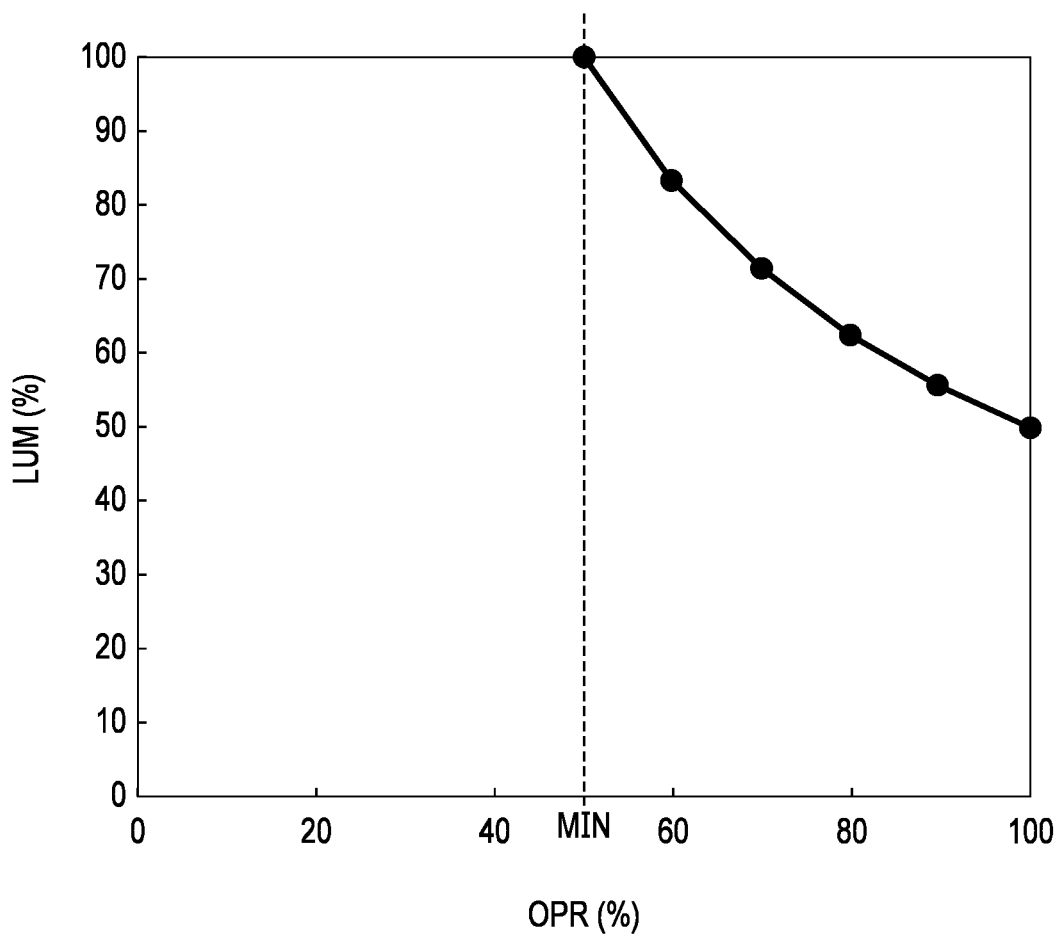
FIG. 48 is a diagram showing a relationship between an aperture ratio of the barrier element and a luminance of an illumination device.

FIG. 48 is a diagram showing a relationship between the aperture ratio of the barrier element and the luminance of the illumination device. The ratio of aperture OP formed by the barrier element BRR is referred to as an aperture ratio OPR (%). The rate of the luminance of the illumination device ILD is referred to as a luminance ratio LUM (%).

As the aperture ratio OPR increases, the luminance of the image light emitted from the display device DSP increases. By linking such change in luminance with the control of the illumination device ILD, it is possible to maintain the luminance of the display device DSP at a constant level. With this configuration, even when the image displayed on the display device DSP is the same and only the depth of field is varied, the view does not have a sense of unnaturalness.

In the case where the control of the illumination device ILD is not linked, the luminance of the image displayed on the display device DSP is changed if the depth of field is varied. This causes a sense of unnaturalness for the user viewing the image.

To the illumination device ILD and the barrier element BRR, a drive signal is input from the controller, which is not shown in FIG. 1 so as to drive in linkage. With this configuration, it is possible to link the aperture rate OPR of the aperture OP of the barrier element BRR and the luminance rate LUM of the illumination device ILD with each other.

In FIG. 48, the horizontal axis indicates the aperture rate OPR (%) and the vertical axis indicates the luminance rate LUM (%). In FIG. 48, the aperture rate OPR is set to 50% when the luminance rate LUM is 100%. The aperture ratio OPR of 50% is set to the lower limit MIN of the aperture ratio OPR. When the aperture ratio OPR is in a range of 50% or more to 100% or less, the luminance rate LUM should be varied accordingly in the range between 50% and 100%. The aperture ratio OPR and the luminance ratio LUM should be determined so that the product of the aperture ratio OPR multiplied by the luminance ratio LUM becomes a constant.

In this configuration example, advantageous effects similar to those of the embodiment can be achieved.

In the display panel PNL in this specification, a liquid crystal display panel of a lateral electric field mode, for example, a fringe field switching (FSS) mode is used. However, the display panel PNL of the present invention is not limited to this. The display panel PNL of the present invention may as well be a liquid crystal display panel of a vertical alignment method, for example, a vertical alignment (VA) mode. In this case, as the direction of the absorption axis of each polarizer and the initial alignment direction of the barrier element BRR, a configuration in which the initial alignment directions of the alignment film AL1 and the alignment film AL2 in FIG. 8 are removed can be adopted. Note here that the direction of the absorption axis of each polarizer and the initial alignment direction of the alignment film can be determined according to the drive system of the liquid crystal layers of the display panel PNL and the barrier element BRR.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a lens element including a plurality of lenses;
a barrier element comprising a liquid crystal layer; and
a display panel, wherein
the lens element is provided between the display panel and the barrier element,
the barrier element comprises a first substrate and a second substrate,
the liquid crystal layer is provided between the first substrate and the second substrate,
the first substrate comprises
a plurality of first electrodes,
an insulating layer which covers the plurality of first electrodes, and
a plurality of second electrodes provided on the insulating layer, and
the second substrate comprises a third electrode.

2. The display device according to claim 1, wherein
each of the plurality of first electrodes and each of the plurality of second electrodes have a rectangular shape with short sides along a first direction and long sides extending along a second direction which intersects the first direction, and
the plurality of first electrodes and the plurality of second electrodes are arranged alternately along the first direction.

3. The display device according to claim 2, wherein the plurality of lenses are a plurality of lenticular lenses.

4. The display device according to claim 1, wherein
one of the plurality of first electrodes and the plurality of second electrodes has a circular shape,
other ones of the plurality of first electrodes and the plurality of second electrodes each have an annular shape,
the other ones of the electrodes having the annular shape are arranged concentrically around the one electrode having the circular shape at a center, and
the plurality of first electrodes and the plurality of second electrodes are arranged alternately from the center towards an outer side.

5. The display device according to claim 4, wherein the plurality of lenses are a plurality of microlenses.

6. The display device according to claim 1, further comprising:
wiring lines connected respectively to the plurality of first electrodes or each of the plurality of second electrodes, wherein
the wiring lines have a rectangular shape having short sides along a first direction and long sides extending along a second direction which intersects the first direction.

7. A display device comprising:
a display panel;
a barrier element opposing the display panel; and
a lens element located between the display panel and the barrier element, wherein
the barrier element comprises a first substrate, a second substrate, and a liquid crystal layer located between the first substrate and the second substrate,
the first substrate comprises a plurality of first electrodes and a plurality of second electrodes located between the plurality of first electrodes and the liquid crystal layer,
the second substrate includes one third electrode which overlaps the plurality of first electrodes and the plurality of second electrodes, the plurality of first electrodes include a plurality of first annular electrodes having annular shapes and sizes different from each other, the plurality of second electrodes include a plurality of second annular electrodes having annular shapes and sizes different from each other, and the plurality of first annular electrodes and the plurality of second annular electrodes are arranged alternately.

8. The display device according to claim 7, wherein the lens element has a plurality of lenses.

9. The display device according to claim 8, wherein the plurality of first annular electrodes and the plurality of second annular electrodes overlap one of the plurality of lenses.

10. The display device according to claim 7, wherein the plurality of first electrodes include one circular electrode having a circular shape, and each of the plurality of first annular electrodes and each of the plurality of second annular electrodes surround the circular electrode.

11. The display device according to claim 7, wherein the first substrate includes a first wiring line connected to one of the plurality of first electrodes, and the first wiring line overlaps at least one of the plurality of first annular electrodes and at least one of the plurality of second annular electrodes.

12. The display device according to claim 7, wherein the first substrate includes a second wiring line connected to one of the plurality of second electrodes, and the first wiring line overlaps at least one of the plurality of first annular electrodes and at least one of the plurality of second annular electrodes.

13. A display device comprising:

a lens; and a barrier element opposing the lens, wherein the barrier element comprises a liquid crystal layer, a plurality of first electrodes and a plurality of second electrodes located between the plurality of first electrodes and the liquid crystal layer, the plurality of first electrodes include a plurality of first annular electrodes having annular shapes and sizes different from each other, the plurality of second electrodes include a plurality of second annular electrodes having annular shape and sizes different from each other, and the plurality of first annular electrodes and the plurality of second annular electrodes are arranged alternately.

14. The display device according to claim 13, wherein the barrier element comprises one third electrode which overlaps the plurality of first electrodes and the plurality of second electrodes, and the liquid crystal layer is located between the plurality of second electrodes and the third electrode.

15. The display device according to claim 13, wherein the plurality of first electrodes include one circular electrode having a circular shape, and each of the plurality of first annular electrodes and each of the plurality of second annular electrodes surround the circular electrode.

16. The display device according to claim 13, wherein the first substrate includes a first wiring line connected to one of the plurality of first electrodes, and the first wiring line overlaps at least one of the plurality of first annular electrodes and at least one of the plurality of second annular electrodes.

17. The display device of claim 13, wherein the first substrate includes a second wiring line connected to one of the plurality of second electrodes, and the first wiring overlaps at least one of the plurality of first annular electrodes and at least one of the plurality of second annular electrodes.

\* \* \* \* \*